United States Patent
Watanabe et al.

(10) Patent No.: US 8,243,113 B2
(45) Date of Patent: Aug. 14, 2012

(54) ORDINARY-TEMPERATURE-PHOSPHORESCENT ORGANIC MATERIAL, REVERSIBLY THERMOSENSITIVE RECORDING MATERIAL, REVERSIBLY THERMOSENSITIVE RECORDING MEDIUM, AND METHOD OF RECORDING IN REVERSIBLY THERMOSENSITIVE RECORDING MEDIUM

(75) Inventors: Toshiyuki Watanabe, Fuchu (JP); Shuzo Hirata, Fuchu (JP)

(73) Assignee: National University Corporation Tokyo University of Agriculture and Technology, Tokyo (JP)

( * ) Notice: Subject to any disclaimer, the term of this patent is extended or adjusted under 35 U.S.C. 154(b) by 160 days.

(21) Appl. No.: 12/734,825

(22) PCT Filed: Nov. 28, 2008

(86) PCT No.: PCT/JP2008/071740
§ 371 (c)(1),
(2), (4) Date: Aug. 18, 2010

(87) PCT Pub. No.: WO2009/069790
PCT Pub. Date: Jun. 4, 2009

(65) Prior Publication Data
US 2010/0328412 A1 Dec. 30, 2010

(30) Foreign Application Priority Data
Nov. 28, 2007 (JP) ................. 2007-308107

(51) Int. Cl.
B41M 5/26 (2006.01)
B41J 5/28 (2006.01)

(52) U.S. Cl. .................. 347/221; 252/301.16

(58) Field of Classification Search .................. 347/221; 252/301.16
See application file for complete search history.

(56) References Cited

U.S. PATENT DOCUMENTS
5,424,006 A 6/1995 Murayama et al.

FOREIGN PATENT DOCUMENTS
| EP | 2223985 | * 9/2010 |
|---|---|---|
| JP | B2-2543825 | 10/1996 |
| JP | A-10-250226 | 9/1998 |
| JP | A-2000-094838 | 4/2000 |
| JP | A-2007-118420 | 5/2007 |
| WO | WO 2007/111298 A1 | 10/2007 |

OTHER PUBLICATIONS
Mendonsa et al. "A Comparative Study of the Solid-Matrix Phosphorescence of Heterocyclic Aromatic Amines in Glucose Glasses as a Function of Temperature," *Journal of Luminescence* 97; Apr. 1, 2002; pp. 19-33; University of Wyoming. Yamaji et al. "Photophysical and Photochemical properties of Corannulenes Studied by Emission and Optoacoustic Measurements, Laser Flash Photolysis and Pulse Radiolysis," *Chemical Physics Letters* 425, 2006, pp. 53-57.

(Continued)

*Primary Examiner* — Huan Tran
(74) *Attorney, Agent, or Firm* — Oliff & Berridge, PLC

(57) ABSTRACT

The present invention provides an organic material that is characterized by including a rigid matrix and a dye having a phosphorescence lifetime of 0.1 seconds or more in a rigid medium at 77 K and that exhibits such a strong and long-lived phosphorescence as to be recognizable with the naked eyes even at ordinary temperature: namely, an ordinary-temperature-phosphorescent organic material.

20 Claims, 10 Drawing Sheets

OTHER PUBLICATIONS

Extended European Search Report issued in European Application No. 08854048.9 dated Aug. 4, 2011.

International Search Report issued in International Application No. PCT/JP2008/071740 mailed Feb. 3, 2009.

Written Opinion of the International Searching Authority issued in International Application No. PCT/JP2008/071740 mailed Feb. 3, 2009.

Hone et al., "Photochemistry in Polymer Solids. 3. Kinetics for Nonexponential Decay of Benzophenone Phosphorescence in Acrylic and Methacrylic Polymers," *Macromolecules*, 1984, pp. 1746-1750, vol. 17.

Hirata et al., "Reversible Thermoresponsive Recording of Fluorescent Images (TRF)," *Advanced Materials*, 2006, pp. 2725-2729, vol. 18.

\* cited by examiner

US 8,243,113 B2

ORDINARY-TEMPERATURE-PHOSPHORESCENT ORGANIC MATERIAL, REVERSIBLY THERMOSENSITIVE RECORDING MATERIAL, REVERSIBLY THERMOSENSITIVE RECORDING MEDIUM, AND METHOD OF RECORDING IN REVERSIBLY THERMOSENSITIVE RECORDING MEDIUM

TECHNICAL FIELD

The present invention relates to an organic material that exhibits such a strong and long-lived phosphorescence at ordinary temperature in air as to be recognizable with the naked eye (hereinafter referred to as an "ordinary-temperature-phosphorescent organic material"). The present invention also relates to a reversibly thermosensitive recording material capable of reversibly recording a long-lived-phosphorescence function of the ordinary-temperature-phosphorescent organic material by utilizing a phase transition phenomena of the material. Moreover, the present invention relates to a recording medium using the reversibly thermosensitive recording material.

BACKGROUND ART

The long-lived phosphorescence refers to a phenomenon that a substance absorbs light, stores the light as energy, and then continuously emits light for a while even after the light is extinguished. Conventionally, there have been known long-lived phosphorescent materials formed of inorganic compounds as materials that exhibit such a strong and long-lived phosphorescence at ordinary temperature as to be recognizable with the naked eye. However, there have not been known long-lived phosphorescent materials formed of organic compounds.

Some organic compounds have been known to exhibit a phenomenon called phosphorescence. The phosphorescence is defined as luminescence based on spin-forbidden transition from an excited triplet state to a ground singlet state. In this phenomenon, afterglow is observed even after light irradiation is stopped. However, the lifetime of the phosphorescence is approximately 0.001 seconds to several seconds. To exhibit such a strong and long-lived (0.1 seconds or more) phosphorescence as to be recognizable with the naked eye, the organic compounds need to be brought into an extremely low temperature state of approximately 77 K. Organic materials are composed of light elements (carbon, hydrogen, oxygen, nitrogen) and are weak in intermolecular force and the like. Hence, interatomic stretching vibrations or rotational motions occur locally in the organic materials in a solid state at or below the glass transition temperature (Tg), as well. For this reason, although a phosphorescent dye exhibits a long-lived phosphorescence recognizable with the naked eye at an extremely low temperature of approximately 77 K, the phosphorescent dye excited at ordinary temperature is deprived of the excitation energy by thermal vibrations of the surroundings in at most several milliseconds. As a result, the phosphorescence with a long lifetime (long-lived phosphorescence) is almost unobservable (for example, refer to Non-Patent Document 1). Moreover, since oxygen exists in an organic material in air, the energy of the excited state is removed by the oxygen, and hence the excited state is unable to be kept for several milliseconds or longer. For this reason, a strong and long-lived phosphorescent phenomenon of an organic material at ordinary temperature in air has not been reported so far.

Meanwhile, long-lived phosphorescent materials formed of inorganic compounds are used for luminous paints and the like, because the materials have long lifetimes of long-lived phosphorescence even at ordinary temperature. However, such long-lived phosphorescent materials formed of inorganic compounds generally use $Re^{4+}:Cs_2ZrBr_6$ or the like. Hence, such long-lived phosphorescent materials are not preferable because of the use of environmentally hazardous elements or rare metals. Recently, those using $Mn^{2+}:Ta_2O_5$, $Dy:CuZnS$ or $Eu:SrAlO_4$ and being relatively harmless to the human body have been commercialized (refer to, for example, Patent Document 1). However, with such long-lived phosphorescent materials formed of inorganic compounds, it is difficult to perform a crystalline-amorphous control by heat, and to change the crystal structure by light. A heat storage function is unable to be reversibly recorded or controlled by practical heat application or practical light irradiation.

Note that, with an organic material, rewriting through a crystalline-amorphous control by heat, rewriting by light using a photochromic compound, or the like may be performed. Actually, the present inventors had developed a recording medium in which fluorescence portions are thermally rewritable (Non-Patent Document 2 and Patent Documents 2 and 3). However, this is a material having a fluorescence function (in which the luminescence stops immediately after the irradiation of excitation light is stopped), but not an organic material having a long-lived-phosphorescence function at ordinary temperature.

In this respect, there has been desired development of a long-lived phosphorescent material formed of an organic compound having various characteristics, which inorganic compounds do not have, such as capability of the reversible recording by phase transition.

Non-Patent Document 1: K. Horie, K. Morishita, and I. Mita, Macromolecules, 1984, vol. 17, pp. 1746
Non-Patent Document 2: Shuzo Hirata and Toshiyuki Watanabe, Advanced Materials, 2006, vol. 18, Issue 20, pp. 2725-2729
Patent Document 1: Japanese Patent No. 2543825
Patent Document 2: Japanese Patent Application Publication No. 2007-118420
Patent Document 3: International Patent Application Publication No. WO2007/111298

DISCLOSURE OF THE INVENTION

Problems to be Solved by the Invention

In view of the above-described conventional circumstances, an object of the present invention is to provide a long-lived phosphorescent material that exhibits such a strong and long-lived phosphorescence at ordinary temperature in air as to be recognizable with the naked eye, and that has characteristics as an organic compound: namely, an ordinary-temperature-phosphorescent organic material.

Means for Solving the Problems

In order to address the above-described problems, the present inventors have conducted earnest studies. As a result, the present inventors have found that when a dye having a phosphorescence lifetime of 0.1 seconds or more in a rigid medium at an extremely low temperature of 77 K is dispersed in a rigid matrix, i.e., in a matrix containing a compound formed of massive molecules in each of which plural cyclo rings are connected to each other, such a strong and long-lived phosphorescence as to be recognizable with the naked eye is exhibited even at ordinary temperature in air. This finding leads to the completion of the present invention.

Specifically, the present invention provides the following ordinary-temperature-phosphorescent organic material (1) to (15), the following reversibly thermosensitive recording material (16) to (18) containing the ordinary-temperature-phosphorescent organic material, the following reversibly thermosensitive recording medium (19) in which the reversibly thermosensitive recording material is provided to a substrate, and the following method (20) of recording in the reversibly thermosensitive recording medium.

(1) An ordinary-temperature-phosphorescent organic material characterized by including:
  a matrix containing a reversible agent; and
  a dye having a phosphorescence lifetime of 0.1 seconds or more in a rigid medium at 77 K.
(2) The ordinary-temperature-phosphorescent organic material according to the (1), characterized in that
  the reversible agent is a compound formed of massive molecules in each of which plural cyclo rings are connected to each other.
(3) The ordinary-temperature-phosphorescent organic material according to the (2), characterized in that
  the compound formed of the massive molecules in each of which the plural cyclo rings are connected to each other is a sterol compound.
(4) The ordinary-temperature-phosphorescent organic material according to any one of the (1) to (3), characterized in that
  the dye is a dye having at least one position substituted by a tertiary amine or a secondary amine.
(5) The ordinary-temperature-phosphorescent organic material according to the (4), characterized in that
  the substitution is a substitution at a position, in the dye, directly connected to a π-conjugated system having a maximum absorption wavelength of 450 nm or less.
(6) The ordinary-temperature-phosphorescent organic material according to any one of the (1) to (5), characterized in that
  the dye is a dye that has a lowest triplet excited state formed by ππ* transition, and that contains no heavy atom having an atomic number of 17 or greater in molecules of the dye.
(7) The ordinary-temperature-phosphorescent organic material according to any one of the (1) to (6), characterized in that
  a proton at a conjugated moiety in the dye is replaced with deuterium.
(8) The ordinary-temperature-phosphorescent organic material according to any one of the (1) to (7), characterized in that
  the matrix contains an amorphous-phase stabilizer.
(9) The ordinary-temperature-phosphorescent organic material according to the (8), characterized in that
  the amorphous-phase stabilizer is a compound that has at least two hydroxyl groups in a single molecule and is formed of a rigid moiety in which no moiety of two or more continuous alkyl chains exists at least between the hydroxyl groups, and
  the reversible agent is a sterol compound.
(10) The ordinary-temperature-phosphorescent organic material according to any one of the (1) to (9), characterized in that
  a photosensitizer is added.
(11) The ordinary-temperature-phosphorescent organic material according to the (10), characterized in that
  the photosensitizer has an intersystem crossing efficiency of 0.5 or higher at ordinary temperature, and
  a lowest triplet energy of the photosensitizer is higher than a lowest triplet energy of the dye.
(12) The ordinary-temperature-phosphorescent organic material according to any one of the (1) to (11), characterized in that
  a solid state at or below a melting point of the reversible agent is settable to two states of: an equilibrium state where a phase of the reversible agent is separated from a phase of an excessive part of the dye beyond equilibrium solubility: and any one of a quasi-equilibrium and non-equilibrium state where the reversible agent incorporates the dye that is at or beyond the equilibrium solubility, and
  a phosphorescence quantum yield and a phosphorescence lifetime differ between the two states.
(13) The ordinary-temperature-phosphorescent organic material according to any one of the (1) to (12), characterized in that
  a leuco dye is added.
(14) The ordinary-temperature-phosphorescent organic material according to the (13), characterized in that
  when the matrix containing the reversible agent is in a crystalline state, an absorption wavelength band where an absorbance of the leuco dye in a colored state is 25% or more of a maximum absorbance is partially overlapped with a luminescence wavelength band that is 25% or more of a maximum intensity of a phosphorescence spectrum of the dye and a phosphorescence spectrum of the photosensitizer.
(15) The ordinary-temperature-phosphorescent organic material according to any one of the (1) to (14), characterized in that
  a photochromic compound is added.
(16) A reversibly thermosensitive recording material characterized by including:
  the ordinary-temperature-phosphorescent organic material according to any one of the (1) to (15).
(17) A reversibly thermosensitive recording material characterized by including:
  a microcapsule encapsulating the ordinary-temperature-phosphorescent organic material according to any one of the (1) to (15).
(18) A reversibly thermosensitive recording material characterized by including:
  the ordinary-temperature-phosphorescent organic material according to any one of the (1) to (15); and
  an insulating particle.
(19) A reversibly thermosensitive recording medium characterized by including:
  the reversibly thermosensitive recording material according to any one of the (16) to (18) provided to a substrate.
(20) A method of recording in a reversibly thermosensitive recording medium, characterized by including:
  heating a predetermined position of the reversibly thermosensitive recording medium according to the (19) to a melting point of the reversible agent, followed by cooling, thereby developing a long-lived-phosphorescence function of the reversibly thermosensitive recording material; and
  heating a position different from the predetermined position to a crystallization temperature of the reversible agent, followed by cooling, thereby deleting a long-lived-phosphorescence function of the reversibly thermosensitive recording material.

EFFECTS OF THE INVENTION

The ordinary-temperature-phosphorescent organic material of the present invention exhibits a strong and long-lived phosphorescence even at ordinary temperature in air to such an extent that the phosphorescence is recognizable with the naked eye. Moreover, the ordinary-temperature-phosphorescent organic material of the present invention has characteristics as an organic material, which any inorganic long-lived phosphorescent material does not have.

Here, in the above-described ordinary-temperature-phosphorescent organic material (2) using the compound formed of the massive molecules in each of which the plural cyclo rings are connected to each other as the reversible agent, the matrix is rigid, and local molecular motion thereof is less active. Hence, the loss of excitation energy of the dye is preventable, and thus a sufficient long-lived-phosphorescence function may be exhibited. Note that, among Examples of the present invention, Examples 1 to 74 satisfy the constituent features in the above-described (2), and in each of Examples 1 to 74, a lifetime of long-lived phosphorescence is 0.1 seconds or more at ordinary temperature in air, as will be described later. Meanwhile, Comparative Examples 1 to 34 do not satisfy the constituent features of the above-described (2), and in each of Comparative Examples 1 to 34 a lifetime of long-lived phosphorescence is less than 0.1 seconds at ordinary temperature in air.

Moreover, in the above-described ordinary-temperature-phosphorescent organic material (3) using the sterol compound as the reversible agent, intramolecular hydrogen bonding of the sterol compound easily occurs. Hence, the ordinary-temperature-phosphorescent organic material has a low rate of crystallization because of this strong hydrogen bonding, and thus does not crystallize but forms a stable amorphous phase at room temperature when rapidly cooled from the melting point of the reversible agent to or below the glass transition temperature thereof. Since the amorphous state of the matrix is kept at room temperature and is formed as a state where the cyclo rings are three-dimensionally restricted by the hydrogen bonding, almost no local interatomic rotational motion exists in the matrix. Moreover, this matrix has a characteristic of releasing oxygen to the outside of the system by being heated once to or above the melting point, and has a structure that hardly allows oxygen to contaminate the system at the time when the matrix is cooled to form an amorphous phase. The dye having a phosphorescence lifetime of 0.1 seconds (s) or more in a rigid medium at 77 K is dispersed in the reversible agent, and the dispersion is rapidly cooled from the melting point or above of the reversible agent to the Tg thereof or below, a state is formed where the dye is uniformly dispersed in the matrix including the reversible agent. When the dye is excited, the long-lived excited state thereof is not deactivated by surrounding interatomic rotational motion or vibrational motion, and by the energy transfer to oxygen. Hence, a strong and long-lived phosphorescence is observed when the dye is excited at room temperature in air.

The above-described ordinary-temperature-phosphorescent organic material (4) using, as the dye, a dye having at least one position substituted by a tertiary amine or a secondary amine exhibits a higher level of long-lived-phosphorescence function than an ordinary-temperature-phosphorescent organic material using a dye having no such substitution.

Particularly, the above-described ordinary-temperature-phosphorescent organic material (5) in which the substitution with a tertiary amine or a secondary amine is the substitution at at least one position in the π-conjugated system having a maximum absorption wavelength of 450 nm or less exhibits a high level of long-lived-phosphorescence function, because it is conceivable that the dye forms an excited triplet state directly and efficiently.

Next, the above-described ordinary-temperature-phosphorescent organic material (6) using the dye that has the lowest triplet excited state of the $\pi\pi^*$ transition and that contains no heavy atom having an atomic number of 17 or greater in molecules of the dye exhibits a long-lived phosphorescence because of the following reasons. Specifically, the rate of deactivation of electrons from a $\pi\pi^*$ triplet level to the ground state of the organic material (6) tends to be slow, which leads to a long-lived phosphorescence. Moreover, since the organic material (6) contains no heavy atom, increase in rate constant of the phosphorescence due to the heavy atom effect is preventable.

The above-described ordinary-temperature-phosphorescent organic material (7) in which the proton at the conjugated moiety in the dye is replaced with deuterium has a longer phosphorescence lifetime, and accordingly the phosphorescence lasts long. The reason is as follows. Specifically, by deuterium substitution of protons bonded to carbons in aromatic conjugated moieties involved in the long-lived phosphorescence, the C—H infrared vibration energy is replaced with the C-D infrared vibration energy lower than the C—H infrared vibration energy. As a result, a thermal deactivation rate of an excited triplet state of the dye may be slowed. Moreover, this deuteration may slow the thermal deactivation rate of an excited singlet state of the dye, which results in a large intersystem crossing efficiency. Hence, the quantum yield of long-lived phosphorescence may be increased.

The above-described ordinary-temperature-phosphorescent organic material (8) to which the amorphous-phase stabilizer is further added forms a stable amorphous phase. Thus, the dye is uniformly dispersed, and the quench due to aggregation of the dye is preventable.

In particular, an excellent effect is achieved by the above-described ordinary-temperature-phosphorescent organic material (9) using the sterol compound as the reversible agent, and using, as the amorphous-phase stabilizer, the compound that has at least two hydroxyl groups in a single molecule, and the rigid moiety at least between the hydroxyl groups, the rigid moiety being a moiety in which no moiety of two or more continuous alkyl chains exists. Specifically, since a hydroxyl group present in the sterol compound and the hydroxyl group contained in the amorphous-phase stabilizer form strong hydrogen bonding, the rate of the crystallization tends to be slowed. For this reason, the ordinary-temperature-phosphorescent organic material (9) does not crystallize, but forms a stable amorphous phase at room temperature when a mixture of the sterol compound and the amorphous-phase stabilizer is rapidly cooled from a temperature at or above the melting point of the reversible agent to a temperature at or below the Tg of the reversible agent after the amorphous-phase stabilizer is dissolved by making the temperature of a mixture of the sterol compound and the amorphous-phase stabilizer at or above the melting point of the steroid compound. The amorphous state of this matrix is kept at room temperature, and a state is formed where the cyclo rings are three-dimensionally restricted by hydrogen bonding. Accordingly, almost no local interatomic rotational motion exists in the matrix. Moreover, this matrix has a characteristic of releasing oxygen to the outside of the system by being heated once to or above the melting point, and has a structure that hardly allows oxygen to contaminate the system at the time when the matrix is cooled to form an amorphous phase. Here, suppose a case where a small amount of the dye having a phosphorescence lifetime of 0.1 seconds (s) or more in a rigid medium at 77 K is mixed with the matrix including the reversible agent and the amorphous-phase stabilizer. In such a case, the long-lived excited state is not deactivated by surrounding interatomic rotational motion or vibration motion, and by the energy transfer to oxygen, at the time of excitation of the dye. Hence, a strong and long-lived phosphorescence is observed when the dye is excited at room temperature in air.

In the case of the above-described ordinary-temperature-phosphorescent organic material (10) to which the photosensitizer is added, even when a dye used is incapable of providing a strong long-lived phosphorescence alone, the photosensitizer efficiently forms an excited triplet state, from which energy is efficiently transferred to the dye. Thereby, an excited triplet state of the dye is formed. As a result, a strong and long-lived phosphorescence is achieved.

In particular, a strong long-lived-phosphorescence function is exhibited by the above-described ordinary-temperature-phosphorescent organic material (11) using, as the photosensitizer, a photosensitizer having an intersystem crossing efficiency of 0.5 or higher at room temperature, where the lowest triplet energy of the photosensitizer is higher than the lowest triplet energy of the dye.

The above-described ordinary-temperature-phosphorescent organic material (12) of the present invention may take, in a solid state at or below the melting point of the reversible agent, the two states of: the equilibrium state where the phase of the reversible agent is separated from the phase of the excessive part of the dye beyond the equilibrium solubility; and the state of the quasi-equilibrium state or the non-equilibrium state where the reversible agent incorporates the dye that is at or beyond the equilibrium solubility. The organic material (12) is characterized in that the phosphorescence quantum yield and the phosphorescence lifetime vary between the two states. The aggregation state of the dye is reversibly controlled plenty of times by repeating the processes of heating the ordinary-temperature-phosphorescent organic material to mutually different two temperatures and cooling the ordinary-temperature-phosphorescent organic material to room temperature, whereby the On-Off of the long-lived phosphorescence is recordable. The information of the ling-lived phosphorescence is easily checkable by observing an after image of the luminescence remaining after excitation light is irradiated and the irradiation is stopped, and the information is nondestructively readable plenty of times.

In the case of the above-described ordinary-temperature-phosphorescent organic material (13) to which the leuco dye is added, the contrast of the On-Off of the long-lived-phosphorescence function may by increased as follows. Specifically, when the On-Off of long-lived phosphorescence is recorded by reversibly controlling the aggregation state of the dye, a colored product of the leuco dye deprives, of energy, a part of the dye that does not aggregate well and emits a long-lived phosphorescence, although the phosphorescence is very weak.

Particularly, in the case of the above-described ordinary-temperature-phosphorescent organic material (14), i.e., the ordinary-temperature-phosphorescent organic material characterized in that, when the matrix including the reversible agent is in the crystalline state, the absorption wavelength band where the absorbance of the leuco dye in the colored state is 25% or more of the maximum absorbance is partially overlapped with the luminescence wavelength band that is 25% or more of the maximum intensity of the phosphorescence spectrum of the dye and the phosphorescence spectrum of the photosensitizer, since the leuco dye efficiently deprives a non-aggregated part of the dye of the energy, the contrast of the On-Off of the long-lived-phosphorescence function may be further increased.

The above-described ordinary-temperature-phosphorescent organic material (15) to which the photochromic compound is added loses the long-lived-phosphorescence function as follows. Specifically, when the photochromic compound is isomerized by light irradiation, the photochromic compound develops a color, and deprives efficiently the dye of the excitation energy. Meanwhile, for restoring the long-lived-phosphorescence function, the long-lived-phosphorescence function may be restored by irradiation with light having a different wavelength. Accordingly, the On-Off of the long-lived-phosphorescence function may be reversibly performed with light.

The reversibly thermosensitive recording material described in the above-described (17) characterized by containing a microcapsule encapsulating the ordinary-temperature-phosphorescent organic material may be mixed with a polymer resin depending on the purpose. Specifically, the reversibly thermosensitive recording material and a polymer resin are contained, the Tg, the crystallization temperature, and the melting point of the system, and the like are changed, in general. As a result, the reversibility is lost. Moreover, the polymer mixes with the reversible agent, the amorphous-phase stabilizer, or the dye, resulting in changes in the reduction in the thermal mobility, an oxygen concentration, a donating or accepting property, and the like of the matrix. Hence, the long-loved triplet excitation energy of the dye is deactivated. As a result, the long-lived-phosphorescence function is lost. However, when the ordinary-temperature-phosphorescent organic material of the present invention is encapsulated in the microcapsule and mixed with a polymer, the microcapsule protects the reversibly thermosensitive recording material from mixing with the polymer. Hence, an ink may be formed from the material without changing the Tg, the crystallization temperature, the melting point, and the like of the reversibly thermosensitive recording material while the viscosity of the polymer material is utilized. Moreover, since the reduction in the thermal mobility, the oxygen concentration, the donating or accepting property, and the like of the matrix are not changed, the long-lived-phosphorescence function is not lost. Furthermore, even when the content of the polymer material is increased, the reversible characteristic is not impaired. Hence, an excellent printability, an excellent film durability after printing, and an excellent shape-retaining characteristic at the time of thermal rewriting may be provided.

In the case of the above-described reversibly thermosensitive recording material (18) containing the ordinary-temperature-phosphorescent organic material of the present invention and the insulating particle, the material may be provided with printability and a shape retaining characteristic at the time of thermal rewriting. In general, if a polymer material or the like is mixed with a reversibly thermosensitive recording material, the polymer and the reversibly thermosensitive recording material mix with each other at a molecular level. As a result, the Tg, the crystallization temperature, the melting point, and the like of the system change, and the reversibility is lost. Moreover, the polymer mixes with a reversible agent, an amorphous-phase stabilizer, or a dye, resulting in changes in the reduction in the thermal mobility, the oxygen concentration, the donating or accepting property, and the like of the matrix. As a result, the long-lived triplet excitation energy of the dye is deactivated, and the long-lived-phosphorescence function is lost. When the insulating particle and the reversibly thermosensitive recording material are mixed with each other, the insulating particle does not mix with the reversibly thermosensitive recording material at a molecular level. Hence, the crystallization temperature and the melting point of the system are not changed. Thus, the insulating particle does not impair the reversible characteristic. Moreover, since the reduction in the thermal mobility, the oxygen concentration, the donating or accepting property, and the like of the matrix are not changed, the long-lived-phosphorescence function is not lost. If necessary, by causing the reversibly thermosensitive recording material to contain both a polymer material and the insulating particle, the material may be provided with printability, film durability after printing, and a shape-retaining characteristic at the time of thermal rewriting, without impairing the reversible characteristic.

The above-described reversibly thermosensitive recording medium (19) in which the reversibly thermosensitive recording material of the present invention is provided to the substrate may serve as a reversibly thermosensitive recording medium excellent in film durability after printing, a shape-retaining characteristic at the time of thermal rewriting, or the like.

BEST MODES FOR CARRYING OUT THE INVENTION

Hereinafter, best modes for carrying out the present invention will be described.

An ordinary-temperature-phosphorescent organic material of the present invention is characterized by including: a matrix containing a reversible agent alone or containing the reversible agent and an amorphous-phase stabilizer; and a dye having a lifetime of 0.1 seconds (s) or more in terms of phosphorescence lifetime in a rigid medium at 77 K. In addition, when the reversible agent melts, the amorphous-phase stabilizer and the dye dissolve in the reversible agent. Then, if rapidly cooled from a temperature at or above the melting point of the reversible agent to a temperature at or below the glass transition temperature (Tg) of the reversible agent, the reversible agent and the amorphous-phase stabilizer form a stable amorphous phase where the dye is uniformly dispersed.

First, a mechanism of how the ordinary-temperature-phosphorescent organic material of the present invention emits a long-lived phosphorescence at ordinary temperature will be described on the basis of FIG. 1.

When a dye that exhibits a long-lived phosphorescence at 77 K is dispersed in an amorphous matrix mainly containing a vinyl polymer, local molecular motion of a compound constituting the matrix generally occurs also in a room temperature range. Hence, even if the dye is excited, the matrix collides with the dye in approximately several milliseconds at most, and deprives the dye of the excitation energy (energy loss by (1) or (2) in FIG. 1A). For this reason, almost no long-lived phosphorescence at a visible level is observed at ordinary temperature.

A polymer matrix containing no flexible polymer such as a vinyl polymer, but containing a polymer formed of only rigid moieties has a certain electron-donating property or a certain electron-accepting property. Even when the dye is dispersed in such a matrix with a weak accepting property or a weak donating property of the polymer, the dye is deprived of or donates the excitation energy or an electron. As a result, almost no long-lived phosphorescence is observed at a visible level (refer to energy loss by part (3) in FIG. 1A).

Moreover, a material formed of only rigid moieties crystallizes easily, and hence the dye is not uniformly dispersed. As a result, the dye excluded by the crystallization of the surroundings aggregates together. Consequently, concentration quenching occurs, and hence almost no long-lived phosphorescence is observed at a visible level.

Meanwhile, some rigid materials of low-molecular weight compounds exist as compounds in a stable amorphous form at room temperature. However, since the binding force between molecules of these materials is the van der Waals force, which is weak, molecular vibrations and the like of these materials are also unsuppressable. Hence, even when the dye is dispersed in these materials, and excited, no long-lived phosphorescence is observed.

Moreover, ordinary matrices in air store some amount of oxygen in the matrices, and the oxygen is difficult to remove. If oxygen exists, the oxygen collides with the dye and deprives the dye of an energy in a long-lived excited state. This effect results in deactivation of excitons of the dye. Oxygen in ordinary polymer amorphous matrices is removable by vacuum degassing the polymer amorphous matrices that are being heated at or above the Tg. However, when the polymer amorphous matrices are stood in air again, oxygen instantly permeates and diffuses into the system. Because of the effect of such oxygen, a long-lived excited state of the dye is not attainable in air (refer to energy loss by (4) in FIG. 1A).

The present inventors have invented a technique to address the above-described problems. As shown in FIG. 1B, when the matrix is formed of massive molecules, and when a strong binding force acts between the molecules to prevent rotation of the massive molecules, rotational motion of the molecules is less active than usual. In reality, such massive molecules tend to crystallize at room temperature. However, a compound having a hydroxyl group and a phenol group in the matrix or a mixture of such compounds tends to have a slow rate of crystallization because of an effect of intermolecular hydrogen bonding. When the matrix in a molten state is rapidly cooled at or below the Tg, the matrix passes, for a short period of time, a temperature range from the Tg to the melting point both inclusive. However, no crystallization occurs in such a period around several seconds, and thus a stable amorphous phase is formable at room temperature. Moreover, at or below this amorphous matrix Tg, the massive molecules are in an unordered state, but stabilized by a three-dimensional hydrogen bonding network. Hence, it becomes difficult for the massive molecules to crystallize at room temperature. Moreover, the matrix undergoes only weak interatomic stretching motion, and the rotational motion of the massive molecules is prohibited. Consequently, the likelihood of collision with the dye is greatly reduced. Furthermore, when the invented matrix is heated at or above the melting point, oxygen is released to the outside of the system. When rapidly cooled to room temperature after the heating, the matrix turns into an amorphous phase with oxygen being absent in the system. Moreover, the matrix is mainly derived from cyclo rings, and hence has neither donating moiety nor accepting moiety at all. Thus, the matrix has no effect of depriving the dye of the excitation energy. When the dye is dispersed in this matrix and excited, the dye is not affected by the matrix because of the absence of deactivation due to thermal vibrations, deactivation due to oxygen, and moreover deactivation due to electron transfer to the matrix or electron transfer from the matrix. Accordingly, phosphorescence originated from the molecules of the dye is emitted. When a dye having a slow emission rate of phosphorescence is selected, phosphorescence is emitted for several seconds, and hence a long-lived phosphorescence is observed at room temperature in air. In other words, the ordinary-temperature-phosphorescent organic material is obtained.

In the present invention, the "room temperature" represents a temperature approximately from 0 to 30° C. The ordinary-temperature-phosphorescent organic material of the present invention may be any that exhibits a long-lived phosphorescence at any temperature within this range. Note that the "long-lived phosphorescent" in the present invention refers to a phenomenon that luminescence continues to such an extent as to be recognizable with the naked eye even after termination of excitation light irradiation. Specifically, the "long-lived phosphorescent" indicates that a long-lived phosphorescence of 0.1 seconds or more is observed. A lifetime of long-lived phosphorescence is preferably 0.15 seconds or more, more preferably 0.8 seconds or more, and further preferably 2.5 seconds or more.

Meanwhile, the term "organic" in the present invention represents a compound whose skeleton is made of carbon. The ordinary-temperature-phosphorescent organic material of the present invention is a material that exhibits a long-lived phosphorescence even when containing neither a heavy atom nor a radioactive element. However, a compound containing a heavy atom or the like may be added to the ordinary-temperature-phosphorescent organic material of the present invention for the purpose of imparting other functions.

As the reversible agent used for the ordinary-temperature-phosphorescent organic material of the present invention, preferable are massive molecules in each of which plural cyclo rings are connected to each other, the massive molecules having no moieties with relatively high mobility, such as side chains. A compound having a hydroxyl group in a form of being directly connected to at least a massive moiety thereof is preferred, and a sterol compound is preferable. Here, a compound formed of massive molecules in each of which plural cyclo rings are connected to each other is paraphrasable as a compound having a condensed polycyclic hydrocarbon as a basic skeleton, to which a substituent is bonded.

As a reversible agent preferred for the present invention, usable is a compound that has an almost cylindrical and bulky molecular skeleton such as a steroid skeleton, and that has an alcohol group. Specific examples of such a material preferred as the reversible agent include steroid alcohols, and more specific examples include cholesterol, stigmasterol, pregnenolone, methylandrostenediol, estradiol benzoate, epiandrosterone, stenolone, β-sitosterol, pregnenolone acetate, β-cholestarol, 5,16-pregnadiene-3β-ol-20-one, 5α-pregnene-3β-ol-20-one, 5-pregnene-3β,17-diol-20-one-21-acetate, 5-pregnene-3β,17-diol-20-one-17-acetate, 5-pregnene-3β,21-diol-20-one-21-acetate, 5-pregnene-3β,17-diol diacetate, rockogenin, tigogenin, esmilagenin, hecogenin, diosgenin, derivatives thereof, and mixtures containing these, and the like. Meanwhile, when an amorphous phase is desired to be formed without introducing the amorphous-phase stabilizer, preferred is a compound having at least one hydroxyl group and a phenol group in a form of being directly connected to at least a massive moiety of each massive molecule in which plural cyclo rings are connected to each other. As such a compound, preferred is β-estradiol, estratriol, or the like.

Other examples of the massive molecules in each of which plural cyclo rings are connected to each other include leucothol, pirieshormocid, estriol, estradiol, estrone, equilin glycol, 14-hydroxydihydromorphine, estrone, hexacosahydrohexacene, ixerenyl acetate, verticine, korseveramine, ebeiedine, (3aα,6aα,9aα,9bβ)-dodecahydro-1H-phenalene-2α,5α,8α-triol, heptacyclo[8.4.0.0$^{2,7}$.0$^{3,5}$.0$^{4,8}$.0$^{9,13}$.0$^{12,14}$] tetradecane-1,9-diol, and the like.

As the amorphous-phase stabilizer used for the ordinary-temperature-phosphorescent organic material of the present invention, preferred is a compound having two or more hydroxyl groups in at least a rigid moiety thereof. Specific examples of the compound include 1,1,1-tris(4-hydroxyphenyl)ethane, 1,1'-methylenedi-2-naphthol, 1,1-bis(3-cyclohexyl-4-hydroxyphenyl)cyclohexane, 1,1-bis(4-hydroxy-3-methylphenyl)cyclohexane, 1,1-bis(4-hydroxyphenyl)cyclohexane, 1,3-bis[2-(4-hydroxyphenyl)-2-propyl]benzene, 1-naphthol, 2,2'-biphenol, 2,2-bis(2-hydroxy-5-biphenylyl)propane, 2,2-bis(3-cyclohexyl-4-hydroxyphenyl)propane, 2,2-bis(3-sec-butyl-4-hydroxyphenyl)propane, 2,2-bis(4-hydroxy-3-isopropylphenyl)propane, 2,2-bis(4-hydroxy-3-methylphenyl)propane, 2,2-bis(4-hydroxyphenyl)propane, 2,3,4-trihydroxydiphenylmethane, 2-naphthol, 4,4'-(1,3-dimethylbutylidene)diphenol, 4,4'-(2-ethylhexylidene)diphenol, 4,4'-(2-hydroxybenzylidene)bis(2,3,6-trimethylphenol), 4,4'-biphenol, 4,4'-dihydroxydiphenyl ether, 4,4'-dihydroxydiphenylmethane, 4,4'-ethylidenebisphenol, 4,4'-methylenebis(2-methylphenol), 4-(1,1,3,3-tetramethylbutyl)phenol, 4-phenylphenol, 4-tert-butylphenol, 9,9-bis(4-hydroxyphenyl)fluorene, α,α'-bis(4-hydroxyphenyl)-1,4-diisopropylbenzene, α,α,α'-tris(4-hydroxyphenyl)-1-ethyl-4-isopropylbenzene, benzyl 4-hydroxybenzoate, bis(4-hydroxyphenyl)sulfide, bis(4-hydroxyphenyl)sulfone, methyl 4-hydroxybenzoate, resorcinol, tetrabromobisphenol A, and the like.

The blending amount of such an amorphous-phase stabilizer is desirably approximately 3% by weight to 15% by weight relative to the reversible agent. If the blending amount is 3% by weight or less, the rate of crystallization of the reversible agent becomes so fast that the reversible agent crystallizes during the rapid cooling from the melting point of the reversible agent to room temperature. Meanwhile, if such an amorphous-phase stabilizer is added at 15% by weight or more, the amorphous-phase stabilizer itself crystallizes, resulting in a state of phase separation from the reversible agent.

As the dye used for the ordinary-temperature-phosphorescent organic material of the present invention, a dye having a lifetime of 0.1 seconds (s) or more in terms of phosphorescence lifetime in a rigid medium at 77 K. The 77 K is the temperature of liquid nitrogen. The phosphorescence lifetime is a luminescence lifetime after termination of excitation light irradiation. This dye is a dye having a lowest triplet excited state formed by $\pi\pi^*$ transition, and desirably contains no heavy atom in molecules thereof. Here, the rigid medium is a medium that solidifies at 77 K, and has neither electron-donating property nor accepting property. Examples of the rigid medium include: alcohols such as isopropanol and ethanol; THF; cyclohexane; dioxane; and the like.

In order to obtain, at room temperature, a high intersystem crossing efficiency of a dye that has a lowest triplet excited state formed by $\pi\pi^*$ transition, and that contains no heavy atom in the molecules thereof, it is important that the dye should have an absorption peak due to a conjugated system at 450 nm or less, and that a tertiary amine or a secondary amine should be introduced into a moiety directly connected to the conjugated system. Specific examples of such a dye include 2-dimethylaminotriphenylene, 2-diphenylaminotriphenylene, 2-diethylaminofluorene, 2-dipropylaminofluorene, 3-amino-2-dimethylfluorene, 2,7-bis(N-phenyl-N-(4'-N,N-diphenylamino-biphenyl-4-yl))-9,9-dimethyl-fluorene, 9,9-dimethyl-N,N'-diphenyl-N,N'-di-m-tolylfluorene-2,7-diamine, 2,7-bis[phenyl(m-tolyl)amino]-9,9'-spirofluorene, N,N,N',N'-tetraphenylbenzidine, N,N'-diphenyl-N,N'-di(m-tolyl)-benzidine, 3,3',5,5'-tetramethyl-benzidine, 4,4'-bis[di(3,5-xylyl)amino]-4"-phenyltriphenylamine, N,N,N',N'-tetrakis(p-tolyl)benzidine, 4,4'-bis[N-(1-naphthyl)-N-phenylamino]-4"-phenyltriphenylamine, N-phenyl-2naphthylamine, N,N'-diphenyl-benzidine, (phenanthrene-9-yl)-phenyl-amine, N-phenyl-N-pyrene-3-yl-amine, diethyl-pyrene-1-yl-amine, and the like. By use of the dye, both a high intersystem crossing efficiency and a long lifetime of the triplet excited state are achieved at room temperature, so that a strong and long-lived phosphorescence is observed at room temperature.

In order to obtain a longer-lived and stronger phosphorescence, an aromatic moiety of the dye that has a lowest triplet excited state formed by $\pi\pi^*$ transition, and that contains no heavy atom in the molecules of the dye is desirably substituted with deuterium or fluorine.

As an example of a method for such deuterium substitution, a skeleton of the dye is first synthesized, and then the skeleton is treated by using a catalyst such as Pd/C or Pt/C in deuterium oxide at a temperature of 200° C. or above, and in some cases, under a hydrogen atmosphere, for several hours to several tens of hours for the synthesis. When a position that is insufficiently deuterated by this method exists, a skeleton of the dye may be formed through synthesis from a deuterated raw material obtained by treatment at a raw material stage by using a catalyst such as Pd/C or Pt/C in deuterium oxide at a temperature of 200° C. or above, and in some cases, under a hydrogen atmosphere, for several hours to several tens of hours.

The blending amount of such a dye is desirably 0.1% by weight to 5% by weight relative to the reversible agent. If the blending amount is 0.1% by weight or less, sufficient absorption is not obtained, and it becomes difficult to observe a long-lived phosphorescence. Meanwhile, if the blending amount is 5% by weight or more, the dye are apt to aggregate, and less likely to emit a long-lived phosphorescence because of concentration quenching. Moreover, the matrix including the reversible agent and the amorphous-phase stabilizer is made more likely to crystallize.

If necessary, a photosensitizer may be added to the ordinary-temperature-phosphorescent organic material of the present invention. The quantum yield of long-lived phosphorescence of the dye used in the ordinary-temperature-phosphorescent organic material may be greatly increased by adding the photosensitizer. Suppose a case where the relationship between the photosensitizer and the dye satisfies conditions that the photosensitizer has an intersystem crossing efficiency of 0.5 or higher even at room temperature and that the lowest triplet excitation energy of the photosensitizer is greater than the lowest triplet excitation energy of the dye. In such a case, even when such a dye to be used is incapable of providing a strong long-lived phosphorescence because of a low intersystem crossing likelihood of the dye alone, the photosensitizer efficiently forms an excited triplet excited state, from which energy is efficiently transferred to the dye. Hence, an excited triplet excited state of the dye is formed. As a result, a strong and long-lived phosphorescence is achieved. Specific Examples of such a photosensitizer include benzophenone, diethyldiaminobenzophenone, 2-hydroxybenzophenone, 2-hydroxy-4-methoxybenzophenone, 2-hydroxy-4-methoxy-5-sulfobenzophenone, 2-hydroxy-4-n-octyloxybenzophenone, 2-hydroxy-4-n-dodecyloxybenzophenone, 2,4-dihydroxybenzophenone, 2,2'-dihydroxy-4,4'-dimethoxybenzophenone, 2,2'-dihydroxy-4-methoxybenzophenone, platinum(III)[2(4,6-difluorophenyl)pyridinato-N,$C^2$)-(acetyl-acetonate), iridium(III), bis(2-(4,6-difluorophenyl)pyridinato-N,$C^2$), tris(2-(2,4-difluorophenyl)pyridine)iridium(III), tris(2-phenylpyridine)iridium(III), iridium(III) tris(2-(4-totyl)pyridinato-N,$C^2$), bis (2-(9,9-dihexylfluorenyl)-1-pyridine) (acetylacetonate) iridium(III), and the like, but are not limited thereto.

The blending amount of such a photosensitizer is preferably 0.5% by weight to 10% by weight relative to the reversible agent. If the blending amount is 0.5% by weight or less, light is not absorbed efficiently, and a sensitizing effect is lowered. Meanwhile, if the blending amount is 10% by weight or more, the matrix including the reversible agent and the amorphous-phase stabilizer is made more likely to crystallize.

When the ordinary-temperature-phosphorescent organic material according to the present invention contains the amorphous-phase stabilizer, the ordinary-temperature-phosphorescent organic material in a solid state at or below a melting point may take two states of: an equilibrium state where a phase of the reversible agent and the amorphous-phase stabilizer is separated from a phase of an excessive part of the dye beyond equilibrium solubility; and a quasi-equilibrium or non-equilibrium state where the reversible agent incorporates the amorphous-phase stabilizer and the dye that are at or beyond equilibrium solubilities. The phosphorescence quantum yield and the phosphorescence lifetime differ between the two states. In other words, the aggregation state of the dye is reversibly controlled plenty of times by repeating processes of heating to mutually different two temperatures and cooling to room temperature, whereby On-Off of the long-lived phosphorescence is recordable. The information of the long-lived phosphorescence is easily checkable by observing an after image of the luminescence remaining after excitation light is irradiated and the irradiation is stopped. The information is nondestructively readable plenty of times (refer to FIG. 2). To put it differently, recording and deletion of long-lived phosphorescence portions may be performed by repeating a process of heating once to a temperature at or above the melting point of the reversible agent and then rapidly cooling to room temperature, and a process of heating to a temperature between the glass transition temperature of the reversible agent and the melting point thereof, both inclusive, and then cooling to room temperature.

Since the contrast of the above described On-Off of the long-lived-phosphorescence function by heat is improved by adding a leuco dye (hereinafter also referred to as an "electron-donating color-developing compound"), such an electron-donating color-developing compound may be added to the ordinary-temperature-phosphorescent organic material of the present invention, if necessary. Hereinafter, a mechanism of how the contrast is increased by adding the leuco dye will be described by using FIG. 3.

A part of the dye that is not well aggregated into the crystalline state in the reversible agent emits a long-lived phosphorescence, although the long-lived phosphorescence is very weak. Hence, the contrast is not sufficient in some cases. In such cases, the contrast may be increased in a manner that a colored product of the leuco dye deprives this non-aggregated dye of the energy. In a crystalline state, the leuco dye is extruded from the reversible agent because of the crystallization of the reversible agent, and is present with the amorphous-phase stabilizer. Because of a strong acidity of the phenol moiety of the amorphous-phase stabilizer, the leuco dye is in a colored state (a cationic state). Suppose a case where a leuco dye whose absorption spectrum in this colored state overlaps with a long-lived-phosphorescence spectrum of the dye is selected. In such a case, even when the non-aggregated part of the dye is excited, and is about to emit a long-lived phosphorescence, the leuco dye in the colored state removes the energy and quenches the long-lived phosphorescence. Meanwhile, in an amorphous state, a state is achieved where all the leuco dye, the amorphous-phase stabilizer, and the dye are dispersed in the reversible agent. Since the amorphous-phase stabilizer is dispersed, the acidity thereof does not exert strong effects on the surroundings. For this reason, the leuco dye is in a colorless state (a neutral state). Since an absorption spectrum of the leuco dye in the neutral state does not overlap with a long-lived-phosphorescence spectrum of the dye at all, the long-lived phosphorescence is less likely to be affected under the amorphous state. Since the leuco dye significantly demonstrates the quenching effect only in the crystalline state as described above, a higher contrast is achieved.

Regarding necessary characteristics of the electron-donating color-developing compound, firstly, in a weakly acidic state, an absorption wavelength band where the absorbance of the leuco dye in the colored state is 25% or more, preferably 50% or more, of a maximum absorbance needs to be partially overlapped with a luminescence wavelength band that is 25% or more, preferably 50% or more, of a maximum intensity of a phosphorescence spectrum of the dye and a phosphorescence spectrum of the photosensitizer.

Meanwhile, in the neutral state, an absorption wavelength band where the absorbance of the electron-donating color-developing compound in the colorless state is 25% or more, preferably 10% or more, of a maximum absorbance needs to be not overlapped with a luminescence wavelength band that is 25% or more, preferably 10% or more, of a maximum intensity of a phosphorescence spectrum of the dye and a phosphorescence spectrum of the photosensitizer.

Specific examples of such an electron-donating color-developing compound include 2-anilino-3-methyl-6-diethylaminofluoran, 2-anilino-3-methyl-6-di(n-butylamino)fluoran, 2-anilino-3-methyl-6-(N-n-propyl-N-methylamino) fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide-(3-1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, and the like.

Besides the above-described fluoran compounds and azaphthalide compounds, regarding the electron-donating color-developing compound used in the present invention, conventionally known electron-donating color-developing compounds may be used alone or as a mixture. Specific examples of such compounds include 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino) fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylanilino) fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N-methyl-2,4-dimethylanilino)fluoran, 2-ethylamino-6-(N-ethyl-2,4-dimethylanilino)fluoran, 2-dimethylamino-6-(N-methylanilino)fluoran, 2-dimethylamino-6-(N-ethylanilino) fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino) fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino) fluoran, 2-amino-6-(N-ethyl-p-chloroanilino)fluoran, 2-amino-6-(N-propyl-p-chloroanilino) fluoran, 1,2-benzo-6-(N-ethyl-N-isoamylamino)fluoran, 1,2-benzo-6-dibutylaminofluoran, 1,2-benzo-6-(N-methyl-N-cyclohexylamino) fluoran, 1,2-benzo-6-(N-ethyl-N-toluidino)fluoran, and others.

Moreover, other specific examples of the electron-donating color-developing compounds preferably used in the present invention are as follows: 2-anilino-3-methyl-6-(N-2-ethoxypropyl-N-ethylamino)fluoran, 2-(p-chloroanilino)-6-(N-n-octylamino)fluoran, 2-(p-chloroanilino)-6-(N-n-palmitylamino)fluoran, 2-(p-chloroanilino)-6-(di-n-octylamino) fluoran, 2-benzoylamino-6-(N-ethyl-p-toluidino)fluoran, 2-(o-methoxybenzoylamino)-6-(N-methyl-p-toluidino)fluoran, 2-dibenzylamino-4-methyl-6-diethylaminofluoran, 2-dibenzylamino-4-methoxy-6-(N-methyl-p-toluidino)fluoran, 2-(dibenzylamino-4-methyl-6-(N-ethyl-p-toluidino) fluoran, 2-(α-phenylethylamino)-4-methyl-6-diethylaminofluoran, 2-(p-toluidino)-3-(t-butyl)-6-(N-methyl-p-toluidino) fluoran, 2-(o-methoxycarbonylamino)-6-diethylaminofluoran, 2-acetylamino-6-(N-methyl-p-toluidino)fluoran, 4-methoxy-6-(N-ethyl-p-toluidino) fluoran, 2-ethoxyethylamino-3-chloro-6-dibutylaminofluoran, 2-dibenzylamino-4-chloro-6-(N-ethyl-p-toluidino)fluoran, 2-(α-phenylethylamino)-4-chloro-6-diethylaminofluoran, 2-(N-benzyl-p- trifluoromethylanilino)-4-chloro-6-diethylaminofluoran, 2-anilino-3-methyl-6-pyrrolidinofluoran, 2-anilino-3-chloro-6-pyrrolidinofluoran, 2-anilino-3-methyl-6-(N-ethyl-N-terahydrofurfurylamino)fluoran, 2-mesidino-4',5'-benzo-6-diethylaminofluoran, 2-(m-trifluoromethylanilino)-3-methyl-6-pyrrolidinofluoran, 2-(α-naphthylamino)-3,4-benzo-4'-bromo-6-(N-benzyl-N-cyclohexylamino)fluoran, 2-piperidino-6-diethylaminofluoran, 2-(N-n-propyl-p-trifluoromethylanilino)-6-morpholinofluoran, 2-(di-N-p-chlorophenyl-methylamino)-6-pyrrolidinofluoran, 2-(N-n-propyl-m-trifluoromethylanilino)-6-morpholinofluoran, 1,2-benzo-6-(N-ethyl-N-n-octylamino)fluoran, 1,2-benzo-6-diallylaminofluoran, 1,2-benzo-6-(N-ethoxyethyl-N-ethylamino)fluoran, benzoleuco methylene blue, 2-[3,6-bis (diethylamino)-7-(o-chloroanilino)xanthyl]benzoic acid lactam, 2-[3,6-(diethylamino)-9-(o-chloroanilino)xanthyl] benzoic acid lactam, 3,3-bis(p-dimethylaminophenyl)-phthalide, 3,3-bis(p-dimethylaminophenyl)-6-dimethylaminophthalide (also known as crystal violet lactone), 3,3-bis-(p-dimethylaminophenyl)-6-diethylaminophthalide, 3,3-bis-(p-dimethylaminophenyl)-6-chlorophthalide, 3,3-bis(p-dibutylaminophenyl)phthalide, 3-(2-methoxy-4-dimethylaminophenyl)-3-(2-hydroxy-4,5-dichlorophenyl) phthalide, 3-(2-hydroxy-4-dimethylaminophenyl)-3-(2-methoxy-5-chlorophenyl)phthalide, 3-(2-hydroxy-4-dimethoxyaminophenyl)-3-(2-methoxy-5-chlorophenyl) phthalide, 3-(2-hydroxy-4-dimethylaminophenyl)-3-(2-methoxy-5-nitrophenyl)phthalide, 3-(2-hydroxy-4-diethylaminophenyl)-3-(2-methoxy-5-methylphenyl) phthalide, 3-(2-methoxy-4-dimethylaminophenyl)-3-(2-hydroxy-4-chloro-5-methoxyphenyl)phthalide, 3,6-bis (dimethylamino)fluorenespiro(9,3')-6'-dimethylaminophthalide, 6'-chloro-8'-methoxy-benzoindolino-spiropyran, 6'-bromo-2'-methoxy-benzoindolino-spiropyran, and the like.

Moreover, a long-lived phosphorescent recording material capable of optical recording only a single time is obtainable by adding the electron-donating color-developing compound and a photoacid generator to the ordinary-temperature-phosphorescent organic material according to the present invention. As the photoacid generator, preferred is one having such a weak accepting property that the dye excited is not deprived of energy. Preferred is one having no absorbance at or above 350 nm corresponding to the wavelength region of visible light so that recorded state will not be changed by surrounding light at the time of being used under an ordinary bright environment. Specific examples of such a photoacid generator include 2-(3,4-dimethoxystyryl)-4,6-bis(trichloromethyl)-1,3,5-triazine, 2-(4-methoxyphenyl)-4,6-bis(trichloromethyl)-1,3,5-triazine, 2-[2-(5-methylfuran-2-yl)vinyl]-4,6-bis (trichloromethyl)-1,3,5-triazine, 2-[2-(furan-2-yl)vinyl]-4,6-bis(trichloromethyl)-1,3,5-triazine, diphenyliodonium hexafluoroarsenate, diphenyliodonium hexafluorophosphate, diphenyliodonium trifluoromethanesulfonate, tri-p-tolylsulfonium hexafluorophosphate, tri-p-tolylsulfonium trifluoromethanesulfonate, triphenylsulfonium tetrafluoroborate, and the like but are not limited thereto.

Owing to the introduction of the photoacid generator, protons are released from the photoacid generator only at positions irradiated with ultraviolet light of 350 nm or less. Then, at the positions, the leuco dye develops color, and deprives efficiently the dye of excitation energy. Thus, the long-lived-phosphorescence function is lost. Meanwhile, when positions not irradiated with ultraviolet light of 350 nm or less are irradiated with light of 350 nm or more, a long-lived photoluminescence is emitted from the positions. By irradiating, with light of 350 nm or more, the positions at which a long-lived photoluminescence is recorded, and the optical recording is nondestructively readable plenty of times.

When the electron-donating color-developing compound and moreover the photoacid generator are added to the ordinary-temperature-phosphorescent organic material of the present invention, the blending amount of the electron-donating color-developing compound is desirably 0.1% by weight to 1% by weight. If the blending amount is 0.1% by weight or less, the efficiently of energy transfer from the long-lived phosphorescent dye in the excited state to the electron-donating color-developing compound in the colored state is lowered also in a case of the colored state at the time of the crystallization. As a result, the Off characteristic of the long-lived phosphorescence becomes unsatisfactory. Meanwhile, if the blending amount is 1% by weight or more, the colored state of the material at the time of the crystallization becomes noticeable. As a result, difference between a recorded portion and a non-recorded portion becomes visually distinguishable even under a situation where no excitation light is irradiated. Accordingly, the application to the security field or other fields is not desirable. Meanwhile, the blending amount of the photoacid generator is desirably 0.1% by weight to 5% by weight. If the blending amount is 0.1% by weight or less, the efficiently of the acid generation by light irradiation is lowered, and a sufficient color development of the electron-donating color-developing compound is not achievable. Hence, energy is not efficiently transferable from the long-lived phosphorescent dye in the excited state to the electron-donating color-developing compound. Meanwhile, if the blending amount is 5% by weight or more, the system is apt to crystallize. As a result, the dye aggregates, resulting in a weak long-lived phosphorescence due to concentration quenching, and in a short lifetime of the long-lived phosphorescence. In addition, in a case where the photoacid generator itself has a highly movable moiety or a moiety with strong donating property or accepting property, addition at a high concentration of 5% by weight or more is not preferable because the long-lived triplet excited state achieved when the dye is excited is deactivated.

Moreover, if necessary, a photochromic compound may be added to the ordinary-temperature-phosphorescent organic material according to the present invention. The On-Off of the long-lived-phosphorescence function is reversibly switchable with light from the outside by photoisomerizing the added photochromic compound.

Hereinafter, by using FIG. 4, a principle of how the On-Off of the long-lived-phosphorescence function is made reversibly switchable with light from the outside with the material obtained by adding the photochromic compound will be described. When the photochromic compound is in a colorless state, there is no energy overlap between the absorption spectrum of the photochromic compound and a long-lived-phosphorescence spectrum of the long-lived phosphorescent dye. Hence, the long-lived phosphorescence is not inhibited. Here, when the photochromic compound is brought into the colored state by irradiation with ultraviolet light, a long-lived-phosphorescence spectrum of the long-lived phosphorescent dye overlaps with an absorption spectrum of the photochromic compound. As a result, even when the long-lived phosphorescent dye is excited and is about to emit a long-lived phosphorescence, the photochromic compound in the colored state removes the energy and quenches the long-lived phosphorescence. In order to re-emit the long-lived phosphorescence, it is only necessary that the photochromic compound should be brought into the colorless state by irradiation with visible light corresponding to the absorption wavelength of the photochromic compound in the colored state. By repeating this process, the intensity of the long-lived phosphorescence is controllable with light plenty of times. When the long-lived phosphorescence is read out, excitation light is irradiated. The excitation light should be selected to have a wavelength at which the photochromic compound in the colorless state and the photochromic compound in the colored state hardly absorb the light. For the above-described reason, when a diarylethene derivative is used as the photochromic compound, the excitation light is desirably selected to be at 350 nm to 400 nm, in general.

For the photochromic compound, an absorption wavelength band where the absorbance of the photochromic compound in the colored state is 25% or more, preferably 50% or more, of a maximum absorbance needs to be partially overlapped with a luminescence wavelength band that is 25% or more, preferably 50% or more, of a maximum intensity of a phosphorescence spectrum of the dye and a phosphorescence spectrum of the photosensitizer.

In addition, an absorption wavelength band where the absorbance of the photochromic compound in the colorless state is 25% or more, preferably 10% or more, of a maximum absorbance needs to be not partially overlapped with a luminescence wavelength band that is 25% or more, preferably 10% or more, of a maximum intensity of a phosphorescence spectrum of the dye and a phosphorescence spectrum of the photosensitizer.

As such a photochromic compound, particularly desirable is a compound whose isomerization does not proceed depending on temperature, but only by light, and desirable is a diarylethene derivative. Specific examples of the diarylethene derivative include 1,2-bis(2,4-dimethyl-5-phenyl-3-thienyl)-3,3,4,4,5,5-hexafluoro-1-cyclopentene, 1,2-bis[2-methylbenzo[b]thiophene-3-yl]-3,3,4,4,5,5-hexafluoro-1-cyclopentene, cis-1,2-dicyano-1,2-bis(2,4,5-trimethyl-3-thienyl)ethene, 1,2-bis(2-methyl-5-phenyl-3-thienyl)perfluorocyclopentene, 1,2-bis(5-methyl-2-phenylthiazole-4-yl)perfluorocyclopentene, 1,2-bis(3-methylbenzo[b]thiophene-2-yl)perfluorocyclopentene, and the like, but are not limited thereto.

Meanwhile, the blending amount of the photochromic compound is desirably 0.1% by weight to 10% by weight, both inclusive. If the blending amount is 0.1% by weight or less, the OFF function of the long-lived phosphorescence is less likely to be developed because of the following reasons. Specifically, when the photochromic compound is photoisomerized and brought into the colored state, the photochromic compound in the colored state is low in concentration. This accordingly makes it difficult for the photochromic compound to deprive the dye of energy from the triplet excitation energy. Meanwhile, if the blending amount is 10% by weight or more, the thermal mobility of the photochromic compound itself causes the deactivation of the triplet excited state of the dye. Hence, even when the photochromic compound is in the colorless sate, the long-lived phosphorescence tends to be weak and short.

Because of the use of the above-described photochromic compound, the photochromic compound develops the color only at positions that are irradiated with ultraviolet light, and efficiently deprives the dye of the excitation energy. Thus, the long-lived-phosphorescence function is lost. Accordingly, positions at which the long-lived phosphorescence occurs are recordable at will by using light. Moreover, for restoring the long-lived-phosphorescence function, the long-lived-phosphorescence function is restorable by irradiation with visible light for a long time. Hence, the long-lived-phosphorescence function is recordable reversibly.

Meanwhile, the ordinary-temperature-phosphorescent organic material according to the present invention may be formed into microcapsules, and then into an ink. Thus, an ink of the ordinary-temperature-phosphorescent organic material is obtainable. First, the microcapsule is generally formable by adding dropwise the material dissolved in an organic solvent to an aqueous solution of gelatin or the like, and then stirring the mixture while controlling temperature conditions and the like. Small capsules of approximately 1 μm are producible. The ink is generally formable by mixing the microcapsules with a polymer or a resin in a solvent, and then preparing a dispersion by using a ball mill, a paint shaker, or the like. In general, the solvent used for the ink is preferably a water-soluble solvent so that the material in the capsules will not leak into the solvent. The polymer or the resin is also desirably selected from those dissolvable in the solvent.

Next, a recording medium that uses the ordinary-temperature-phosphorescent organic material of the present invention will be described. The recording medium of the present invention is producible by providing the ordinary-temperature-phosphorescent organic material of the present invention to a base agent. For example, the recording medium is obtainable by providing the ordinary-temperature-phosphorescent organic material as a recording material onto a substrate, or by filling the ordinary-temperature-phosphorescent organic material as a recording material between substrates. Examples of the substrate used include paper, synthetic paper, a plastic film, a glass substrate, and the like. Meanwhile, when the ordinary-temperature-phosphorescent organic material is provided onto the substrate, or filled between the substrates, the ordinary-temperature-phosphorescent organic material may be held by using a binder resin or the like, if necessary. Moreover, when the ordinary-temperature-phosphorescent organic material of the present invention is provided as a recording material onto the substrate, a protective layer may be provided for impartment of a gas-barrier property, chemical resistance, water resistance, wear resistance, light resistance, and the like. Examples of the protective layer include coating films formed of a water-soluble polymer, an aqueous emulsion of a hydrophobic compound, a resin, and the like. When the ordinary-temperature-phosphorescent organic material is filled between plural substrates pre-formed with a gap therebetween, a recording medium is formable without forming an ink from the ordinary-temperature-phosphorescent organic material.

A recording medium that uses the ordinary-temperature-phosphorescent organic material of the present invention as a reversibly thermosensitive recording material may be formed, for example, by providing the ordinary-temperature-phosphorescent organic material to a porous film. With this, a recording medium may be formed without forming an ink from the reversibly thermosensitive recording material. For the porous film, paper, synthetic paper, a porous polymer film, or the like may be used, for example, although the porous film is not limited thereto. Moreover, as the porous film, a polymer film having no absorption in the visible region, or a porous film obtained by sintering oxide particles having no absorption in the visible region may be used. When paper is used as the porous film, a flexible and inexpensive medium may be formed.

Moreover, in the recording medium that uses the ordinary-temperature-phosphorescent organic material of the present invention as a reversibly thermosensitive recording material, plural reversibly thermosensitive recording material layers having different long-lived phosphorescent colors may be stacked on a substrate.

Meanwhile, in a reversibly thermosensitive recording medium of the present invention, a protective layer may be provided onto a recording layer formed of a thin film of a composition of the ordinary-temperature-phosphorescent organic material, from the viewpoints of improvement of durability of the recording layer, of prevention of sticking to a thermal printer head (TPH) for supplying thermal energy to the recording layer, and other viewpoints. Examples of materials for the protective layer include a wax, a thermoplastic resin, a thermosetting resin, a photo setting resin, a water-soluble resin, a latex, and the like. The thickness of the protective layer is preferably approximately 0.1 µm to 100 µm. Moreover, such a protective layer may be blended with a thermal release agent, a lubricant, a heat-resistant material, an antistatic agent, and the like, as appropriate. Specifically, a solution obtained by dissolving or dispersing the components as described above in a solvent is coated onto the recording layer, and then dried; thus, a protective layer is formable. Meanwhile, the protective layer may be formed by bonding a heat-resistant film to which an adhesive is applied in advance, to the recording layer by the dry lamination method. Meanwhile, for the purposes of improving adhesion of the substrate and the recording layer, improving solvent resistance thereof, and the like, an underlayer may be provided between the substrate and the recording layer. In general, an appropriate thickness of the recording layer in the recording medium of the present invention is approximately 0.5 µm to 20 µm.

No particular limitation is imposed on the above-described heat-resistant film, as long as the heat-resistant film has a heat deformation temperature at or above the melting point of the composition of the ordinary-temperature-phosphorescent organic material of the present invention, from which the recording material is formed. For example, usable are sheets of polymer compounds such as polyether ether ketones; polycarbonates; polyarylates; polysulfones; tetrafluoroethylene resins; tetrafluoroethylene copolymers including tetrafluoro-ethylene-perfluoroalkoxyethylene copolymers, tetrafluoroet-hylene-perfluoroalkyl vinyl ether copolymers, tetrafluoroet-hylene-hexafluoropropylene copolymers, tetrafluoroethylene-ethylene copolymers, and the like; trifluorochloroethylene resins; vinylidene fluoride resins; silicone resins; fluorine-containing polybenzoxazoles; polypropylenes; polyvinyl alcohols; polyvinylidene chlorides; polyesters including polyethylene terephthalate, polybutylene terephthalate, polyethylene naphthalate, and the like; polystyrenes; polyamides including nylon 66 and the like; polyimides; polyimide amides; polyethersulfones; polymethylpentenes; polyetherimides; polyurethanes; and polybutadienes. These may be selected for use as appropriate in accordance with heat source, the application of the thermosensitive recording medium, the form thereof, and the like. Examples of the above-described adhesive include those generally used for the dry lamination method, such as acrylic resins; phenoxy resins; ionomer resins; ethylene copolymers such as ethylene-vinyl acetate copolymers, ethylene-acrylic acid-maleic anhydride copolymers; polyvinyl ethers; polyvinyl formals; polyvinyl butyrals; gelatin; gum arabic; polyesters; styrene copolymers such as polystyrenes and styrene-acrylic acid copolymers; vinyl acetate resins; polyurethanes; xylene resins; epoxy resins; phenol resins; urea resins; and the like. In order to perform recording and deletion based on the crystalline-amorphous transition or the change in phase separation state of the thermosensitive recording medium of the present invention, two values of thermal energy with mutually different magnitudes are supplied, or two kinds of thermal hysteresis are supplied between which the cooling rates after heating to or above the melting point Tm are mutually different, as described above.

Moreover, the reversibly thermosensitive recording medium of the present invention may be provided with a layer containing an infrared absorber. This layer may be stacked on the thermosensitive recording layer. As the infrared absorber, preferable is an infrared absorber having no region that is 25% or more of a maximum absorbance at 400 nm to 700 nm or less.

When the layer containing the infrared absorber is provided, the long-lived-phosphorescence function of a reversibly thermosensitive recording layer is developable by heating predetermined positions of the recording medium to the melting point of the reversible agent with an infrared laser, and then cooling the recording medium. Meanwhile, the long-lived-phosphorescence function of the reversibly thermosensitive recording layer may be deleted by heating positions different from the predetermined positions to the crystallization temperature of the reversible agent with an infrared laser, and then cooling the recording medium. This may results in the efficient and local heating of the medium by using an infrared laser without contact with a thermal head. Thus, a reversibly thermosensitive recording medium optimum for high-density recording may be obtained.

For supplying thermal energy at the time of recording, a heat source such as a thermal head (for example, TPH), or laser light is preferably used. Among these, the thermal head may heat the thermosensitive recording medium over a wide area, although the resolution is not so high. Moreover, the thermal head is advantageous in terms of the size reduction of a device. Meanwhile, laser light is preferable in terms of easiness of dealing with high-density recording by employing a smaller spot diameter, and in terms of acceleration of the rate of the recording and deletion. Note that, when laser light is used, it is desirable to provide a light absorption layer having an absorption band at a wavelength of the laser light or to blend the composition with a compound having an absorption band at a wavelength of the laser light, because the laser light is efficiently absorbed by even a highly transparent amorphous composition. For supplying the thermal energy at the time of deletion, it is preferable to use a heat source of the hot stamp method, the hot roll method, or the like, which heats the entire thermosensitive recording medium at once. Since both a highly heat-resistant negative recording medium and a relatively low-heat-resistant positive recording medium are included in the present invention at this time, the deletion is preferably performed at a temperature lower than the melting point of the positive recording medium by 30° C. or more. When the heated thermosensitive recording medium is cooled, natural cooling may be employed, but the heated thermosensitive recording medium is preferably rapidly cooled by using a cold stamp, a cold roll, a cold air flow or a Peltier element. Furthermore, overwrite recording may be achieved with the thermosensitive recording medium of the present invention by using thermal heads or laser light outputs having different energies.

EXAMPLES

Next, the present invention will be described in further details by way of Examples.

Test of Difference in Matrix

Example 1

A powder sample was obtained by blending 1.0 part by weight of a long-lived phosphorescent dye (1) having a structure of the following Chemical Formula 1 as the dye, 200 parts by weight of a reversible agent (1) having a structure of the following Chemical Formula 2 as the reversible agent, and 20 parts by weight of an amorphous-phase stabilizer (1) having a structure of the following Chemical Formula 3 as the amorphous-phase stabilizer. Then, the obtained powder sample was once heated to 180° C., and the reversible agent was melted. Thus, the other compounds were dissolved in the reversible agent. Then, this sample in a liquid state at 180° C. was filled by capillarity between two glass plates with a gap of 1 mm therebetween. Thereafter, rapid cooling was performed to room temperature. Then, one of the glass substrates was detached, and the solidified material was taken out. Thus, an ordinary-temperature-phosphorescent organic material was obtained. Regarding a long-lived-phosphorescence quantum yield of this material at room temperature in air, the quantum yield of long-lived phosphorescence was measured by using a luminescence spectrometer FP6500 with the function extended by an integrating sphere IS513, manufactured by JASCO Corporation. In addition, in order to observe an effect of oxygen, a long-lived-phosphorescence quantum yield at room temperature under vacuum was measured as follows. Specifically, the sample was placed in an optistat DN-V manufactured by Oxford Instruments plc, and the long-lived-phosphorescence intensity in air and the long-lived-phosphorescence intensity at the time of vacuum evacuation were compared with each other for determining the long-lived-phosphorescence quantum yield. Moreover, a lifetime of long-lived phosphorescence and a long-lived-phosphorescence spectrum at room temperature were measured as follows. Specifically, excitation light that corresponded to the absorption wavelength of the dye and that had a bandwidth of 10 nm was selected by passing light from a xenon lamp through a diffraction grating. Then, the excitation light was irradiated for approximately 10 seconds. The time at which the irradiation was stopped was taken as 0 seconds. The afterglow that the material continued to emit after the stop was detected every 0.02 seconds by using a multi-light photomultiplier tube manufactured by Otsuka Electronics Co., Ltd., as the change with time of the luminescence spectrum.

[Chemical Formula 1]

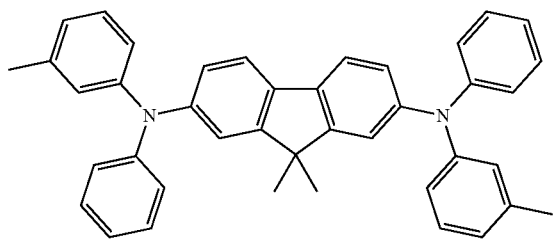

[Chemical Formula 2]

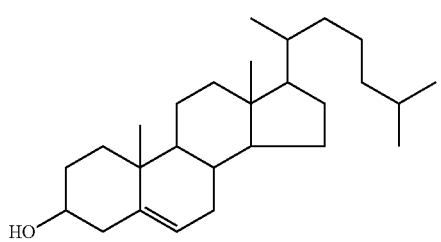

[Chemical Formula 3]

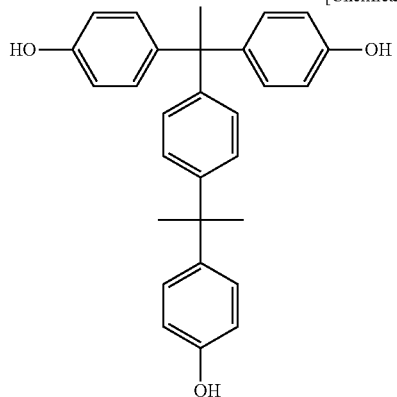

Example 2

A sample was prepared, and measured for the various values, in a similar manner to that of Example 1, except that a reversible agent (2) having a structure of the following Chemical Formula 4 was used as the reversible agent, and that the temperature of heating at the time of the preparation of the sample was 230° C.

[Chemical Formula 4]

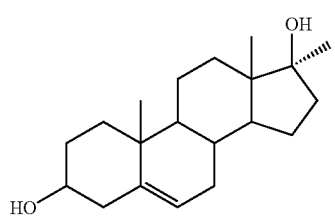

Example 3

A sample was prepared, and measured for the various values in a similar manner to that of Example 1, except that an amorphous-phase stabilizer (2) having a structure of the following Chemical Formula 5 was used as the amorphous-phase stabilizer.

[Chemical Formula 5]

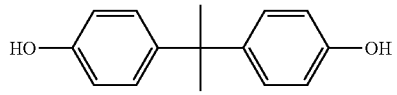

Example 4

A sample was prepared, and measured for the various values in a similar manner to that of Example 1, except that an amorphous-phase stabilizer (3) having a structure of the following Chemical Formula 6 was used as the amorphous-phase stabilizer.

[Chemical Formula 6]

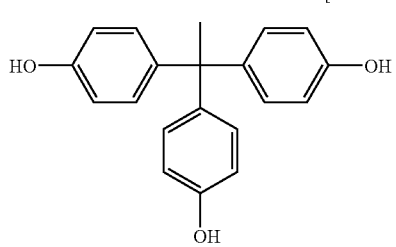

Example 5

A sample was prepared, and measured for the various values in a similar manner to that of Example 1, except that an amorphous-phase stabilizer (4) having a structure of the following Chemical Formula 7 was used as the amorphous-phase stabilizer.

[Chemical Formula 7]

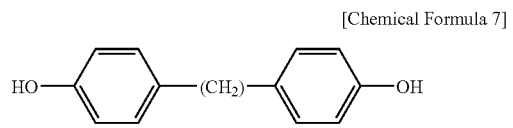

Example 6

A sample was prepared, and measured for the various values in a similar manner to that of Example 1, except that a reversible agent (3) having a structure of the following Chemical Formula 8 was used as the reversible agent, and that the temperature at the time of the preparation of the sample was 200° C.

[Chemical Formula 8]

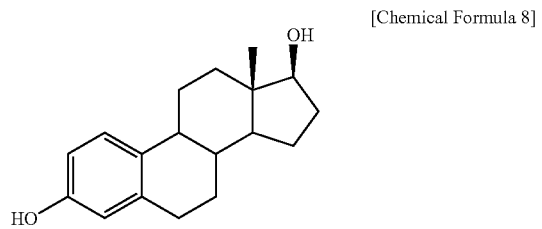

Example 7

A sample was prepared, and measured for the various values in a similar manner to that of Example 1, except that no amorphous-phase stabilizer was used in Example 6.

Example 8

A sample was prepared, and measured for the various values in a similar manner to that of Example 1, except that no amorphous-phase stabilizer was used.

Example 9

A sample was prepared, and measured for the various values in a similar manner to that of Example 1, except that no amorphous-phase stabilizer was used in Example 2.

Comparative Example 1

In 5 ml of dichloroethane, 1.0 part by weight of the long-lived phosphorescent dye (1) having the structure of Chemical Formula 1 and 220 parts by weight of polymethyl methacrylate (hereinafter referred to as "PMMA") were dissolved. Then, a thin film of several μm was formed on a glass substrate by the spin coating method. Thereafter, the solvent was removed by performing drying in a vacuum oven under an environment of 10 mmHg at room temperature for 24 hours. Regarding a long-lived-phosphorescence quantum yield of this material at room temperature in air, the quantum yield of long-lived phosphorescence was measured by using a luminescence spectrometer FP6500 with the function extended by an integrating sphere IS513, manufactured by JASCO Corporation. In addition, in order to observe an effect of oxygen, a long-lived-phosphorescence quantum yield at room temperature under vacuum was measured as follows. Specifically, the sample was placed in an optistat DN-V manufactured by Oxford Instruments plc, and the long-lived-phosphorescence intensity in air and the long-lived-phosphorescence intensity at the time of vacuum evacuation were compared with each other for determining the long-lived-phosphorescence quantum yield. Moreover, a lifetime of long-lived phosphorescence and a long-lived-phosphorescence spectrum at room temperature were measured as follows. Specifically, excitation light that corresponded to the absorption wavelength of the dye and that had a bandwidth of 10 nm was selected by passing light from a xenon lamp through a diffraction grating. Then, the excitation light was irradiated for approximately 10 seconds. The time at which the irradiation was stopped was taken as 0 seconds. The afterglow that the material continued to emit after the stop was detected every 0.02 seconds by using a multi-light photomultiplier tube manufactured by Otsuka Electronics Co., Ltd., as the change with time of the luminescence spectrum.

Comparative Example 2

A sample was prepared, and measured in a similar manner to that of Comparative Example 1, except that polycarbonate (hereinafter referred to as "PC") was used instead of PMMA.

Comparative Example 3

A sample was prepared, and measured in a similar manner to that of Comparative Example 1, except that a polyvinyl chloride-vinyl acetate copolymer (vinyl chloride moiety:vinyl acetate moiety=9:1 by weight) (hereinafter referred to as "PVC-PVAc") was used instead of PMMA.

Comparative Example 4

In 5 ml of a solution containing polyamic acid, 1.0 part by weight of the long-lived phosphorescent dye (1) having the structure of Chemical Formula 1 was dissolved. Then, a thin film of several μm was formed on a glass substrate by the spin coating method. Thereafter, drying was performed by heating at 180° C. for 1 hour in a vacuum oven. Thus, a sample in which a TP-Flu-TP was dispersed in polyimide was formed. A long-lived-phosphorescence quantum yield of the material at room temperature in air was measured by using a luminescence spectrometer FP6500 with the function extended by an integrating sphere IS513, manufactured by JASCO Corporation. In addition, in order to observe an effect of oxygen, a long-lived-phosphorescence quantum yield at room temperature under vacuum was measured as follows. Specifically, the sample was placed in an optistat DN-V manufactured by Oxford Instruments plc, and the long-lived-phosphorescence intensity in air and the long-lived-phosphorescence intensity at the time of vacuum evacuation were compared with each other for determining the long-lived-phosphorescence quantum yield. Moreover, a lifetime of long-lived phosphorescence and a long-lived-phosphorescence spectrum at room temperature were measured as follows. Specifically, excitation light that correspond to the absorption wavelength of the dye and that had a bandwidth of 10 nm was selected by passing light from a xenon lamp through a diffraction grating. Then, the excitation light was irradiated for approximately 10 seconds. The time at which the irradiation was stopped was taken as 0 seconds. The afterglow that the material continued to emit was detected every 0.02 seconds by using a multi-light photomultiplier tube manufactured by Otsuka Electronics Co., Ltd., as the change with time of the luminescence spectrum. An intersystem crossing efficiency was calculated by comparing the intensities of the long-lived phosphorescence between 298 K and 77 K, on an assumption that the thermal deactivation rate of the triplet state at 77 K was 0.

Table 1 shows the results of the long-lived-phosphorescence quantum yield, the lifetime of the long-lived phosphorescence, the emission peak wavelength of the long-lived phosphorescence, and the intersystem crossing yield, in air and under vacuum, as the result of (Examples 1 to 9 and Comparative Examples 1 to 4).

TABLE 1

| Example | Dye Structure | Matrix Reversible agent | Amorphous-phase controlling agent | In air/ Under vacuum | Long-lived Phosphorescence quantum yield $\Phi$RTP (at room temperature) | Lifetime of Long-lived Phosphorescence $\tau^T$ (at room temperature) | RTPmax (nm) |
|---|---|---|---|---|---|---|---|
| Example 1 | Long-lived phosphorescent dye (1) | Reversible agent (1) | Amorphous-phase controlling agent (1) | In air Under vacuum | 0.09 0.09 | 1.02 1.03 | 509 510 |
| Example 2 | Long-lived phosphorescent dye (1) | Reversible agent (2) | Amorphous-phase controlling agent (1) | In air Under vacuum | 0.08 0.08 | 0.89 0.91 | 508 510 |
| Example 3 | Long-lived phosphorescent dye (1) | Reversible agent (1) | Amorphous-phase controlling agent (2) | In air Under vacuum | 0.08 0.08 | 0.81 0.81 | 508 511 |
| Example 4 | Long-lived phosphorescent dye (1) | Reversible agent (1) | Amorphous-phase controlling agent (3) | In air Under vacuum | 0.10 0.10 | 1.12 1.21 | 509 509 |
| Example 5 | Long-lived phosphorescent dye (1) | Reversible agent (1) | Amorphous-phase controlling agent (4) | In air Under vacuum | 0.09 0.09 | 1.13 1.14 | 510 510 |
| Example 6 | Long-lived phosphorescent dye (1) | Reversible agent (3) | Amorphous-phase controlling agent (1) | In air Under vacuum | 0.10 0.10 | 1.12 1.11 | 510 509 |
| Example 7 | Long-lived phosphorescent dye (1) | Reversible agent (3) | | In air Under vacuum | 0.10 0.10 | 1.20 1.25 | 509 510 |
| Example 8 | Long-lived phosphorescent dye (1) | Reversible agent (1) | | In air Under vacuum | 0.007 0.008 | 0.47 0.66 | 512 513 |
| Example 9 | Long-lived phosphorescent dye (1) | Reversible agent (2) | | In air Under vacuum | 0.006 0.006 | 0.44 0.54 | 513 518 |
| Comparative Example 1 | Long-lived phosphorescent dye (1) | | PMMA | In air Under vacuum | 0 0.02 | $0.6 \times 10^{-3}$ 0.61 | — 510 |
| Comparative Example 2 | Long-lived phosphorescent dye (1) | | PC | In air Under vacuum | 0 0.03 | $1.1 \times 10^{-3}$ 0.79 | — 511 |
| Comparative Example 3 | Long-lived phosphorescent dye (1) | | PVC-PVAc | In air Under vacuum | 0 0.01 | $0.9 \times 10^{-3}$ 0.36 | — 512 |
| Comparative Example 4 | Long-lived phosphorescent dye (1) | | PI | In air Under vacuum | 0 0 | $<10^{-7}$ $<10^{-7}$ | — — |

As shown in Table 1, when a dye having a long triplet-excited-state lifetime at 77 K is dispersed in a reversible agent or in a reversible agent with an amorphous-phase stabilizer as in Examples 1 to 9, a high long-lived-phosphorescence quantum yield and a long lifetime of long-lived phosphorescence are achieved even at room temperature in air. Meanwhile, when a dye having a long triplet-excited-state lifetime at 77 K is dispersed in an ordinary amorphous polymer matrix or the like as in Comparative Examples 1 to 4, the triplet-excited-state lifetime is shortened to a millisecond level at room temperature in air. As a result, the quantum yield of the long-lived phosphorescence approaches 0, and no long-lived phosphorescence is observed. This is because an ordinary matrix at room temperature in air contains oxygen, and the oxygen immediately deprives the dye of the long-lived excited state energy. It is understandable that, with such an ordinary amorphous matrix, the long-lived-phosphorescence quantum yield is lower, and the lifetime of long-lived phosphorescence is shorter at room temperature than at 77 K, even under a vacuum state. This indicates that the thermal mobility of the matrix is high at ordinary temperature. Hence, the long-lived triplet excited state of the dye is quenched because of motion resulting in collision with the dye.

Meanwhile, with a matrix including a reversible agent or a reversible agent with an amorphous-phase stabilizer, a long-lived-phosphorescence quantum yield and a lifetime of long-lived phosphorescence similar to those at 77 K are achieved not only under vacuum, but also in air, at room temperature. This indicates that because the thermal mobility of the matrix including the reversible agent or the reversible agent with the amorphous-phase stabilizer is low at room temperature, and moreover because there is a characteristic that the rapid cooling from a temperature at or above the melting point to room temperature results in the release of oxygen from the matrix to the outside of the system. As a result, the long lifetime of long-lived phosphorescence is not quenched when the dye is excited. Moreover, as in Examples 8 and 9, many reversible agents have different rates of the crystallization, and are subjected to the crystallization during a cooling process, no matter how rapid the reversible agents are cooled from a temperature at or above the melting point to a temperature at or below a Tg. When the reversible agent crystallizes, the crystallization induces the dye to aggregate. Hence, a long-lived phosphorescence is not emitted any more because of concentration quenching. Meanwhile, when both a hydroxyl group and a phenol moiety are contained in each molecule formed of cyclo rings, strong hydrogen bonding is apt to be formed. This hydrogen bonding force tends to prevent the crystallization. As a result, the rate of the crystallization becomes slow, and an amorphous phase is more easily formed (as in the case of Example 7). In this connection, as is apparent from comparison of Examples 1 and 2, with Examples 8 and 9, when a reversible agent having a hydroxyl group but no phenol group contains a small amount of an amorphous-phase stabilizer having plural phenol groups, the reversible agent may be amorphous. As a result, a longer lifetime of long-lived phosphorescence and a higher long-lived-phosphorescence quantum yield are achieved in Examples 1 and 2.

Appropriate Structure of Dye

Example 10

A sample was prepared, and measured for the various values in a similar manner to that of Example 1, except that the dye used was one having a structure of the following Chemical Formula 9 in Example 7.

[Chemical Formula 9]

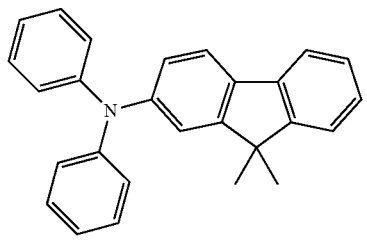

Example 11

A sample was prepared, and measured for the various values in a similar manner to that of Example 1, except that the dye used was one having a structure of the following Chemical Formula 10 in Example 7.

[Chemical Formula 10]

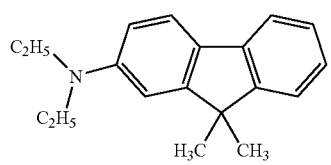

Example 12

A sample was prepared, and measured for the various values in a similar manner to that of Example 1, except that the dye used was one having a structure of the following Chemical Formula 11 in Example 7.

[Chemical Formula 11]

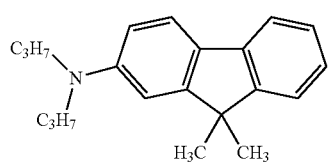

Example 13

A sample was prepared, and measured for the various values in a similar manner to that of Example 1, except that the dye used was one having a structure of the following Chemical Formula 12 in Example 7.

[Chemical Formula 12]

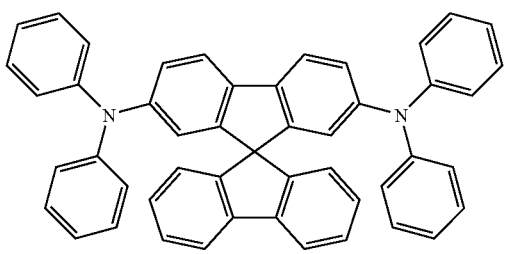

Example 14

A sample was prepared, and measured for the various values in a similar manner to that of Example 1, except that the dye used was one having a structure of the following Chemical Formula 13 in Example 7.

[Chemical Formula 13]

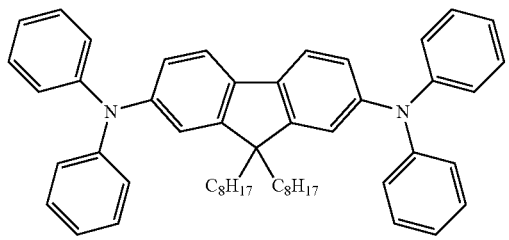

Example 15

A sample was prepared, and measured for the various values in a similar manner to that of Example 1, except that the dye used was one having a structure of the following Chemical Formula 14 in Example 7.

[Chemical Formula 14]

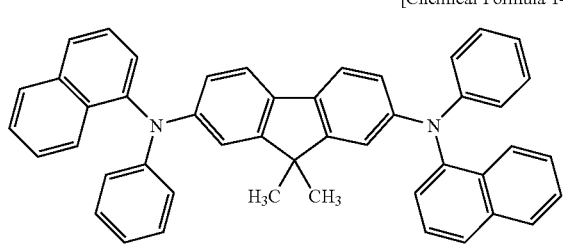

Example 16

A sample was prepared, and measured for the various values in a similar manner to that of Example 1, except that the dye used was one having a structure of the following Chemical Formula 15 in Example 7.

[Chemical Formula 15]

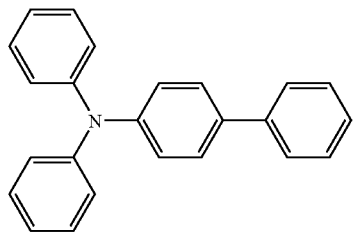

Example 17

A sample was prepared, and measured for the various values in a similar manner to that of Example 1, except that the dye used was one having a structure of the following Chemical Formula 16 in Example 7.

[Chemical Formula 16]

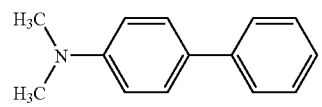

Example 18

A sample was prepared, and measured for the various values in a similar manner to that of Example 1, except that the dye used was one having a structure of the following Chemical Formula 17 in Example 7.

[Chemical Formula 17]

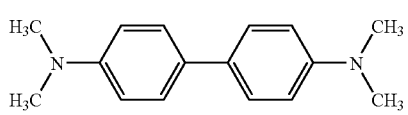

Example 19

A sample was prepared, and measured for the various values in a similar manner to that of Example 1, except that the dye used was one having a structure of the following Chemical Formula 18 in Example 7.

[Chemical Formula 18]

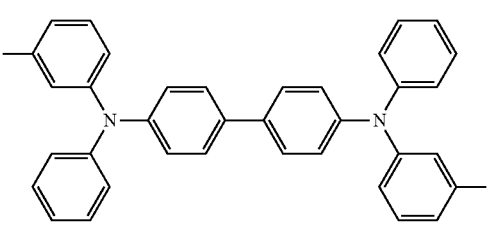

Example 20

A sample was prepared, and measured for the various values in a similar manner to that of Example 1, except that the dye used was, one having a structure of the following Chemical Formula 19 in Example 7.

[Chemical Formula 19]

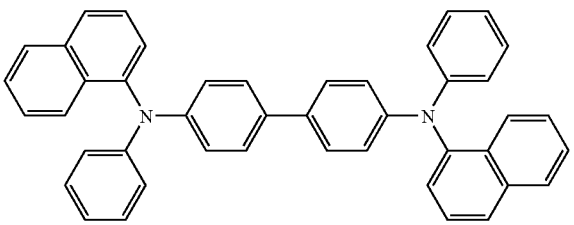

Example 21

A sample was prepared, and measured for the various values in a similar manner to that of Example 1, except that the dye used was one having a structure of the following Chemical Formula 20 in Example 7.

[Chemical Formula 20]

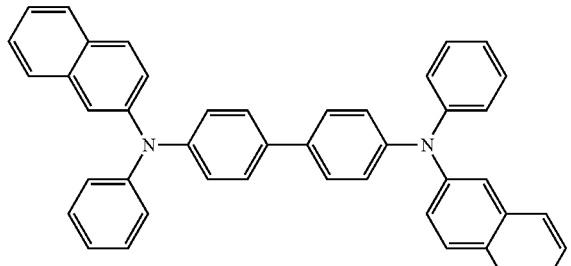

Example 22

A sample was prepared, and measured for the various values in a similar manner to that of Example 1, except that the dye used was one having a structure of the following Chemical Formula 21 in Example 7.

[Chemical Formula 21]

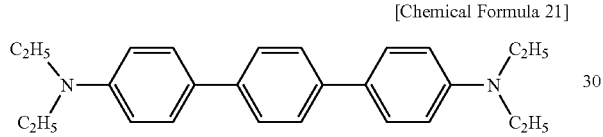

Example 23

A sample was prepared, and measured for the various values in a similar manner to that of Example 1, except that the dye used was one having a structure of the following Chemical Formula 22 in Example 7.

[Chemical Formula 22]

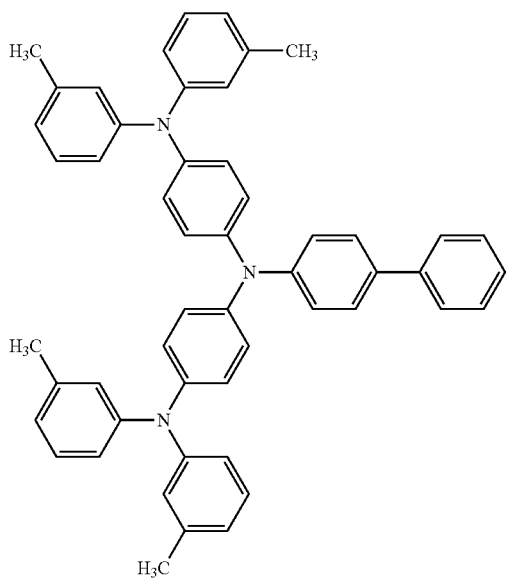

Example 24

A sample was prepared, and measured for the various values in a similar manner to that of Example 1, except that the dye used was one having a structure of the following Chemical Formula 23 in Example 7.

[Chemical Formula 23]

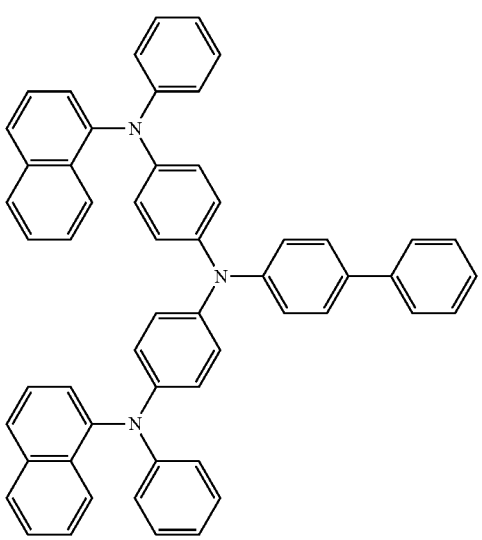

Example 25

A sample was prepared, and measured for the various values in a similar manner to that of Example 1, except that the dye used was one having a structure of the following Chemical Formula 24 in Example 7.

[Chemical Formula 24]

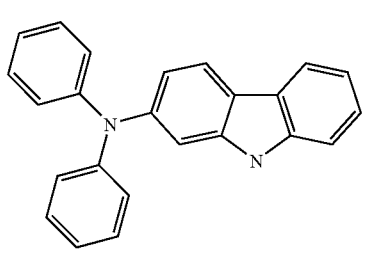

Example 26

A sample was prepared, and measured for the various values in a similar manner to that of Example 1, except that the dye used was one having a structure of the following Chemical Formula 25 in Example 7.

[Chemical Formula 25]

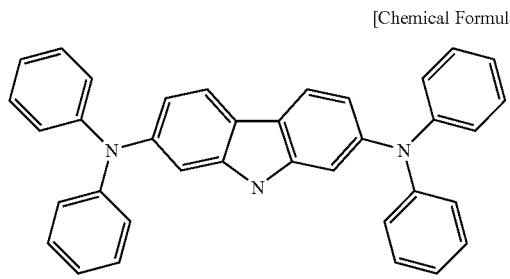

Example 27

A sample was prepared, and measured for the various values in a similar manner to that of Example 1, except that the dye used was one having a structure of the following Chemical Formula 26 in Example 7.

[Chemical Formula 26]

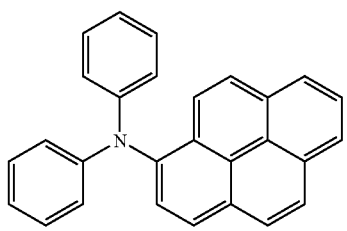

Example 28

A sample was prepared, and measured for the various values in a similar manner to that of Example 1, except that the dye used was one having a structure of the following Chemical Formula 27 in Example 7.

[Chemical Formula 27]

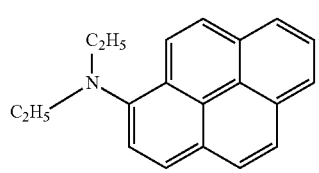

Example 29

A sample was prepared, and measured for the various values in a similar manner to that of Example 1, except that the dye used was one having a structure of the following Chemical Formula 28 in Example 7.

[Chemical Formula 28]

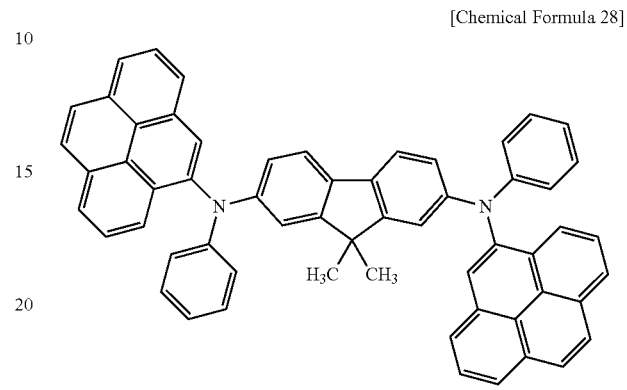

Example 30

A sample was prepared, and measured for the various values in a similar manner to that of Example 1, except that the dye used was one having a structure of the following Chemical Formula 29 in Example 7.

[Chemical Formula 29]

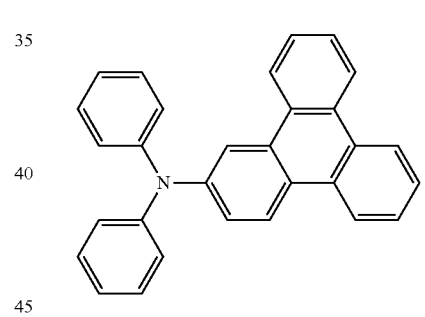

Example 31

A sample was prepared, and measured, for the various values in a similar manner to that of Example 1, except that the dye used was one having a structure of the following Chemical Formula 30 in Example 7.

[Chemical Formula 30]

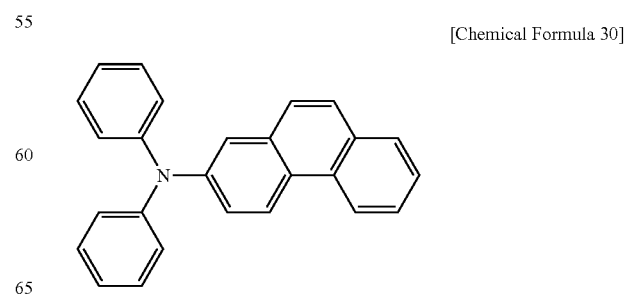

Example 32

A sample was prepared, and measured for the various values in a similar manner to that of Example 1, except that the dye used was one having a structure of the following Chemical Formula 31 in Example 7.

[Chemical Formula 31]

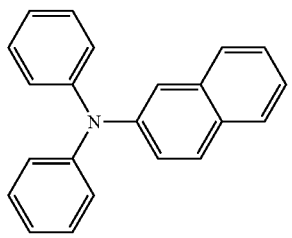

Example 33

A sample was prepared, and measured for the various values in a similar manner to that of Example 1, except that the dye used was one having a structure of the following Chemical Formula 32 in Example 7.

[Chemical Formula 32]

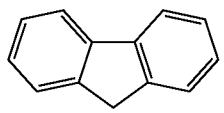

Example 34

A sample was prepared, and measured for the various values in a similar manner to that of Example 1, except that the dye used was one having a structure of the following Chemical Formula 33 in Example 7.

[Chemical Formula 33]

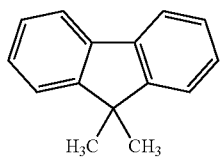

Example 35

A sample was prepared, and measured for the various values in a similar manner to that of Example 1, except that the dye used was one having a structure of the following Chemical Formula 34 in Example 7.

[Chemical Formula 34]

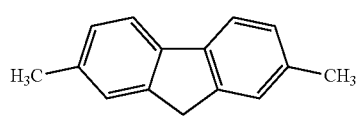

A sample was prepared, and measured for the various values in a similar manner to that of Example 1, except that the dye used was one having a structure of the following Chemical Formula 35 in Example 7.

[Chemical Formula 35]

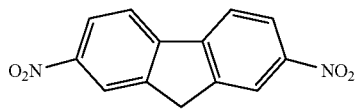

A sample was prepared, and measured for the various values in a similar manner to that of Example 1, except that the dye used was one having a structure of the following Chemical Formula 36 in Example 7.

[Chemical Formula 36]

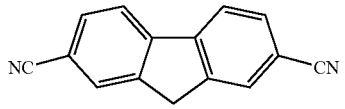

Example 36

A sample was prepared, and measured for the various values in a similar manner to that of Example 1, except that the dye used was one having a structure of the following Chemical Formula 37 in Example 7.

[Chemical Formula 37]

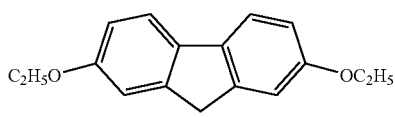

Example 37

A sample was prepared, and measured for the various values in a similar manner to that of Example 1, except that the dye used was one having a structure of the following Chemical Formula 38 in Example 7.

[Chemical Formula 38]

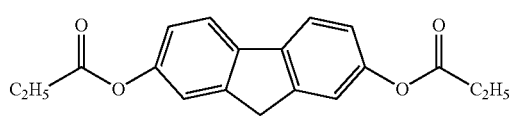

Example 38

A sample was prepared, and measured for the various values in a similar manner to that of Example 1, except that the dye used was one having a structure of the following Chemical Formula 39 in Example 7.

[Chemical Formula 39]

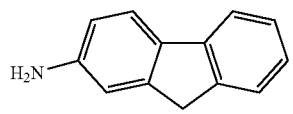

Example 39

A sample was prepared, and measured for the various values in a similar manner to that of Example 1, except that the dye used was one having a structure of the following Chemical Formula 40 in Example 7.

[Chemical Formula 40]

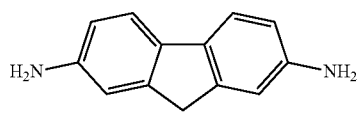

Example 40

A sample was prepared, and measured for the various values in a similar manner to that of Example 1, except that the dye used was one having a structure of the following Chemical Formula 41 in Example 7.

[Chemical Formula 41]

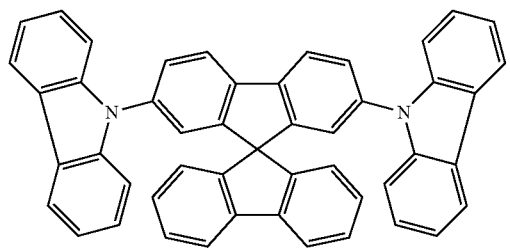

A sample was prepared, and measured for the various values in a similar manner to that of Example 1, except that the dye used was one having a structure of the following Chemical Formula 42 in Example 7.

[Chemical Formula 42]

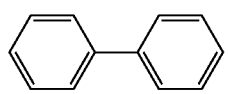

Example 41

A sample was prepared, and measured for the various values in a similar manner to that of Example 1, except that the dye used was one having a structure of the following Chemical Formula 43 in Example 7.

[Chemical Formula 43]

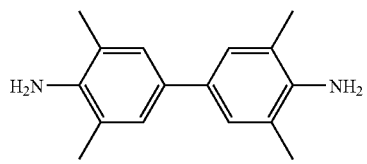

Example 42

A sample was prepared, and measured for the various values in a similar manner to that of Example 1, except that the dye used was one having a structure of the following Chemical Formula 44 in Example 7.

[Chemical Formula 44]

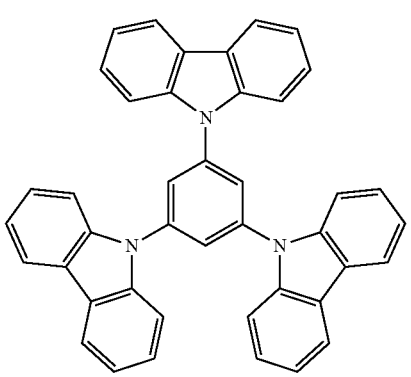

Example 43

A sample was prepared, and measured for the various values in a similar manner to that of Example 1, except that the dye used was one having a structure of the following Chemical Formula 45 in Example 7.

[Chemical Formula 45]

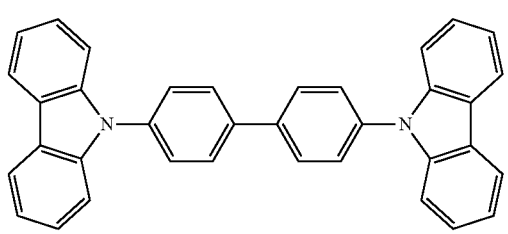

Example 44

A sample was prepared, and measured for the various values in a similar manner to that of Example 1, except that the dye used was one having a structure of the following Chemical Formula 46 in Example 7.

[Chemical Formula 46]

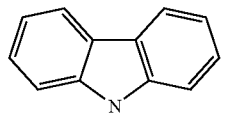

Example 45

A sample was prepared, and measured for the various values in a similar manner to that of Example 1, except that the dye used was one having a structure of the following Chemical Formula 47 in Example 7.

[Chemical Formula 47]

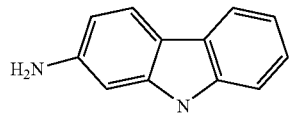

Example 46

A sample was prepared, and measured for the various values in a similar manner to that of Example 1, except that the dye used was one having a structure of the following Chemical Formula 48 in Example 7.

[Chemical Formula 48]

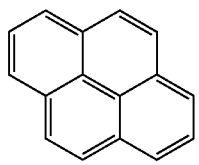

Example 47

A sample was prepared, and measured for the various values in a similar manner to that of Example 1, except that the dye used was one having a structure of the following Chemical Formula 49 in Example 7.

[Chemical Formula 49]

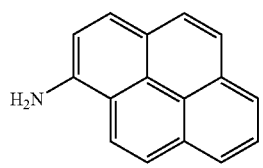

Example 48

A sample was prepared, and measured for the various values in a similar manner to that of Example 1, except that the dye used was one having a structure of the following Chemical Formula 50 in Example 7.

[Chemical Formula 50]

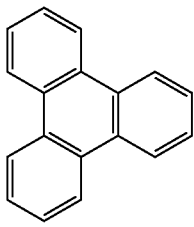

Example 49

A sample was prepared, and measured for the various values in a similar manner to that of Example 1, except that the dye used was one having a structure of the following Chemical Formula 51 in Example 7.

[Chemical Formula 51]

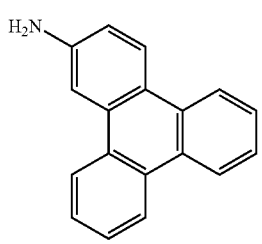

A sample was prepared, and measured for the various values in a similar manner to that of Example 1, except that the dye used was one having a structure of the following Chemical Formula 52 in Example 7.

[Chemical Formula 52]

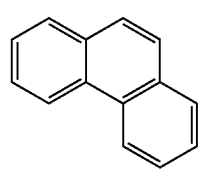

Example 50

A sample was prepared, and measured for the various values in a similar manner to that of Example 1, except that the dye used was one having a structure of the following Chemical Formula 53 in Example 7.

[Chemical Formula 53]

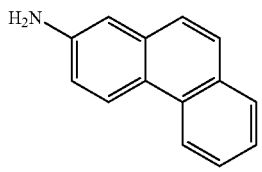

Comparative Example 5

A sample was prepared, and measured for the various values in a similar manner to that of Example 1, except that the dye used was one having a structure of the following Chemical Formula 54 in Example 7.

[Chemical Formula 54]

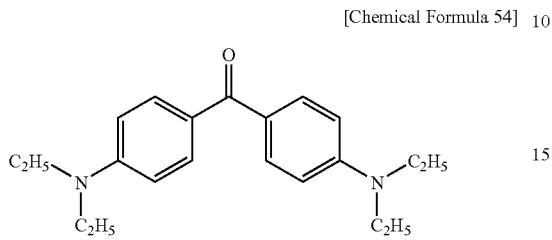

Comparative Example 6

A sample was prepared, and measured for the various values in a similar manner to that of Example 1, except that the dye used was one having a structure of the following Chemical Formula 55 in Example 7.

[Chemical Formula 55]

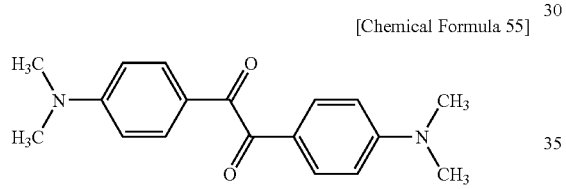

Comparative Example 7

A sample was prepared, and measured for the various values in a similar manner to that of Example 1, except that the dye used was one having a structure of the following Chemical Formula 56 in Example 7.

[Chemical Formula 56]

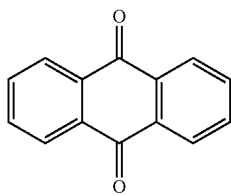

Example 51

A sample was prepared, and measured for the various values in a similar manner to that of Example 1, except that the dye used was one having a structure of the following Chemical Formula 57 in Example 7.

[Chemical Formula 57]

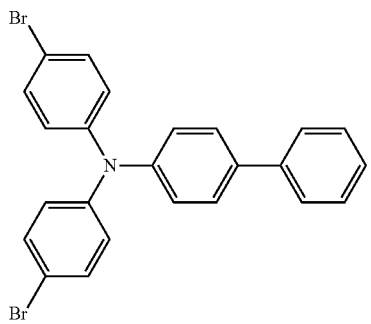

Example 52

A sample was prepared, and measured for the various values in a similar manner to that of Example 1, except that the dye used was one having a structure of the following Chemical Formula 58 in Example 7.

[Chemical Formula 58]

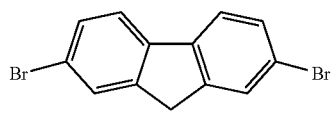

Comparative Example 8

A sample was prepared, and measured for the various values in a similar manner to that of Example 1, except that the dye used was one having a structure of the following Chemical Formula 59 in Example 7.

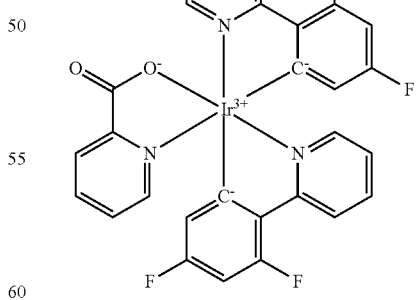

Comparative Example 9

A sample was prepared, and measured for the various values in a similar manner to that of Example 1, except that the dye used was one having a structure of the following Chemical Formula 60 in Example 7.

[Chemical Formula 60]

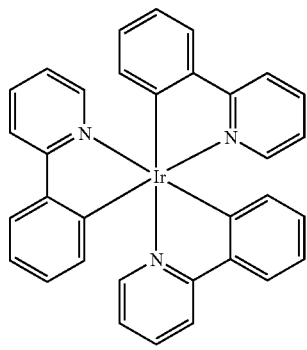

Comparative Example 10

A sample was prepared, and measured for the various values in a similar manner to that of Example 1, except that the dye used was one having a structure of the following Chemical Formula 61 in Example 7.

[Chemical Formula 61]

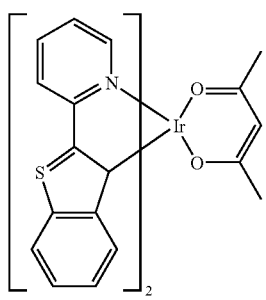

Comparative Example 11

A sample was prepared, and measured for the various values in a similar manner to that of Example 1, except that the dye used was one having a structure of the following Chemical Formula 62 in Example 7.

[Chemical Formula 62]

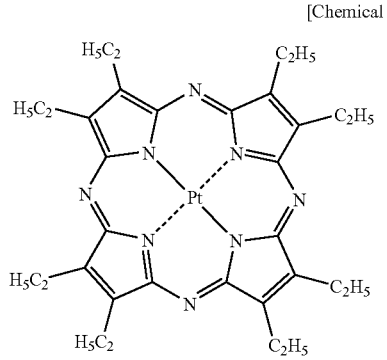

Comparative Example 12

A sample was prepared, and measured for the various values in a similar manner to that of Example 1, except that the dye used was one having a structure of the following Chemical Formula 63 in Example 7.

[Chemical Formula 63]

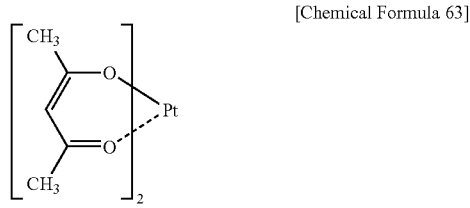

Comparative Example 13

A sample was prepared, and measured for the various values in a similar manner to that of Example 1, except that the dye used was one having a structure of the following Chemical Formula 64 in Example 7.

[Chemical Formula 64]

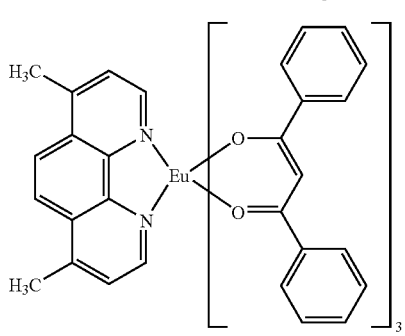

Comparative Example 14

A sample was prepared, and measured for the various values in a similar manner to that of Example 1, except that the dye used was one having a structure of the following Chemical Formula 65 in Example 7.

[Chemical Formula 65]

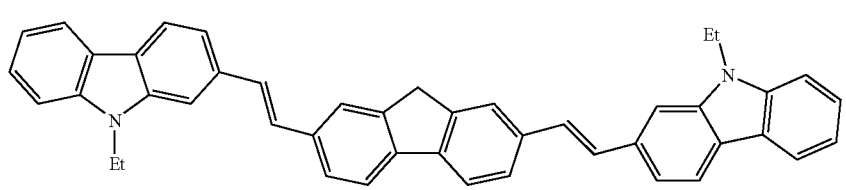

Comparative Example 15

A sample was prepared, and measured for the various values in a similar manner to that of Example 1, except that the dye used was one having a structure of the following Chemical Formula 66 in Example 7.

[Chemical Formula 66]

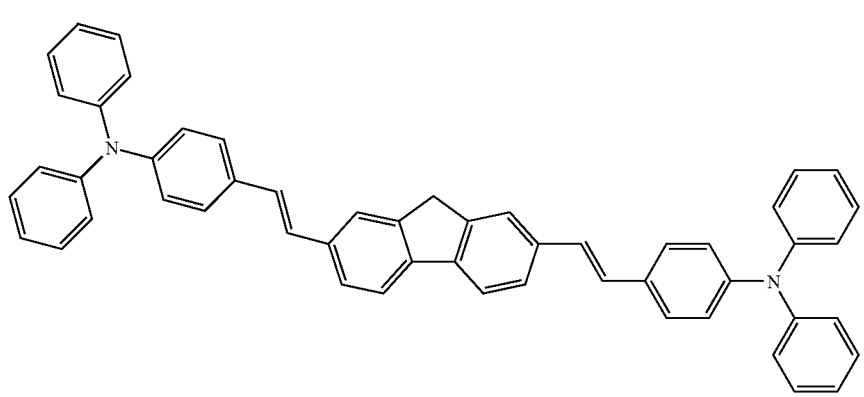

Comparative Example 16

A sample was prepared, and measured for the various values in a similar manner to that of Example 1, except that the dye used was one having a structure of the following Chemical Formula 67 in Example 7.

[Chemical Formula 67]

[Chemical Formula 68]

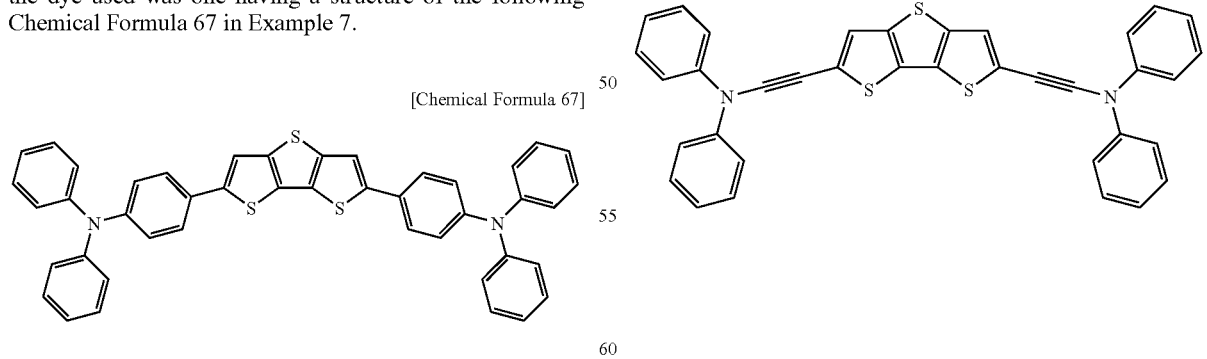

Comparative Example 17

A sample was prepared, and measured for the various values in a similar manner to that of Example 1, except that the dye used was one having a structure of the following Chemical Formula 68 in Example 7.

Comparative Example 18

A sample was prepared, and measured for the various values in a similar manner to that of Example 1, except that the dye used was one having a structure of the following Chemical Formula 69 in Example 7.

[Chemical Formula 69]

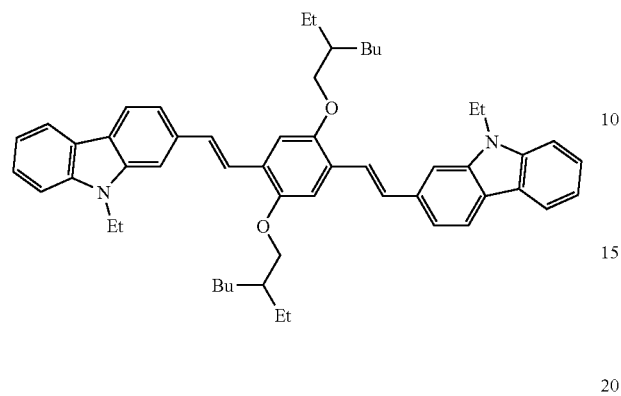

Comparative Example 19

A sample was prepared, and measured for the various values in a similar manner to that of Example 1, except that the dye used was one having a structure of the following Chemical Formula 70 in Example 7.

[Chemical Formula 70]

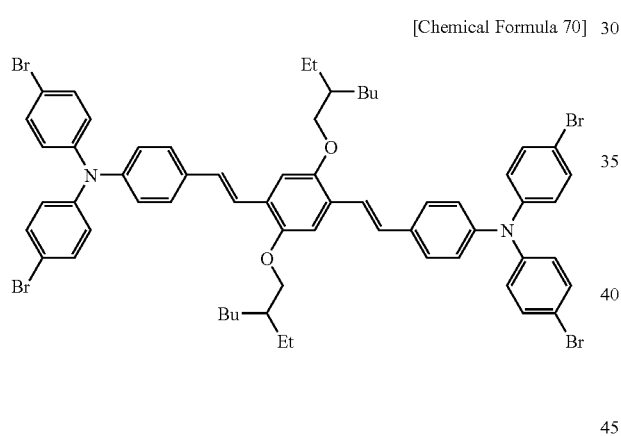

Comparative Example 20

A sample was prepared, and measured for the various values in a similar manner to that of Example 1, except that the dye used was one having a structure of the following Chemical Formula 71 in Example 7.

Comparative Example 21

A sample was prepared, and measured for the various values in a similar manner to that of Example 1, except that the dye used was one having a structure of the following Chemical Formula 72 in Example 7.

[Chemical Formula 72]

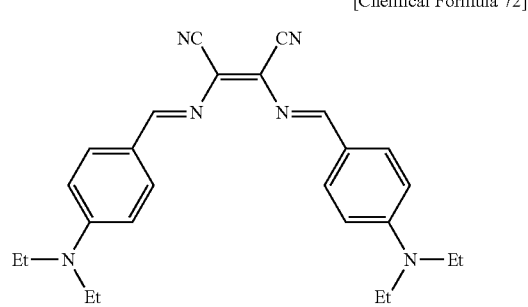

Comparative Example 22

A sample was prepared, and measured for the various values in a similar manner to that of Example 1, except that the dye used was one having a structure of the following Chemical Formula 73 in Example 7.

[Chemical Formula 73]

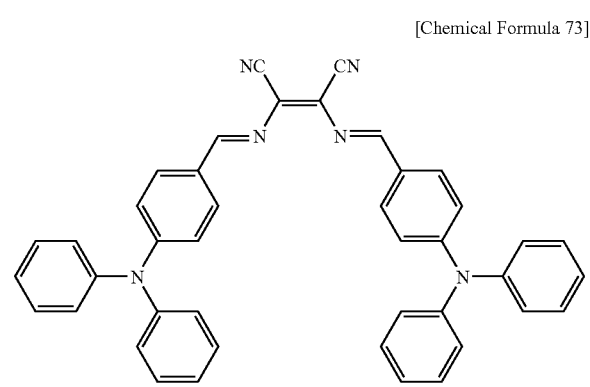

Comparative Example 23

A sample was prepared, and measured for the various values in a similar manner to that of Example 1, except that

[Chemical Formula 71]

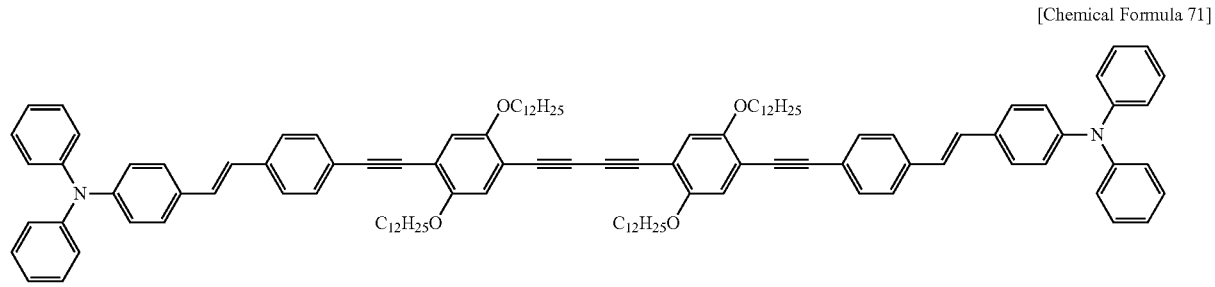

the dye used was one having a structure of the following Chemical Formula 74 in Example 7.

[Chemical Formula 74]

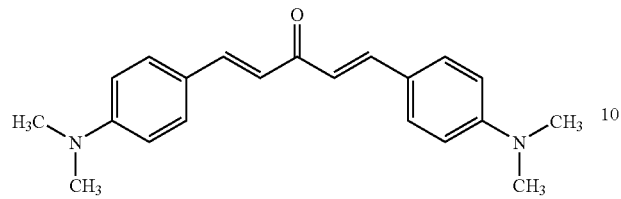

Comparative Example 24

A sample was prepared, and measured for the various values in a similar manner to that of Example 1, except that the dye used was one having a structure of the following Chemical Formula 75 in Example 7.

[Chemical Formula 75]

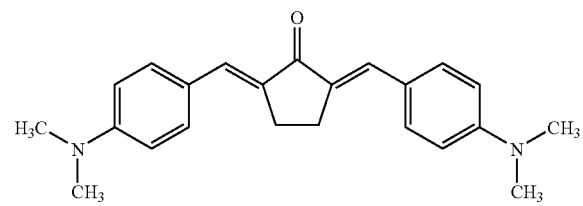

Comparative Example 25

A sample was prepared, and measured for the various values in a similar manner to that of Example 1, except that the dye used was one having a structure of the following Chemical Formula 76 in Example 7.

[Chemical Formula 76]

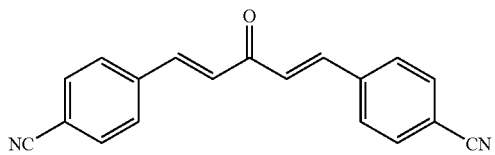

Comparative Example 26

A sample was prepared, and measured for the various values in a similar manner to that of Example 1, except that the dye used was one having a structure of the following Chemical Formula 77 in Example 7.

[Chemical Formula 77]

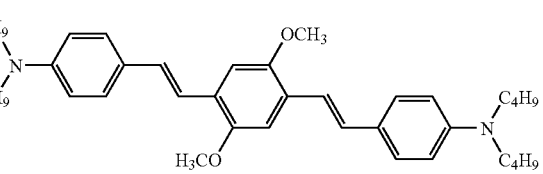

Comparative Example 27

A sample was prepared, and measured for the various values in a similar manner to that of Example 1, except that the dye used was one having a structure of the following Chemical Formula 78 in Example 7.

[Chemical Formula 78]

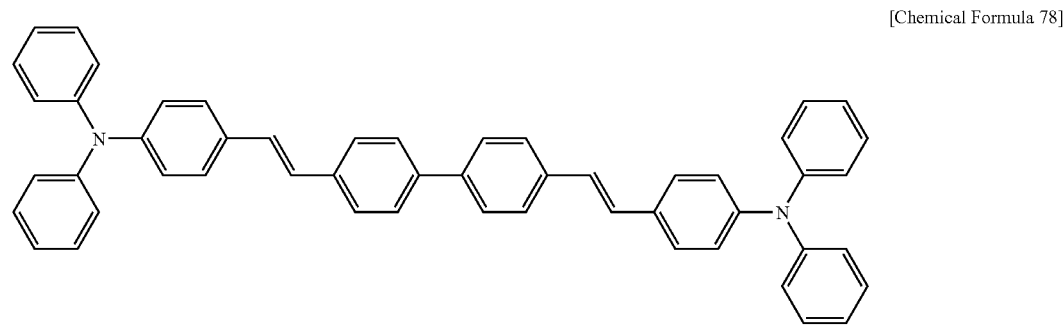

Comparative Example 28

A sample was prepared, and measured for the various values in a similar manner to that of Example 1, except that the dye used was one having a structure of the following Chemical Formula 79 in Example 7.

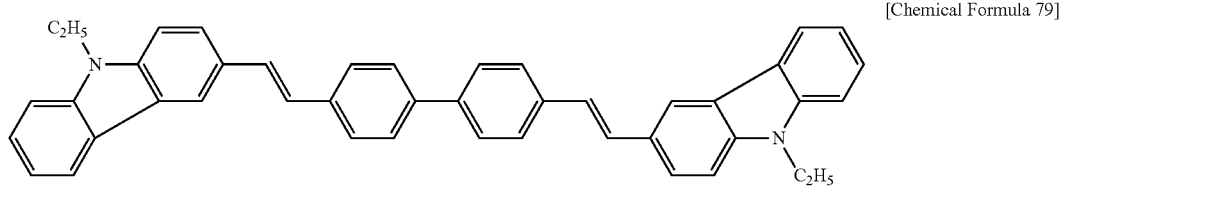

[Chemical Formula 79]

Comparative Example 29

A sample was prepared, and measured for the various values in a similar manner to that of Example 1, except that the dye used was one having a structure of the following Chemical Formula 80 in Example 7.

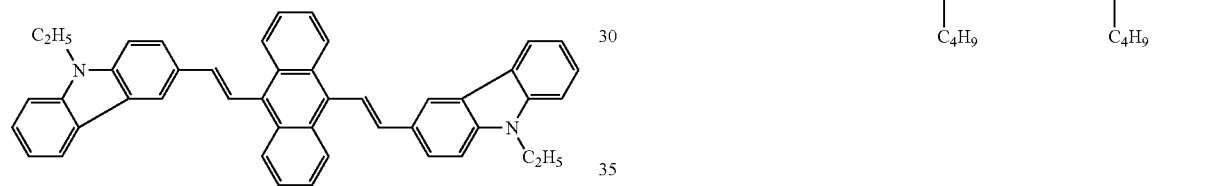

[Chemical Formula 80]

Comparative Example 30

A sample was prepared, and measured for the various values in a similar manner to that of Example 1, except that the dye used was one having a structure of the following Chemical Formula 81 in Example 7.

[Chemical Formula 81]

Comparative Example 31

A sample was prepared, and measured for the various values in a similar manner to that of Example 1, except that the dye used was one having a structure of the following Chemical Formula 82 in Example 7.

[Chemical Formula 82]

Comparative Example 32

A sample was prepared, and measured for the various values in a similar manner to that of Example 1, except that the dye used was one having a structure of the following Chemical Formula 83 in Example 7.

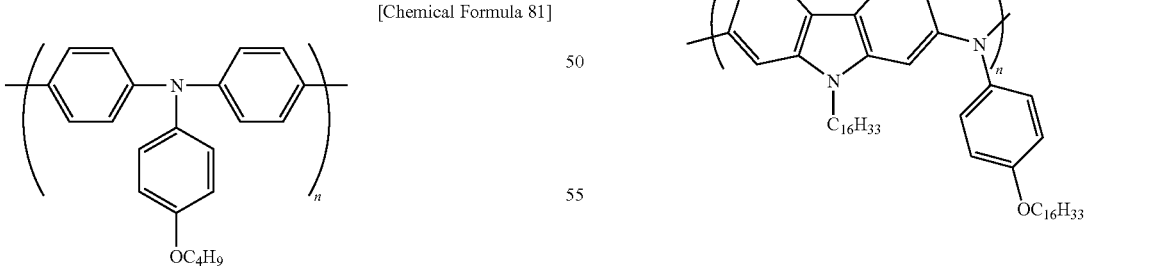

[Chemical Formula 83]

Comparative Example 33

A sample was prepared, and measured for the various values in a similar manner to that of Example 1, except that the dye used was one having a structure of the following Chemical Formula 84 in Example 7.

[Chemical Formula 84]

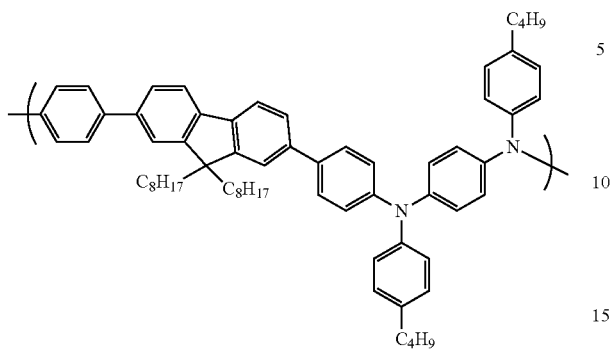

Comparative Example 34

A sample was prepared, and measured for the various values in a similar manner to that of Example 1, except that the dye used was one having a structure of the following Chemical Formula 85 in Example 7.

[Chemical Formula 85]

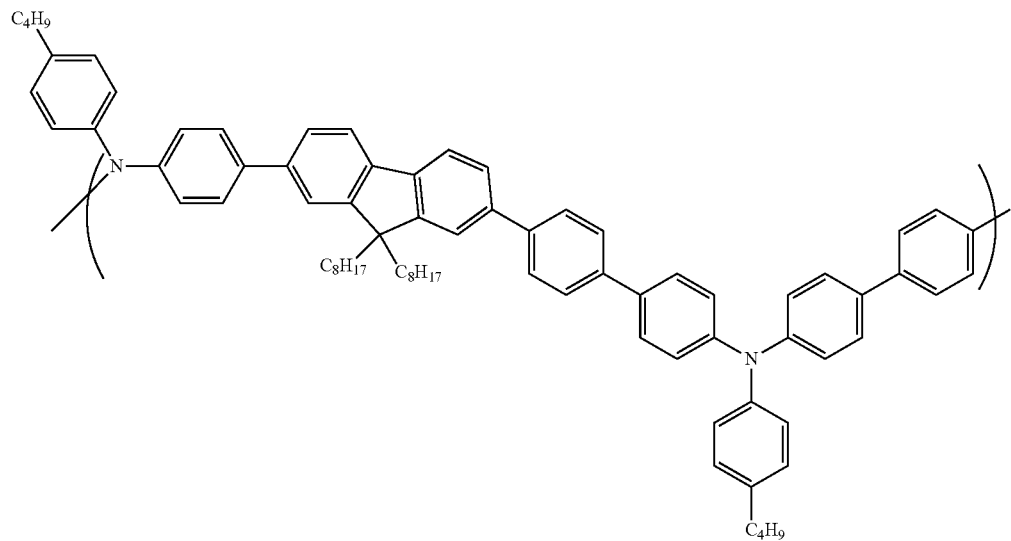

TABLE 2

| Example | In air/ Under vacuum | Long-lived Phosphorescence quantum yield $\Phi$ RTP (at room temperature) | Lifetime of Long-lived Phosphorescence $\tau^T$ (at room temperature) | Lifetime of Long-lived Phosphorescence $\tau^T$ (at 77 K) | RTPmax (nm) |
|---|---|---|---|---|---|
| Example 10 | In air | 0.06 | 2.6 | | 470 |
| | Under vacuum | 0.06 | 2.6 | 3.1 | 470 |
| Example 11 | In air | 0.05 | 2.7 | | 461 |
| | Under vacuum | 0.05 | 2.7 | 3.3 | 461 |
| Example 12 | In air | 0.05 | 2.7 | | 461 |
| | Under vacuum | 0.05 | 2.8 | 3.2 | 461 |
| Example 13 | In air | 0.10 | 1.1 | | 507 |
| | Under vacuum | 0.10 | 1.1 | 1.2 | 509 |
| Example 14 | In air | 0.11 | 1.2 | | 510 |
| | Under vacuum | 0.10 | 1.2 | 1.2 | 509 |
| Example 15 | In air | 0.08 | 0.47 | | 538 |
| | Under vacuum | 0.08 | 0.49 | 0.55 | 539 |
| Example 16 | In air | 0.03 | 1.0 | | 497 |
| | Under vacuum | 0.03 | 1.0 | 1.4 | 499 |

TABLE 2-continued

| Example | In air/ Under vacuum | Long-lived Phosphorescence quantum yield Φ RTP (at room temperature) | Lifetime of Long-lived Phosphorescence $\tau^T$ (at room temperature) | Lifetime of Long-lived Phosphorescence $\tau^T$ (at 77 K) | RTPmax (nm) |
|---|---|---|---|---|---|
| Example 17 | In air | 0.03 | 1.0 | | 495 |
| | Under vacuum | 0.03 | 1.0 | 1.4 | 493 |
| Example 18 | In air | 0.03 | 0.67 | | 510 |
| | Under vacuum | 0.04 | 0.7 | 0.8 | 512 |
| Example 19 | In air | 0.04 | 0.69 | | 518 |
| | Under vacuum | 0.04 | 0.66 | 0.73 | 516 |
| Example 20 | In air | 0.05 | 0.46 | | 541 |
| | Under vacuum | 0.05 | 0.47 | 0.47 | 540 |
| Example 21 | In air | 0.04 | 0.67 | | 521 |
| | Under vacuum | 0.04 | 0.63 | 0.69 | 522 |
| Example 22 | In air | 0.04 | 0.58 | | 533 |
| | Under vacuum | 0.05 | 0.59 | 0.59 | 529 |
| Example 23 | In air | 0.03 | 0.77 | | 505 |
| | Under vacuum | 0.03 | 0.7 | 0.75 | 506 |
| Example 24 | In air | 0.06 | 0.49 | | 541 |
| | Under vacuum | 0.07 | 0.53 | 0.5 | 545 |
| Example 25 | In air | 0.03 | 1.5 | | 452 |
| | Under vacuum | 0.04 | 1.6 | 1.4 | 455 |
| Example 26 | In air | 0.04 | 1.3 | | 494 |
| | Under vacuum | 0.04 | 1.3 | 1.2 | 490 |
| Example 27 | In air | 0.02 | 0.18 | | 635 |
| | Under vacuum | 0.02 | 0.19 | 0.16 | 635 |
| Example 28 | In air | 0.01 | 0.16 | | 625 |
| | Under vacuum | 0.01 | 0.16 | 0.18 | 625 |
| Example 29 | In air | 0.07 | 0.21 | | 636 |
| | Under vacuum | 0.07 | 0.2 | 0.21 | 637 |
| Example 30 | In air | 0.04 | 0.78 | | 496 |
| | Under vacuum | 0.04 | 0.8 | 0.75 | 497 |
| Example 31 | In air | 0.02 | 0.42 | | 561 |
| | Under vacuum | 0.02 | 0.39 | 0.41 | 562 |
| Example 32 | In air | 0.05 | 0.48 | | 540 |
| | Under vacuum | 0.05 | 0.5 | 0.51 | 539 |
| Example 33 | In air | <0.001 | 0.16 | | 430 |
| | Under vacuum | <0.001 | 0.21 | 1.3 | 434 |
| Example 34 | In air | <0.001 | 0.19 | | 439 |
| | Under vacuum | <0.001 | 0.22 | 1.2 | 436 |
| Example 35 | In air | <0.001 | 0.13 | | 449 |
| | Under vacuum | <0.001 | 0.17 | 1.0 | 445 |
| Example 36 | In air | <0.001 | 0.29 | | 449 |
| | Under vacuum | <0.001 | 0.3 | 1.0 | 451 |
| Example 37 | In air | <0.001 | 0.41 | | 499 |
| | Under vacuum | <0.001 | 0.45 | 1.6 | 497 |
| Example 38 | In air | <0.001 | 0.41 | | 479 |
| | Under vacuum | <0.001 | 0.45 | 1.6 | 477 |
| Example 39 | In air | 0.002 | 0.7 | | 500 |
| | Under vacuum | 0.002 | 0.71 | 1.1 | 500 |
| Example 40 | In air | 0.003 | 0.8 | | 503 |
| | Under vacuum | 0.002 | 0.79 | 1.2 | 505 |
| Example 41 | In air | <0.001 | 0.13 | | 500 |
| | Under vacuum | <0.001 | 0.11 | 0.61 | 500 |
| Example 42 | In air | <0.001 | 0.14 | | 445 |
| | Under vacuum | <0.001 | 0.14 | 1.5 | 441 |
| Example 43 | In air | 0.002 | 0.66 | | 502 |
| | Under vacuum | 0.002 | 0.68 | 1.3 | 504 |
| Example 44 | In air | <0.001 | 0.88 | | 409 |
| | Under vacuum | <0.001 | 0.81 | 2.1 | 410 |
| Example 45 | In air | <0.001 | 0.61 | | 445 |
| | Under vacuum | <0.001 | 0.62 | 1.8 | 446 |
| Example 46 | In air | <0.001 | 0.16 | | 585 |
| | Under vacuum | <0.001 | 0.17 | 0.59 | 585 |
| Example 47 | In air | <0.001 | 0.15 | | 610 |
| | Under vacuum | <0.001 | 0.16 | 0.39 | 611 |

TABLE 3

| Example | | | | | |
|---|---|---|---|---|---|
| Example 48 | In air | <0.001 | 0.44 | | 480 |
| | Under vacuum | <0.001 | 0.45 | 10 | 481 |
| Example 49 | In air | <0.001 | 0.71 | | 481 |
| | Under vacuum | <0.001 | 0.72 | 6.2 | 483 |
| Example 50 | In air | <0.001 | 0.51 | | |
| | Under vacuum | <0.001 | 0.59 | 2.1 | 501 |
| Example 51 | In air | 0.2 | 0.16 | | 486 |
| | Under vacuum | 0.21 | 0.14 | 0.22 | 488 |

TABLE 3-continued

| | | | | | |
|---|---|---|---|---|---|
| Example 52 | In air | 0.3 | 0.12 | | 461 |
| | Under vacuum | 0.33 | 0.1 | 0.11 | 466 |
| Comparative Example 5 | In air | 0.41 | $3.9 \times 10^{-3}$ | | 485 |
| | Under vacuum | 0.41 | $4.2 \times 10^{-3}$ | $4.5 \times 10^{-3}$ | 480 |
| Comparative Example 6 | In air | 0.1 | $1.2 \times 10^{-3}$ | | 525 |
| | Under vacuum | 0.1 | $1.2 \times 10^{-3}$ | $1.5 \times 10^{-3}$ | 525 |
| Comparative Example 7 | In air | 0.34 | $2.8 \times 10^{-3}$ | | 456 |
| | Under vacuum | 0.34 | $3.3 \times 10^{-3}$ | $4.0 \times 10^{-3}$ | 455 |
| Comparative Example 8 | In air | 0.25 | $1.2 \times 10^{-5}$ | | 475 |
| | Under vacuum | 0.25 | $1.2 \times 10^{-5}$ | $4.8 \times 10^{-5}$ | 475 |
| Comparative Example 9 | In air | 0.9 | $1.5 \times 10^{-5}$ | | 511 |
| | Under vacuum | 0.89 | $1.4 \times 10^{-5}$ | $1.7 \times 10^{-5}$ | 511 |
| Comparative Example 10 | In air | 0.2 | $2.0 \times 10^{-6}$ | | 615 |
| | Under vacuum | 0.2 | $2.0 \times 10^{-6}$ | $1.1 \times 10^{-5}$ | 615 |
| Comparative Example 11 | In air | 0.31 | $1.0 \times 10^{-4}$ | | 645 |
| | Under vacuum | 0.33 | $0.9 \times 10^{-4}$ | $2.5 \times 10^{-3}$ | 644 |
| Comparative Example 12 | In air | 0.1 | $1.9 \times 10^{-5}$ | | 469 |
| | Under vacuum | 0.11 | $2.2 \times 10^{-5}$ | $2.0 \times 10^{-5}$ | 466 |
| Comparative Example 13 | In air | 0.22 | $2.5 \times 10^{-4}$ | | 618 |
| | Under vacuum | 0.26 | $3.1 \times 10^{-4}$ | $1.0 \times 10^{-3}$ | 622 |
| Comparative Example 14 | In air | — | — | — | — |
| | Under vacuum | — | — | — | — |
| Comparative Example 15 | In air | — | — | — | — |
| | Under vacuum | — | — | — | — |
| Comparative Example 16 | In air | — | — | — | — |
| | Under vacuum | — | — | — | — |
| Comparative Example 17 | In air | — | — | — | — |
| | Under vacuum | — | — | — | — |
| Comparative Example 18 | In air | — | — | — | — |
| | Under vacuum | — | — | — | — |
| Comparative Example 19 | In air | — | — | — | — |
| | Under vacuum | — | — | — | — |
| Comparative Example 20 | In air | — | — | — | — |
| | Under vacuum | — | — | — | — |
| Comparative Example 21 | In air | — | — | — | — |
| | Under vacuum | — | — | — | — |
| Comparative Example 22 | In air | — | — | — | — |
| | Under vacuum | — | — | — | — |
| Comparative Example 23 | In air | — | — | — | — |
| | Under vacuum | — | — | — | — |
| Comparative Example 24 | In air | — | — | — | — |
| | Under vacuum | — | — | — | — |
| Comparative Example 25 | In air | — | — | — | — |
| | Under vacuum | — | — | — | — |
| Comparative Example 26 | In air | — | — | — | — |
| | Under vacuum | — | — | — | — |
| Comparative Example 27 | In air | — | — | — | — |
| | Under vacuum | — | — | — | — |
| Comparative Example 28 | In air | — | — | — | — |
| | Under vacuum | — | — | — | — |
| Comparative Example 29 | In air | — | — | — | — |
| | Under vacuum | — | — | — | — |
| Comparative Example 30 | In air | <0.001 | — | | |
| | Under vacuum | <0.001 | — | 0.44 | 533 |
| Comparative Example 31 | In air | 0.002 | | | |
| | Under vacuum | 0.002 | 0.59 | 0.67 | 529 |
| Comparative Example 32 | In air | <0.001 | — | | |
| | Under vacuum | <0.001 | — | 0.46 | 534 |
| Comparative Example 33 | In air | <0.001 | — | | |
| | Under vacuum | <0.001 | — | 0.33 | 549 |

In Tables 2 and 3, each "-" represents an unmeasurable point. When the dyes of Comparative Examples 14 to 29 were used, a strong fluorescence having a lifetime of a ns class was observed, but no long-lived phosphorescence was observed at all at 77 K and at room temperature.

Tables 2 and 3 shows the results of the long-lived-phosphorescence quantum yield in air and under vacuum, the lifetime of long-lived phosphorescence at room temperature and at 77K, and the emission peak wavelength of long-lived phosphorescence, as the results of Examples 10 to 52 and Comparative Examples 5 to 33.

It is understandable that when an amine such as a diphenylamine or a dialkylamine is bonded to each aromatic conjugated moiety to form a tertiary amine as in Examples 10 to 32, the long-lived-phosphorescence quantum yield is relatively high even at room temperature. When the lifetimes of long-lived phosphorescence at room temperature and at 77 K are compared with each other, the lifetimes of such dyes decrease to same degree, but do not decrease greatly. Moreover, decrease in quantum yield of long-lived phosphorescence in comparison with that at 77 K is small, and the intersystem crossing efficiency is not decreased with elevation of temperature from 77K. These indicate that a high quantum yield is achievable at room temperature. Meanwhile, dyes that have a rigid conjugated system, but that are not partially substituted with a secondary amine such as a diphenylamine or a dialkylamine have a low long-lived-phosphorescence quantum yield at room temperature, and thus no long-lived phosphorescence is observed at a visible level. Some of the dyes emit a long-lived phosphorescence at 77K at a visible level, but no long-lived phosphorescence is observed at room temperature. This is because the intersystem crossing efficiency decreases with temperature rises.

Moreover, even in a case where a relatively rigid conjugated diameter is partially modified with at least one tertiary amine, but where a conjugated diameter moiety is long as in Comparative Examples 14 to 29, specifically, with a dye that has an absorption wavelength of 420 nm or more due to the conjugated diameter, no long-lived phosphorescence is observed at all. A strong fluorescence is observed from each of the dyes of Comparative Examples 14 to 29, but all excitation energy is used for the fluorescent emission and the singlet thermal deactivation, and utilized for the intersystem crossing. Therefore, even when the molecular motion is frozen by cooling the molecules to 77 K, no long-lived phosphorescence is observed.

Meanwhile, a dye having a carbonyl group in the rigid conjugated moiety has a high intersystem crossing efficiency, irrespective of the presence or absence of modification with the amine, but has a high phosphorescence emission rate. Hence, the phosphorescence quantum yield is large, but the luminescence of the phosphorescence is in the millisecond order, and is not a long-lived phosphorescence.

In an example where a heavy atom such as Br is contained near a rigid conjugated diameter, the likelihood of intersystem crossing is increased because of the heavy atom effect. As a result, the phosphorescence quantum yield is increased, but the lifetime of the luminescence is shortened because of the heavy atom effect. Hence, the luminescence is not a long-lived phosphorescence.

Moreover, when an organometallic complex in which a complex with a heavy atom or the like is formed is used, the intersystem crossing efficiency is high, and the phosphorescence emission rate constant is large. Hence, a high phosphorescence quantum is obtained. However, the phosphorescence lifetime is shortened, and no long-lived phosphorescence is observed.

Moreover, the luminescence color of the long-lived phosphorescence may be varied by changing the structure of the rigid moiety. As shown by Examples, the luminescence spectrum of the long-lived phosphorescence shifts toward longer wavelength, as the structure of the rigid conjugated moiety to which the amine is bonded changes in order of carbazole, triphenylene, fluorene, diphenyl, naphthalene, and pyrene. Moreover, the luminescence wavelength is shiftable toward longer wavelength also by increasing the number of the amines that are bonded to the rigid conjugated moiety for increasing the donating property.

When what is introduced to the rigid conjugated moiety for the modification is other than a secondary amine or a tertiary amine, a high long-lived-phosphorescence quantum yield is not obtainable. As shown by Comparative Examples, when the substitution is performed with a substituent other than an amine, such as a nitro group, an alkyl group, an alkoxy group, an ester group, or a cyano group, the long-lived-phosphorescence quantum yield becomes low, and no effect as that achieved by a primary amine or a secondary amine is obtained.

Effect of Deuterium Substitution

Example 53

A dye having a basic skeleton of the dye used in Example 10 was deuterated by the following method. First, 1 g of 2 aminofluorene, which was a row material, and 100 mg of a Pd/C (10%) catalyst were dispersed in 300 ml of deuterium oxide, and allowed to react in an autoclave at 240° C. for 24 hours. Thereafter, column purification was performed for removal of the Pd/C catalyst. Thereafter, deuterium substitution ratios were measured by 1H-NMR and 2H-NMR, which showed that protons at all positions were substituted with deuterium at a ratio of 90% or higher. Next, this was allowed to react with commercially available deuterated 1-bromobenzene in accordance with a reaction of the following Chemical Formula 86. Thus, a long-lived phosphorescent dye, which was a final product, was synthesized.

[Chemical Formula 86]

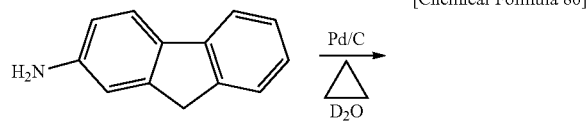

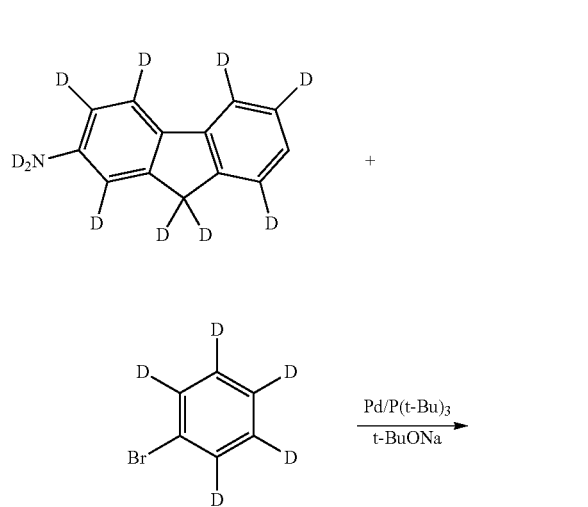

One part by weight of the long-lived phosphorescent dye obtained by this reaction of Chemical Formula 86 and 220 parts by weight of a reversible agent having a structure of the following Chemical Formula 87 were stood at 210° C., and the dye was dissolved in the thus molten reversible agent, followed by rapid cooling to room temperature. Thus, an amorphous sample was prepared.

[Chemical Formula 87]

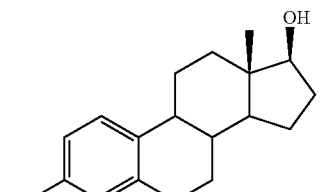

Example 54

A dye having a basic skeleton of the dye used in Example 1 was deuterated by the following method. First, 1 g of 2.7 diamino aminofluorene, which was a raw material, and 100 mg of a Pd/C (10%) catalyst were dispersed in 300 ml of deuterium oxide, and allowed to react in an autoclave at 240° C. for 24 hours. Thereafter, column purification was performed for removal of the Pd/C catalyst. Thereafter, deuterium substitution ratios were measured by 1H-NMR and 2H-NMR, which showed that protons at all positions were substituted with deuterium at a ratio of 90% or higher. Next, this was allowed to react with commercially available deuterated 1-bromobenzene in accordance with a reaction of the following Chemical Formula 88. Thus, a long-lived phosphorescent dye, which was a final product, was synthesized.

[Chemical Formula 88]

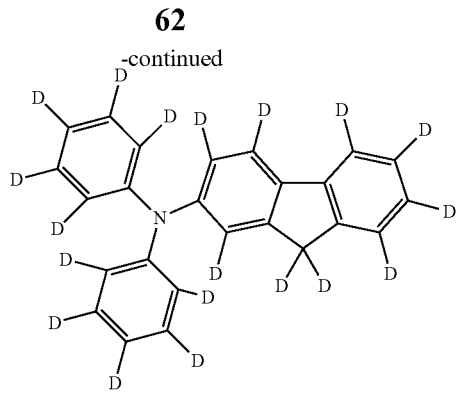

-continued

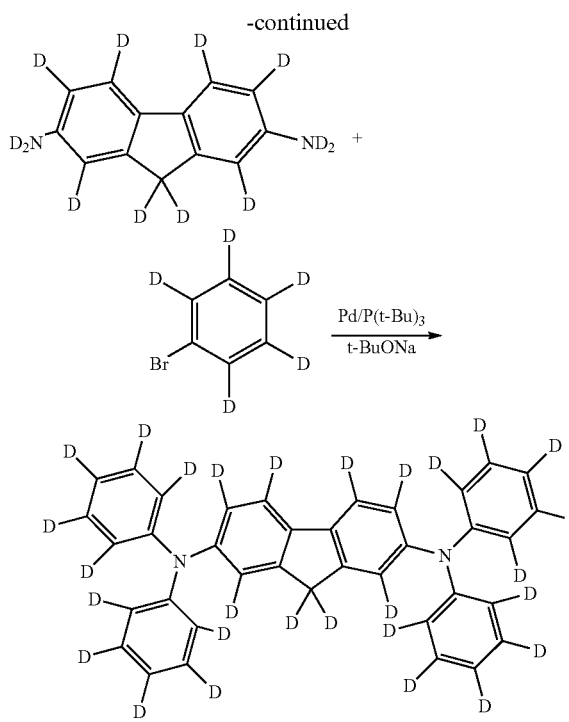

One part by weight of the long-lived phosphorescent dye obtained by this reaction of Chemical Formula 88, and 220 parts by weight of a reversible agent having a structure of the following Chemical Formula 89 were stood at 210° C., and the dye was dissolved in the thus molten reversible agent, followed by rapid cooling to room temperature. Thus, an amorphous sample was prepared.

[Chemical Formula 89]

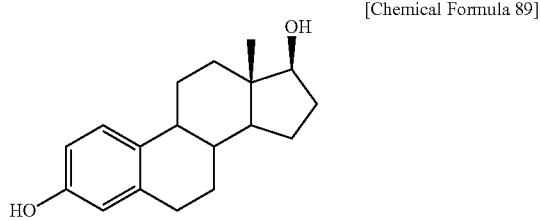

long-lived phosphorescence at room temperature and at 77 K, and the emission peak wavelength of long-lived phosphorescence, as the results of Example 53, Example 54, Example 10, and Example 7. Example 53 shows the results in the case where the dye in which hydrogen moieties of the long-lived phosphorescent dye of Example 10 were deuterated was used. From Example 53, it is understandable that the lifetime of long-lived phosphorescence and the long-lived-phosphorescence quantum yield at room temperature were increased. Example 54 shows the case where the dye in which hydrogen moieties of the long-lived phosphorescent dye of Example 7 were deuterated was used. From Example 54, it is understandable that the lifetime of long-lived phosphorescence and the long-lived-phosphorescence quantum yield at room temperature were increased. It is seen that the infrared vibration energy of the C—H bonds with the rigid conjugated moiety was decreased because of the deuteration, consequently the triplet thermal deactivation rate was slowed, and the lifetime of long-lived phosphorescence was increased. Moreover, the following are understandable. Specifically, because of decrease in singlet thermal deactivation rate, the intersystem crossing efficiency is increased. As a result, the long-lived-phosphorescence quantum yield is also increased, and a bright long-lived phosphorescence is achieved.

Effect of Photosensitizer

Example 55

One part by weight of a long-lived phosphorescent dye (lowest triplet energy=2.1 eV) having a structure of the following Chemical Formula 91 as the dye, 3.0 parts by weight of a photosensitizer having a structure of the following Chemical Formula 90 as the photosensitizer, and 96 parts by weight of the reversible agent having the structure of the above described Chemical Formula 89 as the reversible agent were once heated to 180° C. Thereby, the reversible agent having the structure of Chemical Formula 89 was melted. Thus, the other compounds were dissolved in the reversible agent. Then, this sample in a liquid state at 180° C. was filled by capillarity between two glass plates with a gap of 1 mm therebetween. Thereafter, rapid cooling was performed to room temperature. Then, one of the glass substrates was detached, and the solidified material was taken out. Thus, an ordinary-temperature-phosphorescent organic material was obtained. Regarding a long-lived-phosphorescence quantum yield of this material at room temperature in air, the quantum

TABLE 4

| Example | | Long-lived Phosphorescence quantum yield Φ RTP (at room temperature) | Lifetime of Long-lived Phosphorescence $\tau^T$ (at room temperature) | Lifetime of Long-lived Phosphorescence $\tau^T$ (at 77 K) | RTPmax (nm) |
|---|---|---|---|---|---|
| Example 53 | In air | 0.16 | 7.5 | | 465 |
| | Under vacuum | 0.16 | 7.8 | 12.4 | 466 |
| Example 54 | In air | 0.22 | 2.7 | | 512 |
| | Under vacuum | 0.22 | 2.7 | 3.3 | 513 |
| Example 10 | In air | 0.06 | 2.6 | | 470 |
| | Under vacuum | 0.06 | 2.6 | 3.1 | 470 |
| Example 7 | In air | 0.1 | 1.2 | | 509 |
| | Under vacuum | 0.1 | 1.2 | 1.3 | 510 |

Table 4 shows the results of the long-lived-phosphorescence quantum yield in air and under vacuum, the lifetime of yield of long-lived phosphorescence was measured by using a luminescence spectrometer FP6500 with the function extended by an integrating sphere IS513, manufactured by JASCO Corporation. In addition, in order to observe an effect of oxygen, a long-lived-phosphorescence quantum yield at room temperature under vacuum was measured as follows. Specifically, the sample was placed in an optistat DN-V manufactured by Oxford Instruments plc, and the long-lived-phosphorescence intensity in air and the long-lived-phosphorescence intensity at the time of vacuum evacuation were compared with each other for determining the long-lived-phosphorescence quantum yield. Moreover, a lifetime of long-lived phosphorescence and a long-lived-phosphorescence spectrum at room temperature were measured as follows. Specifically, excitation light that corresponded to an absorption wavelength of the dye and that had a bandwidth of 10 nm was selected by passing light from a xenon lamp through a diffraction grating. Then, the excitation light was irradiated for approximately 10 seconds. The time at which the irradiation was stopped was taken as 0 seconds. The afterglow that the material continued to emit was detected every 0.02 seconds by using a multi-light photomultiplier tube manufactured by Otsuka Electronics Co., Ltd., as the change with time of the luminescence spectrum.

[Chemical Formula 90]

[Chemical Formula 91]

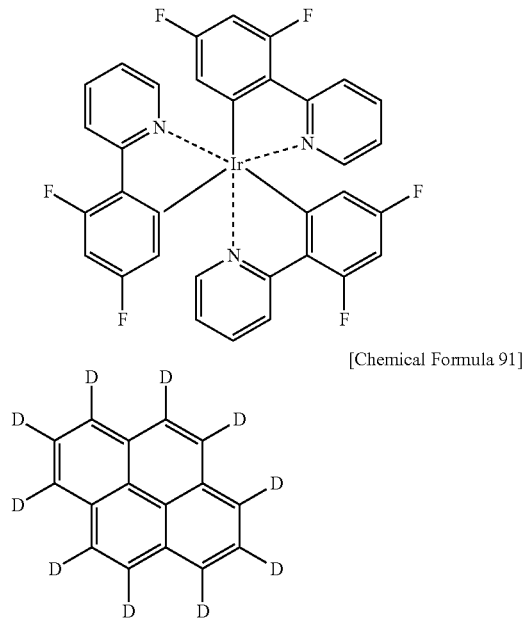

Example 56

A sample was prepared, and evaluated, in a similar manner to that of Example 55, except that the photosensitizer was replaced with a photosensitizer having a structure of the following Chemical Formula 92.

[Chemical Formula 92]

Example 57

A sample was prepared, and evaluated, in a similar manner to that of Example 55, except that the photosensitizer was replaced with a photosensitizer having a structure of the following Chemical Formula 93.

[Chemical Formula 93]

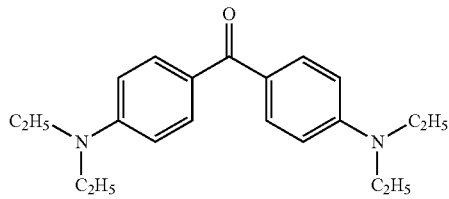

Example 58

A sample was prepared, and evaluated, in a similar manner to that of Example 55, except that the photosensitizer was replaced with a photosensitizer represented by a structure of the following Chemical Formula 94.

[Chemical Formula 94]

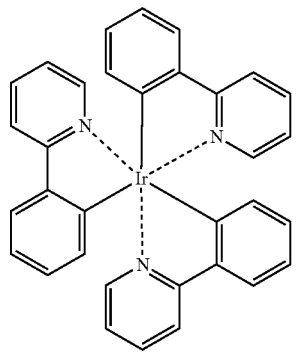

Example 59

A sample was prepared, and evaluated, in a similar manner to that of Example 55, except that the photosensitizer was replaced with a photosensitizer having a structure of the following Chemical Formula 95.

[Chemical Formula 95]

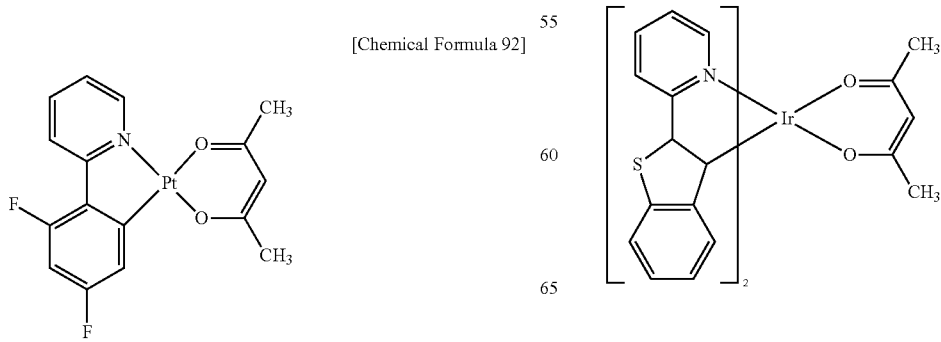

Example 60

A sample was prepared, and evaluated, in a similar manner to that of Example 55, except that no photosensitizer was used.

TABLE 5

| Example | Long-lived Phosphorescence quantum yield Φ RTP (at room temp. in air) | Lifetime of Long-lived Phosphorescence $\tau^T$ (at room temp. in air) | RTPmax (nm) | Photosensitizer Triplet energy | Photosensitizer Intersystem crossing efficiency |
|---|---|---|---|---|---|
| Example 55 | 0.07 | 1.4 | 585 | 2.7 eV | 1 |
| Example 56 | 0.09 | 1.6 | 588 | 2.7 eV | 1 |
| Example 57 | 0.01 | 1.3 | 585 | 2.6 eV | 0.01 |
| Example 58 | 0.02 | 1.4 | 585 | 2.4 eV | 1 |
| Example 59 | 0.01 | 1.3 | — | 2.0 eV | 1 |
| Example 60 | <0.01 | 2 | 588 | — | — |

It is understandable that, when Examples 55 and 56 where a photosensitizer is used are compared with Example 60 where no photosensitizer is used, the lifetime of long-lived phosphorescence itself does not change greatly, but the quantum yield of the long-lived phosphorescence is increased approximately several times. The deuterated pyrene (the long-lived phosphorescent dye of Chemical Formula 91) that is not modified with an amine has a low intersystem crossing efficiency at room temperature. However, if a photosensitizer having an originally high intersystem crossing efficiency at room temperature is used, first, the triplet excited state is formed highly densely in the photosensitizer. The long-lived phosphorescent dye deprives the photosensitizer of the triplet excitation energy, which allows the long-lived phosphorescence energy originated from the long-lived phosphorescent dye to be taken out as a long-lived phosphorescence. However, as in Examples 58 and 59, even if a photosensitizer is used, no energy is transferred from the photosensitizer and a triplet dye to the long-lived phosphorescent dye unless the triplet excitation energy itself of the photosensitizer is sufficiently higher than the triplet energy of the long-lived phosphorescent dye. As a result, almost no long-lived phosphorescence is observed. This indicates that it is important that the lowest triplet energy of the photosensitizer should be larger than the lowest triplet energy of the dye. However, even if the lowest triplet energy of the photosensitizer is larger than the lowest triplet energy of the dye, a high long-lived-phosphorescence quantum yield is not obtainable, unless the intersystem crossing efficiency of the photosensitizer at room temperature is high. Example 57 represents such a result. The photosensitizer of Chemical Formula 93 has a triplet excitation energy of approximately 2.6 eV, which is higher by approximately 0.5 eV than 2.1 eV, which is a triplet excitation energy of the deuterated pyrene, but the intersystem crossing efficiency is as low as approximately 0.01. As a result, a sufficient long-lived-phosphorescence quantum yield was not obtained. On the other hand, the photosensitizer of each of Examples 55 and 56 has been reported to have an intersystem crossing efficiency at room temperature of 1.0. As shown in Table 4, the triplet excitation energy of the photosensitizer of each of Examples 55 and 56 is also larger than 2.1 eV, which is the triplet excitation energy of the deuterated pyrene. Hence, a relatively high long-lived-phosphorescence quantum yield is obtainable.

Reversibly Thermosensitive Recording of Long-Lived-Phosphorescence Function

Example 61

A powder sample was obtained by blending 1.0 part by weight of a long-lived phosphorescent dye having a structure of the following Chemical Formula 96 as the dye, 200 parts by weight of a reversible agent having a structure of the following Chemical Formula 97 as the reversible agent, and 20 parts by weight of an amorphous-phase stabilizer having a structure of the following Chemical Formula 98 as the amorphous-phase stabilizer. Then, the obtained powder sample was once heated to 180° C. Thereby, the reversible agent having the structure of Chemical Formula 97 was melted. Thus, the other compounds were dissolved in the reversible agent. Then, this sample in a liquid state at 180° C. was filled by capillarity between two glass plates with a gap of 1 mm therebetween. Thereafter, rapid cooling was performed to room temperature. Then, one of the glass substrates was detached, and the solidified material was taken out. Thus, an ordinary-temperature-phosphorescent organic material was obtained.

[Chemical Formula 96]

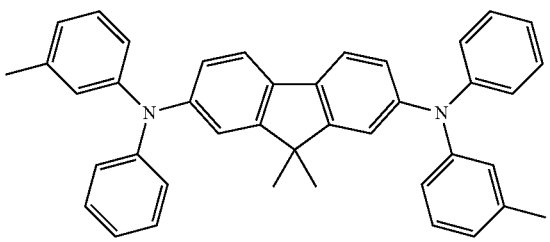

[Chemical Formula 97]

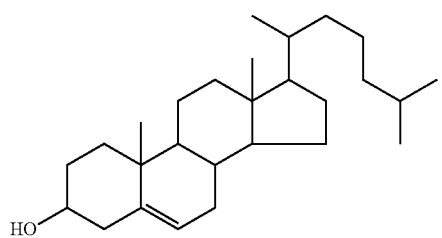

-continued

[Chemical Formula 98]

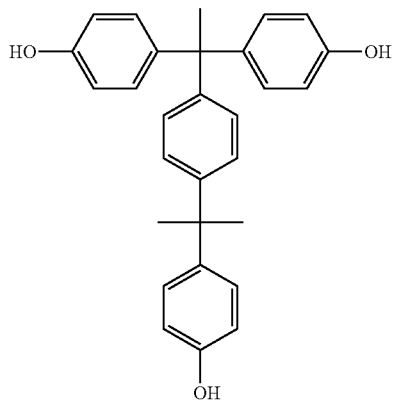

A sample was obtained by heating this material at 90° C. for 60 seconds, and then gradually cooling the material to room temperature. This sample was measured for a quantum yield of long-lived phosphorescence at room temperature under air. Specifically, the long-lived-phosphorescence quantum yield at room temperature in air was measured by using a luminescence spectrometer FP6500 with the function extended by an integrating sphere IS513, manufactured by JASCO Corporation. In addition, a lifetime of long-lived phosphorescence and a long-lived-phosphorescence spectrum at room temperature were measured as follows. Specifically, excitation light that corresponded to an absorption wavelength of the dye and that had a bandwidth of 10 nm was selected by passing light from a xenon lamp through a diffraction grating. The excitation light was irradiated for approximately 10 seconds. The time at which the irradiation was stopped was taken as 0 seconds. The afterglow that the material continued to emit after the stop was detected every 0.02 seconds by using a multi-light photomultiplier tube manufactured by Otsuka Electronics Co., Ltd., as the change with time of the luminescence spectrum. Next, the sample was stood at 180° C. for 10 seconds, and then rapidly cooled to room temperature. Thereafter, a long-lived-phosphorescence quantum yield and a lifetime of long-lived phosphorescence were measured in a similar manner to that described above. Thereafter, the process of heating to 90° C. and the process of heating to 180° C. were repeated. After each process, a quantum yield of long-lived phosphorescence and a lifetime of the long-lived phosphorescence were measured.

Example 62

Measurement was performed in a similar manner to that in Example 61, except that the dye in the sample used was replaced with the following Chemical Formula 99.

[Chemical Formula 99]

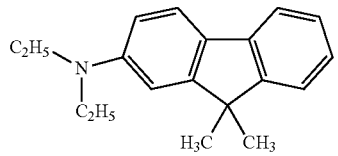

Example 63

Measurement was performed in a similar manner to that in Example 61, except that the dye in the sample used was replaced with the following Chemical Formula 100.

[Chemical Formula 100]

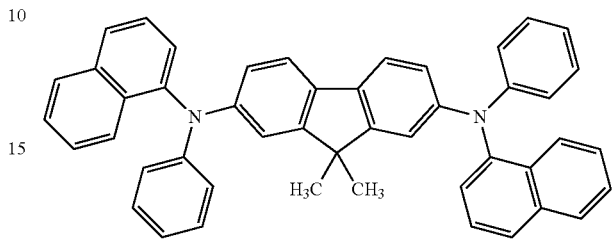

Example 64

A powder sample was obtained by blending 1.0 part by weight of a long-lived phosphorescent dye having a structure of the following Chemical Formula 101 as the dye, 200 parts by weight of a reversible agent having a structure of the following Chemical Formula 102 as the reversible agent, and 20 parts by weight of an amorphous-phase stabilizer having a structure of the following Chemical Formula 103 as the amorphous-phase stabilizer. Then, the obtained powder sample was once heated to 230° C. Thereby, the reversible agent was melted. Thus, the other compounds were dissolved in the reversible agent. Then, this sample in a liquid state at 230° C. was filled by capillarity between two glass plates with a gap of 1 mm therebetween. Thereafter, rapid cooling was performed to room temperature. Then, one of the glass substrates was detached, and the solidified material was taken out. Thus, an ordinary-temperature-phosphorescent organic material was obtained.

[Chemical Formula 101]

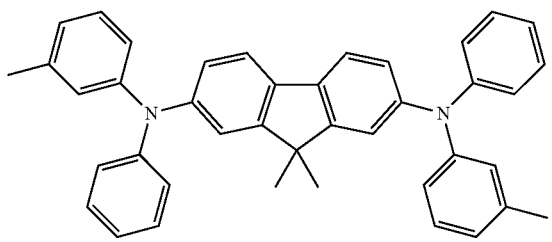

[Chemical Formula 102]

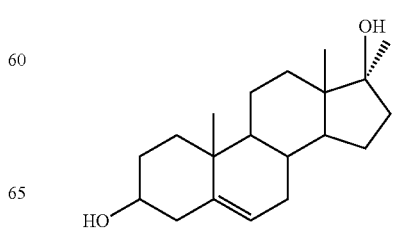

[Chemical Formula 103]

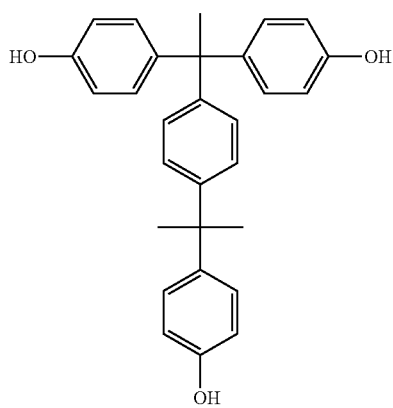

A sample was obtained by heating this martial at 120° C. for 60 seconds, and then gradually cooling the material to room temperature. This sample was measured for a quantum yield of long-lived phosphorescence at room temperature under air by using a luminescence spectrometer FP6500 with the function extended by an integrating sphere IS513, manufactured by JASCO Corporation. In addition, a lifetime of long-lived phosphorescence and a long-lived-phosphorescence spectrum at room temperature were measured as follows. Specifically, excitation light that corresponded to an absorption wavelength of the dye and that had a bandwidth of 10 nm was selected by passing light from a xenon lamp through a diffraction grating. The excitation light was irradiated for approximately 10 seconds. The time at which the irradiation was stopped was taken as 0 seconds. The afterglow that the material continued to emit after the stop was detected every 0.02 seconds by using a multi-light photomultiplier tube manufactured by Otsuka Electronics Co., Ltd., as the change with time of the luminescence spectrum. Next, the sample was stood at 230° C. for 10 seconds, and then rapidly cooled to room temperature. Thereafter, a long-lived-phosphorescence quantum yield and a lifetime of long-lived phosphorescence were measured in a similar manner to that described above. Thereafter, the process of heating to 120° C., and the process of heating to 230° C. were repeated. After each process, a quantum yield of long-lived phosphorescence and a lifetime of the long-lived phosphorescent were measured.

Example 65

A sample was prepared and measured, in a similar manner to that of Example 61, except that a sample to which no amorphous-phase stabilizer was added was used.

Example 66

A sample was prepared and measured, in a similar manner to that of Example 64, except that a sample to which no amorphous-phase stabilizer was added was used.

TABLE 6

| Example | Long-lived Phosphorescence quantum yield $\Phi$ RTP (at room temp.) Recording at higher temperature | Lifetime of Long-lived Phosphorescence $\tau^T$ (at room temp.) Recording at higher temperature | Long-lived Phosphorescence quantum yield $\Phi$ RTP (at room temp.) Recording at lower temperature | Lifetime of Long-lived Phosphorescence $\tau^T$ (at room temp.) Recording at lower temperature | Long-lived Phosphorescence contrast | RTPmax (nm) |
|---|---|---|---|---|---|---|
| Example 61 | 0.10 | 1.1 | 0.007 | 0.71 | 14 | 512 |
| Example 62 | 0.06 | 1.5 | 0.002 | 0.56 | 30 | 465 |
| Example 63 | 0.07 | 0.49 | 0.004 | 0.39 | 18 | 536 |
| Example 64 | 0.09 | 0.88 | 0.01 | 0.71 | 9.0 | 510 |
| Example 65 | 0.009 | 0.79 | 0.008 | 0.71 | 1.1 | 514 |
| Example 66 | 0.008 | 0.62 | 0.008 | 0.55 | 1.0 | 511 |

Table 6 shows the results of the long-lived-phosphorescence quantum yield and the lifetime of long-lived phosphorescence at the time of the repetition of the heating and cooling, as well as the long-lived phosphorescence contrast in each of Examples and Comparative Examples. In each of Examples 61 to 64, a high long-lived phosphorescence contrast is achieved.

This phenomenon will be described by using the material of Example 61. When the material is treated at a higher temperature (180° C.) and then rapidly cooled, the material is in an amorphous state according to the X-rays (refer to FIG. 5). The dye is relatively uniformly dispersed in an unordered state formed of the reversible agent and the amorphous-phase stabilizer. The long-lived-phosphorescence quantum yield is as high as 0.10, and a strong long-lived phosphorescence is observed. Since the dye is uniformly dispersed in this state, the long-lived phosphorescence decays exponentially (refer to FIG. 6). This indicates that the dye is uniformly dispersed. Meanwhile, the X-rays show that when the sample is heated at a lower temperature (90° C.) and gradually cooled, crystallization is induced (refer to FIG. 5). The crystallization peaks thereof correspond to peaks of the reversible agent of Chemical Formula 97 and the amorphous-phase stabilizer of Chemical Formula 98. This crystallization of the matrix induces the aggregation of the long-lived phosphorescent dye of Chemical Formula 96. As a result, the concentration quenching occurs, reducing the quantum yield of long-lived phosphorescence to 0.007. In this case, the lifetime of long-lived phosphorescence decreases only slightly (refer to FIG. 6). This is because what is observed is the long-lived phosphorescence of a trace amount of the long-lived phosphorescent dye that does not aggregate. It is seen that the dye is aggregated because the shape of a spectrum of weak long-lived phosphorescence in a state where the long-lived phosphorescence is OFF is shifted toward longer wavelength to some extent in comparison with the spectrum at the time when the long-lived phosphorescence is ON (refer to FIG. 7). The difference between the crystalline and amorphous states is clearly observed also by a DSC measurement. In the amorphous state where the long-lived phosphorescence is ON, data are observed showing that the Tg exists around 40° C., the crystallization starts at a temperature of or above 40° C., i.e., around 60° C., and melting occurs at 150° C. (refer to FIG. 8). Hence, the amorphous state is stable at room temperature of 25° C., and the state where the long-lived phosphorescence is recorded as ON is stable at room temperature. Meanwhile, for the crystallized sample, no crystallization peak is observed in DSC, and only a melting peak appears around 150° C. The crystallized state is also stable at room temperature, and a state where the long-lived phosphorescence is OFF is also preserved at room temperature. As described above, the recorded state is stable, even when the material is stood at room temperature or when the long-lived phosphorescence is read out by irradiation with excitation light as shown in FIG. 9. Moreover, the thermal rewrite performance is excellent. By repeating heating to 180° C. and heating to 90° C., several tens times of rewriting may be performed without reduction in long-lived-phosphorescence intensity (refer to FIG. 10).

Between Examples 62 and 63, the lifetime of long-lived phosphorescence and the long-lived phosphorescent lifetime are changeable by changing the long-lived phosphorescent dye, and the ON-OFF of the long-lived phosphorescence is reversibly recordable at similar temperatures. The contrast of the long-lived phosphorescence is somewhat varied because the degree of the concentration quenching of the dye somewhat differs depending on the structure of the dye. Since a long-lived phosphorescent dye has a long-lived excited state, the quenching of the luminescence due to the concentration quenching occurs strongly in a long-lived phosphorescent dye than a fluorescent dye.

As in Example 64, the recording temperature may be changed by changing the reversible agent from the reversible agent of Chemical Formula 97 to the reversible agent of Chemical Formula 102. For the reversible agent of Chemical Formula 102, the temperature at which the long-lived phosphorescence is turned ON is 230° C., and the temperature at which the long-lived phosphorescence is turned OFF is 120° C., which are somewhat high. However, since the Tg is as high as around 80° C., it is needless to say that the recorded state is stable around room temperature, and the recorded state is not destroyed even after the leaving at a somewhat high temperature.

Meanwhile, Examples 65 and 66 show the results of cases where the materials contains no amorphous-phase stabilizer. In such a case, when the sample is rapidly cooled from the melting point, no amorphous phase is formed, but the sample crystallizes. For this reason, the mixed long-lived phosphorescent dye aggregates, and no favorable state where the long-lived phosphorescence is ON is formed, resulting in a low long-lived-phosphorescence quantum yield. As a result, almost no contrast of long-lived phosphorescence is achieved.

Increasing Long-Lived Phosphorescence Contrast by Using Leuco Dye

Example 67

A sample was prepared by adding 2 parts by weight of a leuco dye of a structure represented by the following Chemical Formula 104 to the sample of Example 61. Thereafter, the heat treatment, and the evaluation of characteristics of a long-lived phosphorescence were performed in a similar manner to that of Example 61.

[Chemical Formula 104]

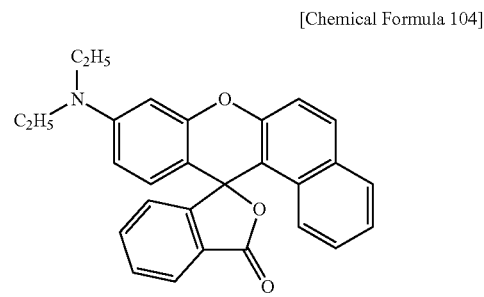

Example 68

A sample was prepared by adding 2 parts by weight of a leuco dye of a structure represented by the following Chemical Formula 105 to the sample of Example 61. Thereafter, the heat treatment, and the evaluation of characteristics of a long-lived phosphorescence were performed in a similar manner to that of Example 61.

[Chemical Formula 105]

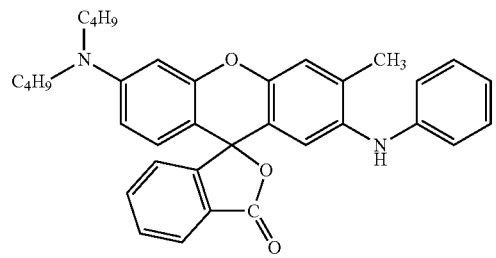

Example 69

A sample was prepared by adding 2 parts by weight of a leuco dye of a structure represented by the following Chemical Formula 106 to the sample of Example 61. Thereafter, the heat treatment, and the evaluation of characteristics of a long-lived phosphorescence were performed in a similar manner to that of Example 61.

[Chemical Formula 106]

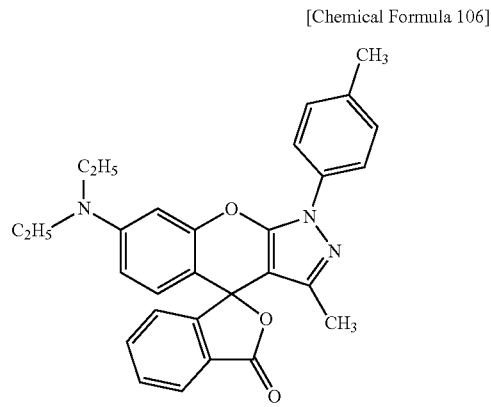

This shows that in order to increase the contrast, the following are important. Specifically, the overlap between an absorption spectrum in the amorphous state where the leuco dye is in the colorless state and the long-lived-phosphorescence spectrum of the long-lived phosphorescent dye should be made as small as possible. Meanwhile, in the crystallized state where the leuco dye is in the colored state, the overlap between the long-lived-phosphorescence spectrum of the long-lived phosphorescent dye and an absorption spectrum of the leuco dye in the colored state should be made as large as possible.

efficiently. Meanwhile, the contrast rather deteriorates at the time of the amorphous state, because the energy is removed to some extent by the thermal motion of the leuco dye of Chemical Formula 106 and a donating or accepting moiety thereof.

Optical Recording Function in Case where Photochromic Material is Used

The following processes of Examples 70 to 74 and Comparative Example 35 were performed in a darkroom.

TABLE 7

| Example | Long-lived Phosphorescence quantum yield $\Phi$ RTP (at room temp.) Recording at higher temperature | Lifetime of Long-lived Phosphorescence $\tau^T$ (at room temp.) Recording at higher temperature | Long-lived Phosphorescence quantum yield $\Phi$ RTP (at room temp.) Recording at lower temperature | Lifetime of Long-lived Phosphorescence $\tau^T$ (at room temp.) Recording at lower temperature | Long-lived Phosphorescence contrast | RTPmax (nm) |
|---|---|---|---|---|---|---|
| Example 67 | 0.05 | 0.55 | 0.003 | 0.49 | 17 | 512 |
| Example 68 | 0.06 | 0.62 | 0.003 | 0.42 | 20 | 513 |
| Example 69 | 0.05 | 0.61 | 0.007 | 0.46 | 7.1 | 511 |
| Example 61 | 0.1 | 1.1 | 0.012 | 0.71 | 8.3 | 512 |

Comparison of Examples 67 and 68 with Example 61 where no leuco dye is used shows increase in contrast of long-lived phosphorescence. This occurs as follows. Specifically, the leuco dye is colored at the time of the crystallization. In such a case, more energy of remaining long-lived phosphorescent components is removed than in a case where no leuco dye is present, because of energy transfer to the colored product of the leuco dye. Since each of the leuco dyes of Examples 67 and 68 has a large absorption band ranging from 500 nm to 650 nm, the energy overlap with the long-lived-phosphorescence spectrum of the long-lived phosphorescent dye is significant, and the energy is transferred efficiently. However, also in the amorphous state where the leuco dye is in the colorless state, the energy of the long-lived triplet excited state of the long-lived phosphorescent dye is removed because of an effect of the thermal mobility of the leuco dye in the colorless state at room temperature, and an effect of the donating or accepting property of the leuco dye. Hence, a problem still remains that, in the amorphous state where a storing long-lived phosphorescence is desired to be taken out, the quantum yield of the long-lived phosphorescence is somewhat decreased and the lifetime of the long-lived phosphorescence is shortened.

Moreover, in Example 69, although the leuco dye is contained, the long-lived phosphorescence contrast is not increased. This occurs as follows. Specifically, since the energy overlap between the absorption spectrum of the color to be developed and the luminescence spectrum of the long-lived phosphorescence is small even in the crystalline state where the leuco dye is colored, the energy is not transferred Example 70

By using a material obtained by adding 2.0 parts by weight of a photochromic compound of the following Chemical Formula 107 to the material of Example 1, a sample was prepared in which the material in an amorphous state was sandwiched between two glass substrates as in Example 1.

[Chemical Formula 107]

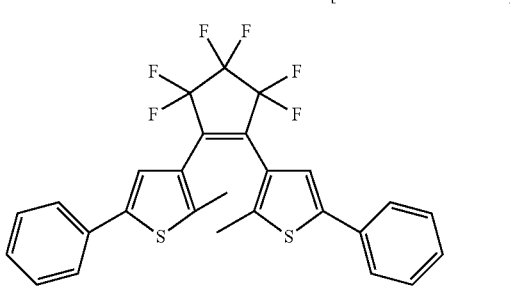

A long-lived-phosphorescence quantum yield and a lifetime of long-lived phosphorescence of this sample at room temperature in air were determined by using a luminescence spectrometer FP6500 with the function extended by an Integrating sphere IS513, manufactured by JASCO Corporation. In addition, a long-lived phosphorescent lifetime and a long-lived-phosphorescence spectrum at room temperature were measured as follows. Specifically, excitation light that corresponded to the absorption wavelength of the dye and that had a bandwidth of 10 nm was selected by passing light from a xenon lamp was through a diffraction grating. The excitation light was irradiated for approximately 10 seconds. The time at which the irradiation was stopped was taken as 0 seconds. The afterglow that the material continued to emit after the stop was measured every 0.02 seconds by using a multi-light photomultiplier tube manufactured by Otsuka Electronics Co., Ltd, as the change with time of the luminescence spectrum. Next, the sample was irradiated with ultraviolet light of 330 nm at an intensity of 0.3 mW/cm$^2$ for one minute. Here, the ultraviolet light was obtained by passing light from a xenon lamp through a diffraction grating. Thereby, the ring closure of the photochromic compound was performed. Thereafter, a long-lived-phosphorescence quantum yield and a lifetime of long-lived phosphorescence were measured in a darkroom in a similar manner to that described above. Next, the sample was irradiated with orange-colored light of 580 nm at an intensity of 5.0 mW/cm$^2$ for 5 minutes. Here, the orange-colored light was obtained by passing light from a xenon lamp through a diffraction grating. Thereafter, a long-lived-phosphorescence quantum yield and a lifetime of long-lived phosphorescence were measured in a similar manner to that described above. The process of irradiation with ultraviolet light and the process of irradiation with orange-colored light were repeated. After each process, a long-lived-phosphorescence quantum yield and a lifetime of long-lived phosphorescence in air at ordinary temperature were measured.

Example 71

Light irradiation, and measurement for characteristics of a long-lived phosphorescence were performed in a similar manner to that in Example 70, except that the dye was replaced with a long-lived phosphorescent dye having a structure of the following Chemical Formula 108.

[Chemical Formula 108]

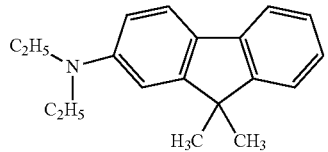

Example 72

Light irradiation, and measurement for characteristics of a long-lived phosphorescence were performed in a similar manner to that in Example 70, except that the dye was replaced with a long-lived phosphorescent dye having a structure of the following Chemical Formula 109.

[Chemical Formula 109]

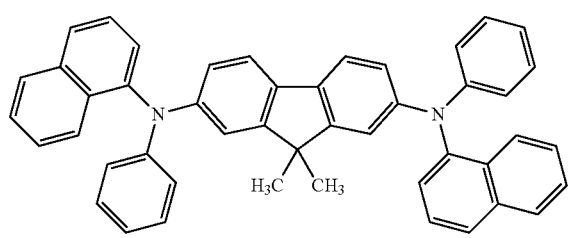

Example 73

Characteristics of a long-lived phosphorescence were evaluated in a similar manner to that in Example 71, except that the photochromic compound used was a photochromic compound represented by a structure of the following Chemical Formula 110, and that the wavelength of the irradiation light was changed as follows. Specifically, ultraviolet light of 330 nm was irradiated at an intensity of 0.3 mW/cm$^2$ for 1 minute, and ultraviolet light of 450 nm was irradiated at an intensity of 1.0 mW/cm$^2$ for 5 minutes.

[Chemical Formula 110]

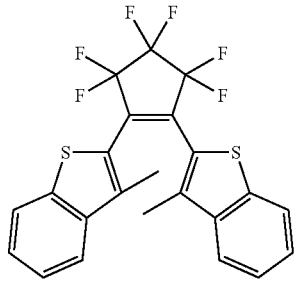

Example 74

Characteristics of a long-lived phosphorescence were evaluated in a similar manner to that in Example 72, except that the photochromic compound used was a photochromic compound represented by a structure of the following Chemical Formula 111, and that the wavelength of the irradiation light was changed as follows. Specifically, ultraviolet light of 330 nm was irradiated at an intensity of 0.3 mW/cm$^2$ for 1 minute, and ultraviolet light of 450 nm was irradiated at an intensity of 1.0 mW/cm$^2$ for 5 minutes.

[Chemical Formula 111]

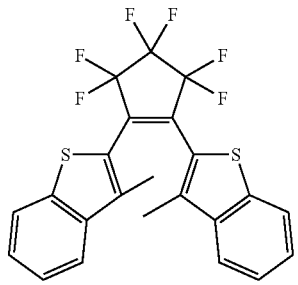

Comparative Example 35

In 5 ml of dichloroethane, 1.0 part by weight of the long-lived phosphorescent dye of Chemical Formula 1, 2.0 parts by weight of the photochromic compound of Chemical Formula 107, and 220 parts by weight of polymethyl methacrylate (hereinafter referred to as "PMMA") were dissolved. Then, a thin film of several μm was formed on a glass substrate by the spin coating method. Thereafter, the solvent was removed by performing drying in a vacuum oven under an environment of 10 mmHg at room temperature for 24 hours. A long-lived phosphorescence quantum yield and a lifetime of long-lived phosphorescence of the sample at room temperature in air were measured by using a luminescence spectrometer FP6500 with the function extended by an integrating sphere IS513, manufactured by JASCO Corporation. In addition, a lifetime of long-lived phosphorescence and a long-lived-phosphorescence spectrum at room temperature were measured as follows. Specifically, excitation light that corresponded to the absorption wavelength of the dye and that had a bandwidth of 10 nm was selected by passing light from a xenon lamp through a diffraction grating. Then, the excitation light was irradiated for approximately 10 seconds. The time at which the irradiation was stopped was taken as 0 seconds. The afterglow that the material continued to emit after the stop was measured every 0.02 seconds by using a multi-light photomultiplier tube manufactured by Otsuka Electronics Co., Ltd., as the change with time of the luminescence spectrum. Next, the sample was irradiated with ultraviolet light of 330 nm at an intensity of 0.3 mW/cm$^2$ for 1 minute. Here, the ultraviolet light was obtained by passing light from a xenon lamp through a diffraction grating. Thereby, the ring closure of the photochromic compound of Chemical Formula 107 was performed. Thereafter, a long-lived-phosphorescence quantum yield and a lifetime of long-lived phosphorescence were measured in a darkroom in a similar manner to that described above. Next, the sample was irradiated with orange-colored light of 580 nm at an intensity of 5.0 mW/cm$^2$ for 5 minutes. Here, the orange-colored light was obtained by passing light from a xenon lamp through a diffraction grating. Thereafter, a long-lived-phosphorescence quantum yield and a lifetime of long-lived phosphorescence were measured in a similar manner to that described above. The process of irradiation with ultraviolet light and the process of irradiation with orange-colored light were repeated. After each processes, a long-lived-phosphorescence quantum yield and a lifetime of long-lived phosphorescence were measured in air at ordinary temperature.

spectrum of the long-lived phosphorescent dye, but the absorption spectrum of the photochromic compound at the time of ultraviolet-light irradiation overlaps with the long-lived-phosphorescence spectrum of the long-lived phosphorescent dye. Meanwhile, in the case of Example 74, even when the photochromic compound of Chemical Formula 111 is irradiated with ultraviolet light, only a compound having an absorption band around 450 nm is generated. Accordingly, almost no overlap with the long-lived-phosphorescence spectrum of the long-lived phosphorescent dye of Chemical Formula 109 used exists. For this reason, the long-lived phosphorescence energy is not transferred to the colored product of the photochromic compound of Chemical Formula 111. As a result, even with ultraviolet-light irradiation, the long-lived-phosphorescence intensity is not weakened, and the long-lived phosphorescence contrast reaches 1. Hence, the On-Off and the characteristics of the long-lived phosphorescence are not developed.

INDUSTRIAL APPLICABILITY

The ordinary-temperature-phosphorescent organic material of the present invention is environmentally benign and practical because the ordinary-temperature-phosphorescent organic material is capable of attaining a long-lived-phosphorescence function at room temperature without containing a heavy atom or a radioactive element. Moreover, since the long-lived-phosphorescence function is developed in the amorphous state, the ordinary-temperature-phosphorescent organic material is easily used for applications in which laser light or the like is used, and optimum for applications utilizing the transparency. Moreover, the On-Off switching of the long-lived-phosphorescence function may be reversibly performed by heating, the information of the long-lived phosphorescence is preserved under a daily-life environment, and

TABLE 8

| Example | Long-lived Phosphorescence quantum yield Φ RTP (at room temp.) after visible-light irradiation | Lifetime of Long-lived Phosphorescence $\tau^T$ (at room temp.) after visible-light irradiation | Long-lived Phosphorescence quantum yield Φ RTP (at room temp.) after ultraviolet-light irradiation | Lifetime of Long-lived Phosphorescence $\tau^T$ (at room temp.) after ultraviolet-light irradiation | Long-lived Phosphorescence contrast | RTPmax (nm) |
|---|---|---|---|---|---|---|
| Example 70 | 0.07 | 0.71 | 0.02 | 0.21 | 3.5 | 508 |
| Example 71 | 0.04 | 0.89 | 0.01 | 0.33 | 4 | 466 |
| Example 72 | 0.05 | 0.36 | 0.01 | 0.11 | 3 | 545 |
| Example 73 | 0.03 | 0.79 | 0.01 | 0.39 | 3 | 465 |
| Example 74 | 0.03 | 0.38 | 0.03 | 0.39 | 1 | 540 |
| Comparative Example 35 | 0 | — | 0 | — | — | — |

Table 8 shows the results of Examples, and Comparative Example.

It is understandable that the photoisomerization of the photochromic material changes the long-lived-phosphorescence quantum yield of the long-lived phosphorescent dye by several times as in Examples 70 to 73. This recorded state is stable under an environment where no light is irradiated, and also stable against heat. Meanwhile, when the long-lived phosphorescent dye is not contained in a matrix including the reversible agent as in Comparative Example 35, no long-lived phosphorescence is observed at all. Accordingly, the long-lived-phosphorescence quantum yield is 0. In each of Examples 70 to 73, there is a relationship that the absorption spectrum of the photochromic compound in the colorless state does not overlap with the long-lived-phosphorescence the information is nondestructively readable. Furthermore, the intensity of the ling-lived phosphorescence and the lifetime thereof are switched at will with light also.

Accordingly, the ordinary-temperature-phosphorescent organic material of the present invention may lead to the development of various new products owing to characteristics as an organic material, which are not achievable by conventional inorganic long-lived phosphorescent materials. For example, since no rewritable long-lived phosphorescent material has existed before, an anti-counterfeiting material with a high security performance may be provided. Specifically, an anti-counterfeiting material is attached to a commercial product for authenticating a brand name product, checking whether or not the product is a pirate edition, or other purposes. Whether or not such an anti-counterfeiting material is attached to a commercial product should be unrecognizable. In this respect, an anti-counterfeiting material using the ordinary-temperature-phosphorescent organic material of the present invention allows authentication by an operation using a device for a specialized purpose, such as checking the long-lived-phosphorescence function by application of an excitation wavelength out of the visible region or checking the rewriting at long-lived phosphorescent portions with heat or the like. Hence, the attachment of the anti-counterfeiting material is not recognizable only from the appearance. Moreover, since a copy of a material having such characteristics is extremely difficult to produce, the ordinary-temperature-phosphorescent organic material of the present invention is suitably applied as an anti-counterfeiting material.

Moreover, since the phosphorescent organic material of the present invention contains neither a harmful heavy metal nor a radioactive element, the phosphorescent organic material may serve as a cosmetic additive or a food additive. The phosphorescent organic material of the present invention may lead to development of unprecedented optical films, displays, and the like, owing to the utilization of a characteristic of being a transparent long-lived phosphorescent material. Furthermore, an ink may be formed from the ordinary-temperature-phosphorescent organic material of the present invention by making microcapsules from the material, and blending the microcapsules to a transparent resin and a solvent. Thus, printability may be provided to the ordinary-temperature-phosphorescent organic material. This may lead to development of unprecedented display materials, interior materials, temperature-indicating materials, and the like. As have been described above, this ordinary-temperature-phosphorescent organic material is expected to be applied in various fields.

Figure 1:
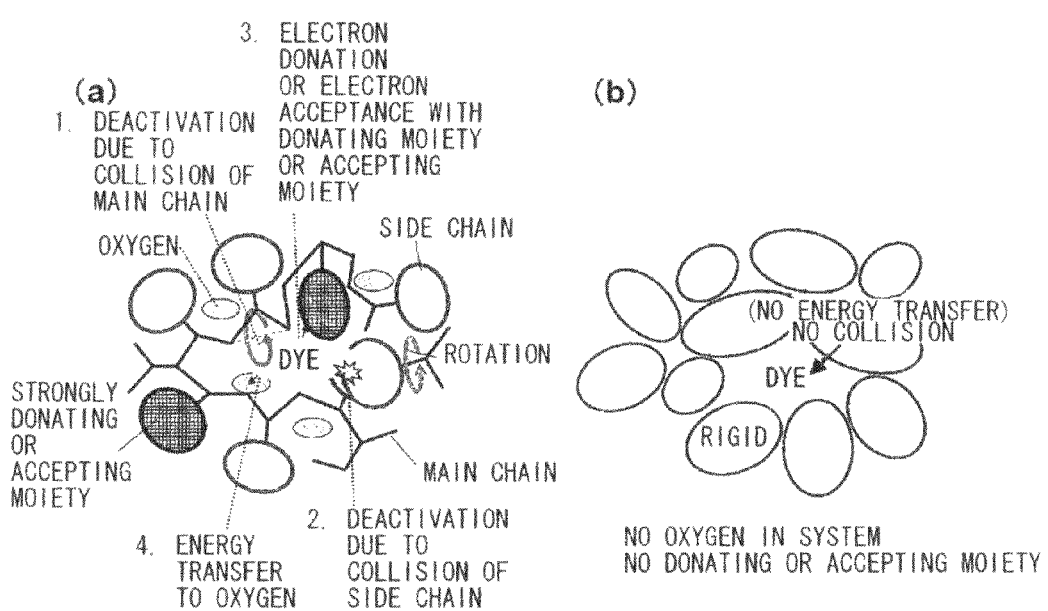
FIG. 1 is a conceptual view showing a mechanism of how an ordinary-temperature-phosphorescent organic material of the present invention emits a long-lived phosphorescence at ordinary temperature.
Figure 2:
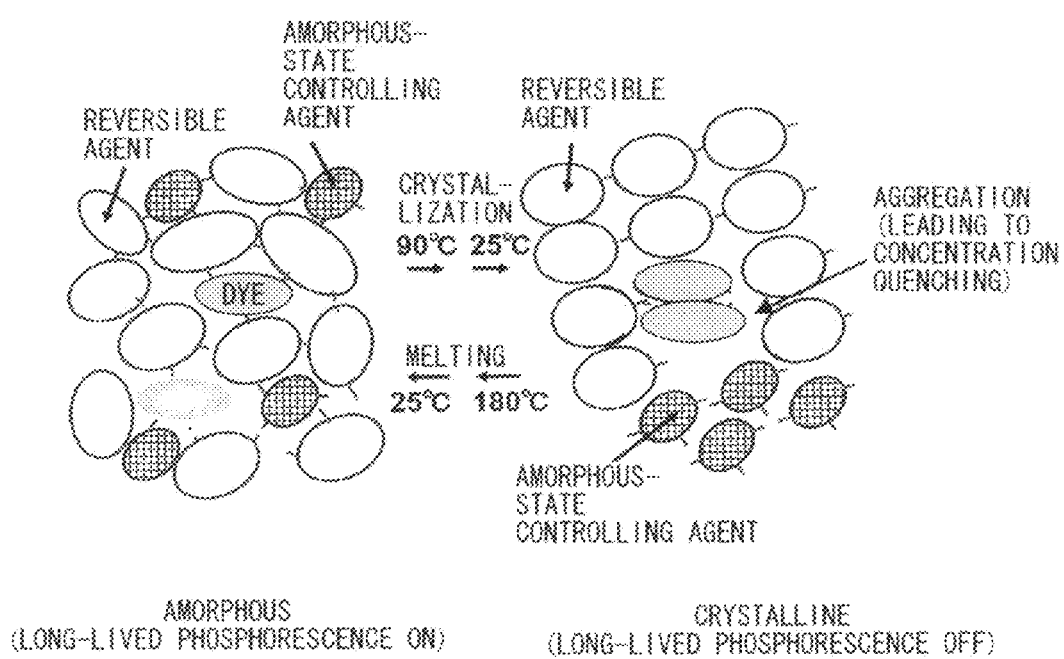
FIG. 2 is a conceptual view showing a state change of compounds in the ordinary-temperature-phosphorescent organic material of the present invention at a time when a long-lived-phosphorescence quantum yield of the ordinary-temperature-phosphorescent organic material at ordinary temperature is changed by two different kinds of thermal hysteresis.
Figure 3:
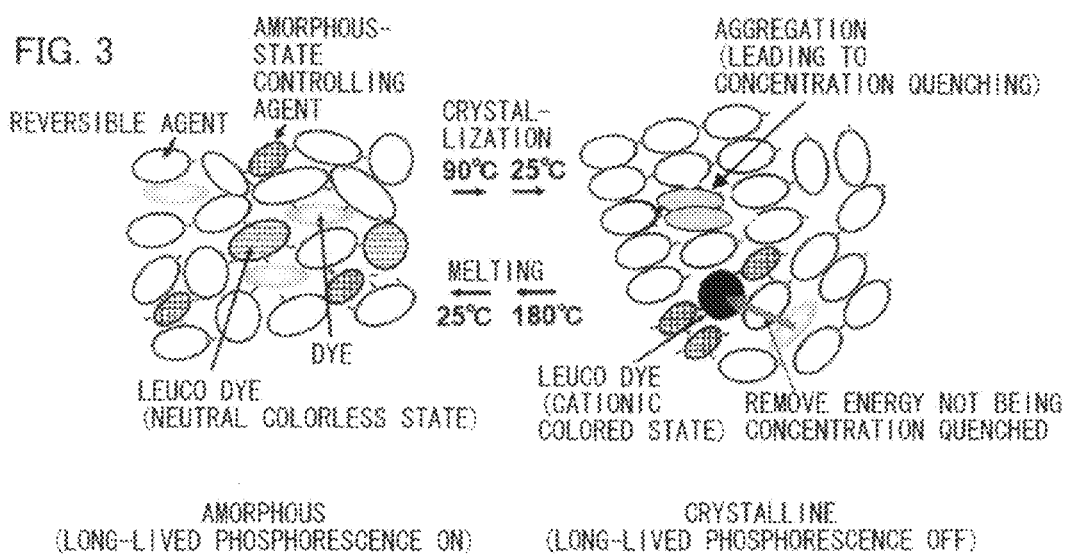
FIG. 3 is a conceptual view showing a mechanism of how a leuco dye increases a long-lived phosphorescence contrast at the time when the long-lived-phosphorescence quantum yield of the ordinary-temperature-phosphorescent organic material of the present invention at ordinary temperature is changed by the two different kinds of thermal hysteresis.
Figure 3:
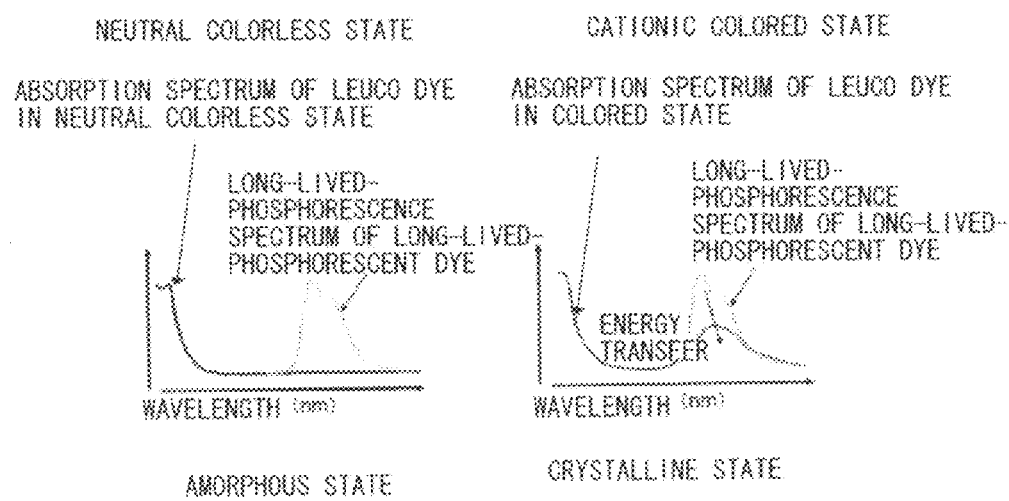
Figure 4:
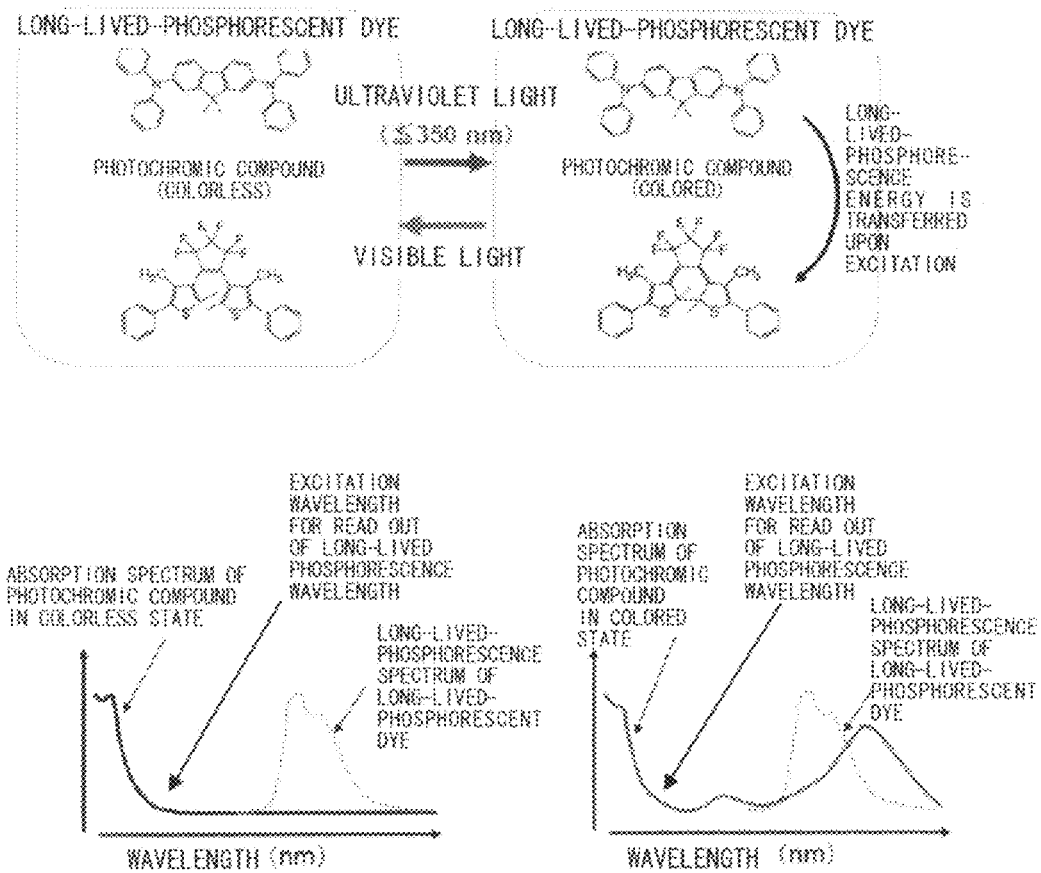
FIG. 4 is a conceptual view showing a mechanism of how an intensity of a long-lived-phosphorescence quantum yield of the ordinary-temperature-phosphorescent organic material of the present invention is changed by light irradiation at two different wavelengths.
Figure 5:
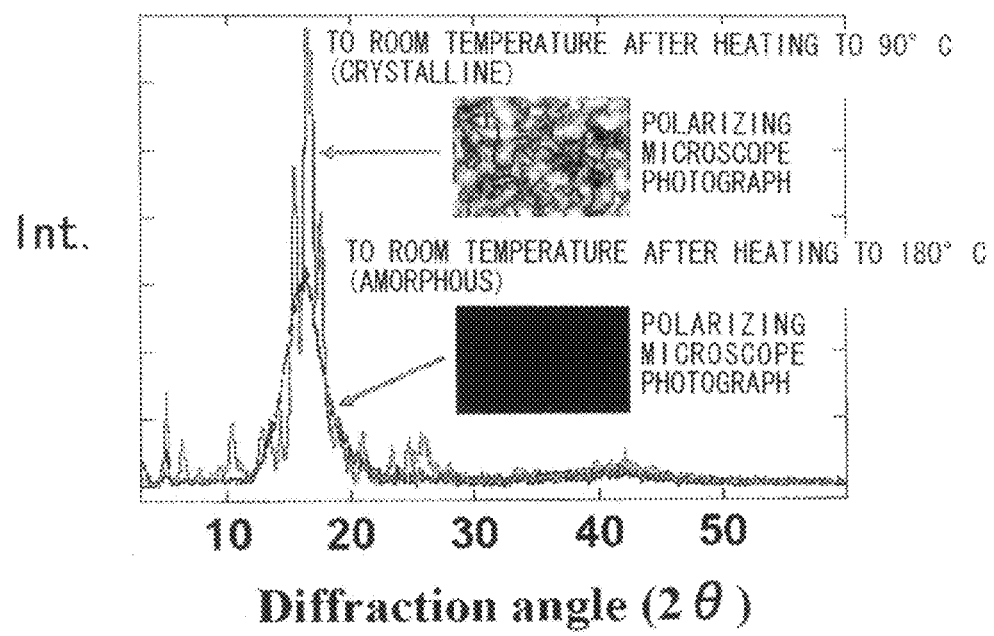
FIG. 5 is a graph showing comparison of crystalline states of a material of Example 61 at a high temperature and a low temperature, based on X-ray analysis and polarizing microscope photographs.
Figure 6:
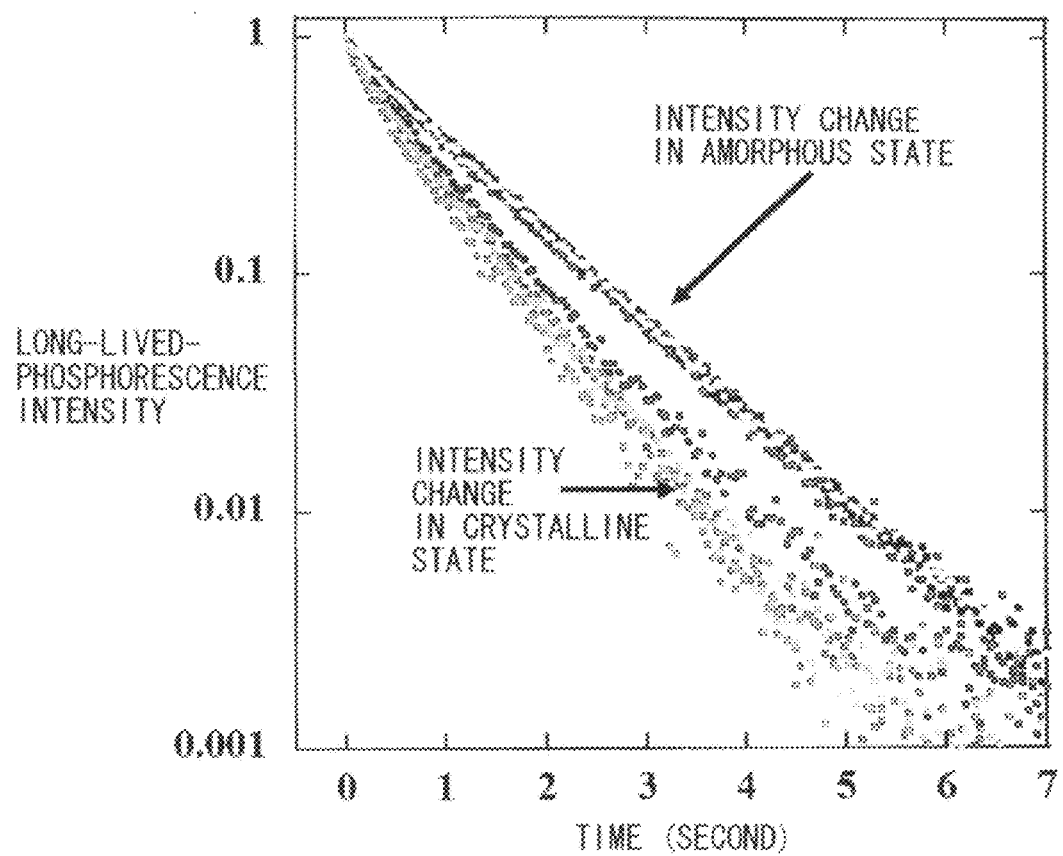
FIG. 6 is a graph showing a long-lived-phosphorescence intensity of the material of Example 61 against time.
Figure 7:
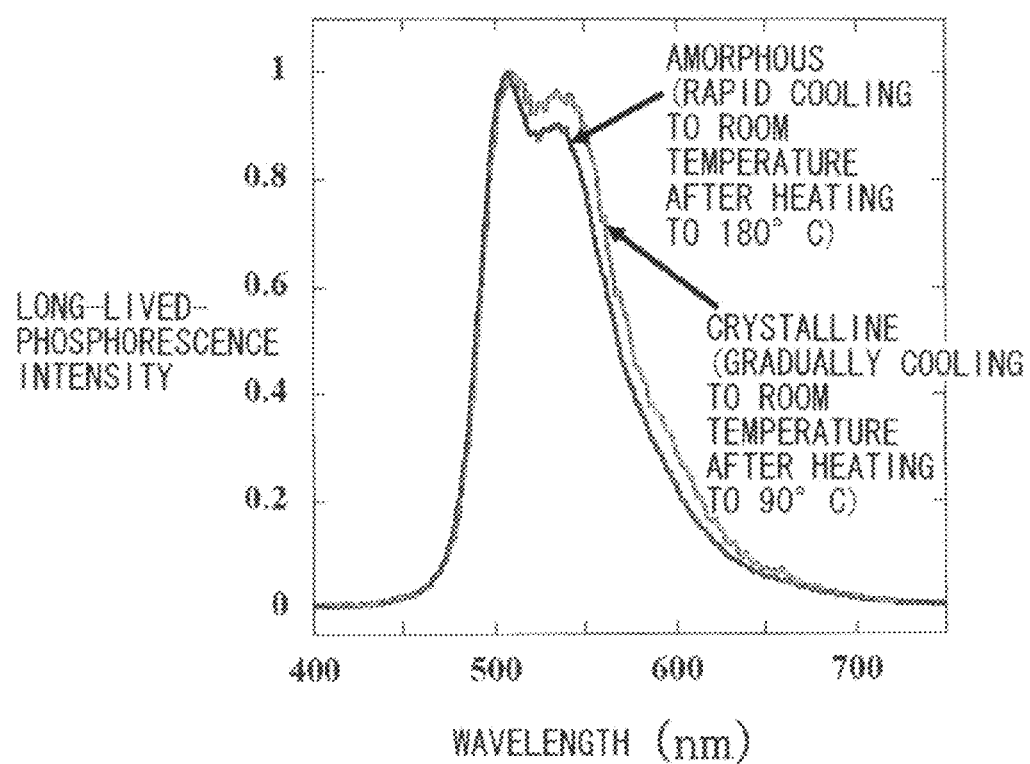
FIG. 7 is a graph for comparing long-lived phosphorescence wavelengths of the material of Example 61 between crystalline and amorphous states.
Figure 8:
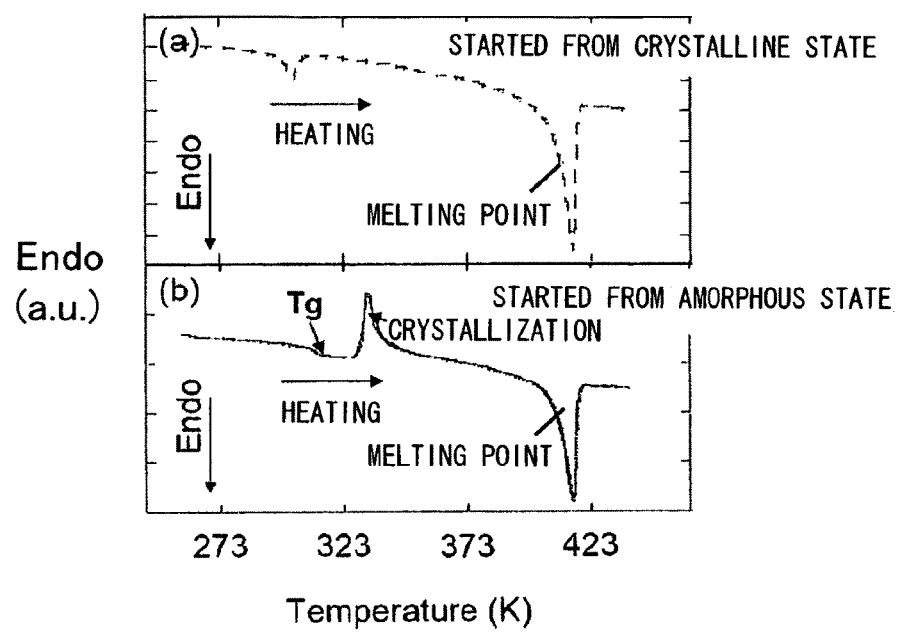
FIG. 8 is a graph for comparing DSC measurements of the material of Example 61 between crystalline and amorphous states.
Figure 9:
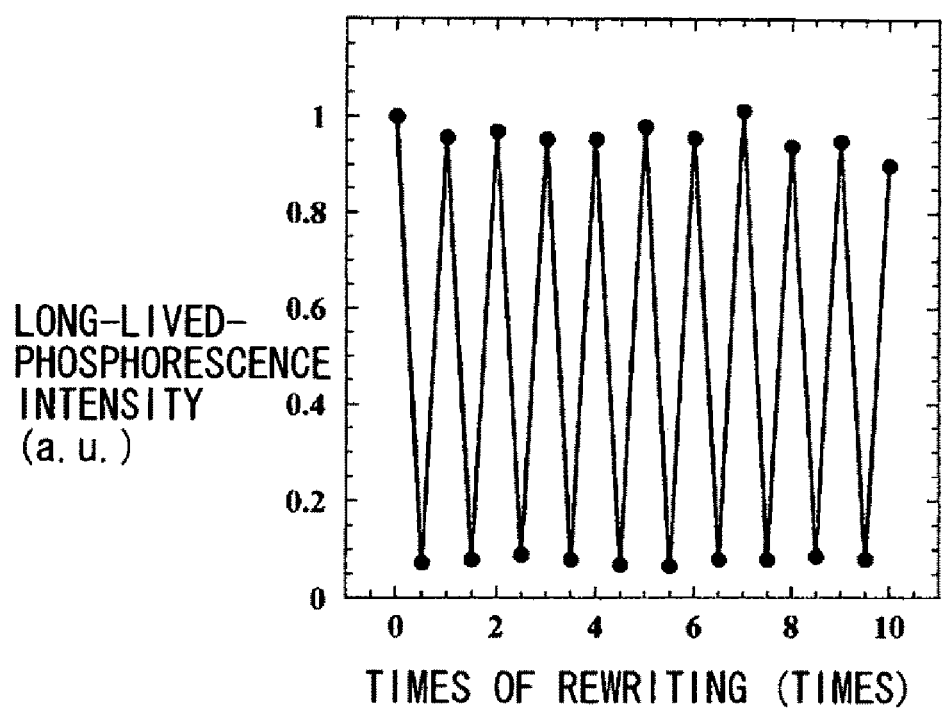
FIG. 9 is a graph showing a relative change in long-lived-phosphorescence intensity of the material of Example 61 at a time when a long-lived-phosphorescence function was turned ON by heating the material at 180° C. for 10 seconds and then rapidly cooling the material to room temperature, and the long-lived-phosphorescence function was turned OFF by heating the material at 90° C. for 60 seconds and then cooling the material to room temperature.
Figure 10:
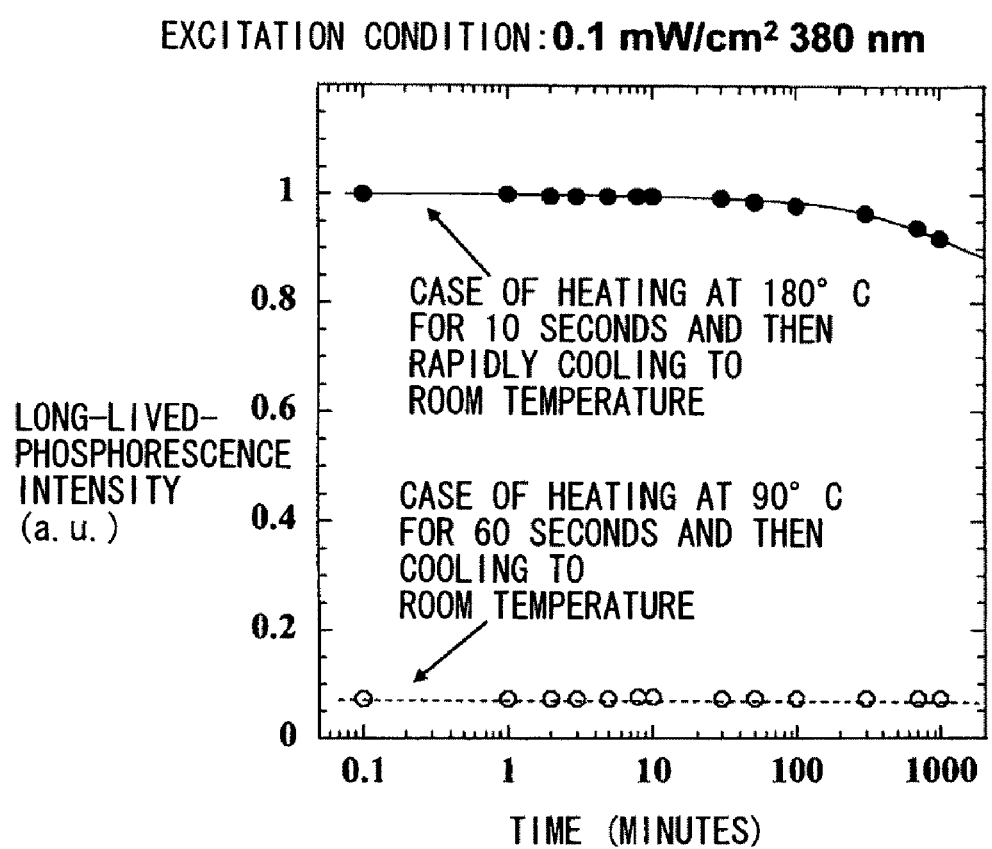
FIG. 10 is a graph showing a change in long-lived-phosphorescence intensity of the material of Example 61 at the time when the material was excited by irradiation with light of 380 nm at 0.1 mW/cm$^2$ with the long-lived-phosphorescence function being turned ON by heating the material at 180° C. for 10 seconds and then rapidly cooling the material to room temperature, and a change in long-lived-phosphorescence intensity of the material of Example 61 at the time when the material was excited by irradiation with light of 380 nm at 0.1 mW/cm$^2$ with the long-lived-phosphorescence function being turned OFF by heating the material at 90° C. for 60 seconds and then cooling the material to room temperature.

The invention claimed is:

1. An ordinary-temperature-phosphorescent organic material comprising:
   a matrix containing a reversible agent; and
   a dye having a phosphorescence lifetime of 0.1 seconds or more in a rigid medium at 77 K.

2. The ordinary-temperature-phosphorescent organic material according to claim 1, wherein
   the reversible agent is a compound formed of massive molecules in each of which a plurality of cyclo rings are connected to each other.

3. The ordinary-temperature-phosphorescent organic material according to claim 2, wherein
   the compound formed of the massive molecules in each of which the plurality of cyclo rings are connected to each other is a sterol compound.

4. The ordinary-temperature-phosphorescent organic material according to claim 1, wherein
   the dye is a dye having at least one position substituted by any one of a tertiary amine and a secondary amine.

5. The ordinary-temperature-phosphorescent organic material according to claim 4, wherein
   the substitution is a substitution at a position, in the dye, directly connected to a π-conjugated system having a maximum absorption wavelength of 450 nm or less.

6. The ordinary-temperature-phosphorescent organic material according to claim 1, wherein
   the dye is a dye that has a lowest triplet excited state formed by ππ* transition, and that contains no heavy atom having an atomic number of 17 or greater in molecules of the dye.

7. The ordinary-temperature-phosphorescent organic material according to claim 1, wherein
   a proton at a conjugated moiety in the dye is replaced with deuterium.

8. The ordinary-temperature-phosphorescent organic material according to claim 1, wherein
   the matrix contains an amorphous-phase stabilizer.

9. The ordinary-temperature-phosphorescent organic material according to claim 8, wherein
   the amorphous-phase stabilizer is a compound that has at least two hydroxyl groups in a single molecule and is formed of a rigid moiety in which no moiety of two or more continuous alkyl chains exists at least between the hydroxyl groups, and the reversible agent is a sterol compound.

10. The ordinary-temperature-phosphorescent organic material according to claim 1, wherein a photosensitizer is added.

11. The ordinary-temperature-phosphorescent organic material according to claim 10, wherein the photosensitizer has an intersystem crossing efficiency of 0.5 or higher at ordinary temperature, and a lowest triplet energy of the photosensitizer is higher than a lowest triplet energy of the dye.

12. The ordinary-temperature-phosphorescent organic material according to claim 1, wherein a solid state at or below a melting point of the reversible agent is settable to two states of: an equilibrium state where a phase of the reversible agent is separated from a phase of an excessive part of the dye beyond equilibrium solubility: and any one of a quasi-equilibrium and non-equilibrium state where the reversible agent incorporates the dye that is at or beyond the equilibrium solubility, and a phosphorescence quantum yield and a phosphorescence lifetime differ between the two states.

13. The ordinary-temperature-phosphorescent organic material according to claim 1, wherein a leuco dye is added.

14. The ordinary-temperature-phosphorescent organic material according to claim 13, wherein when the matrix containing the reversible agent is in a crystalline state, an absorption wavelength band where an absorbance of the leuco dye in a colored state is 25% or more of a maximum absorbance is partially overlapped with a luminescence wavelength band that is 25% or more of a maximum intensity of a phosphorescence spectrum of the dye and a phosphorescence spectrum of the photosensitizer.

15. The ordinary-temperature-phosphorescent organic material according to claim 1, wherein a photochromic compound is added.

16. A reversibly thermosensitive recording material comprising:

the ordinary-temperature-phosphorescent organic material according to claim 1.

17. A reversibly thermosensitive recording material comprising:

a microcapsule encapsulating the ordinary-temperature-phosphorescent organic material according to claim 1.

18. A reversibly thermosensitive recording material comprising:

the ordinary-temperature-phosphorescent organic material according to claim 1; and an insulating particle.

19. A reversibly thermosensitive recording medium comprising:

the reversibly thermosensitive recording material according to claim 16 provided to a substrate.

20. A method of recording in a reversibly thermosensitive recording medium, comprising:

heating a predetermined position of the reversibly thermosensitive recording medium according to claim 19 to a melting point of the reversible agent, followed by cooling, thereby developing a long-lived-phosphorescence function of the reversibly thermosensitive recording material; and heating a position different from the predetermined position to a crystallization temperature of the reversible agent, followed by cooling, thereby deleting a long-lived-phosphorescence function of the reversibly thermosensitive recording material.

* * * * *